(12) United States Patent
Takabayashi et al.

(10) Patent No.: US 9,159,962 B2
(45) Date of Patent: Oct. 13, 2015

(54) BATTERY, METHOD OF MANUFACTURING BATTERY, BATTERY PACK, ELECTRONIC DEVICE, ELECTRIC VEHICLE, CAPACITIVE STORAGE DEVICE, AND POWER SYSTEM

(71) Applicant: Sony Corporation, Tokyo (JP)

(72) Inventors: Hiroshi Takabayashi, Fukushima (JP); Tetsuya Makino, Fukushima (JP); Akira Sasaki, Fukushima (JP); Koji Shimotoku, Fukushima (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 13/649,390

(22) Filed: Oct. 11, 2012

(65) Prior Publication Data

US 2013/0093398 A1   Apr. 18, 2013

(30) Foreign Application Priority Data

Oct. 17, 2011   (JP) .................................. 2011-228280

(51) Int. Cl.
*H02J 7/00* (2006.01)
*H01M 6/04* (2006.01)
(Continued)

(52) U.S. Cl.
CPC ........... *H01M 2/021* (2013.01); *B60L 11/1879* (2013.01); *H01M 2/0277* (2013.01); *H01M 2/0287* (2013.01); *H01M 2/06* (2013.01);
(Continued)

(58) Field of Classification Search
CPC ........... B60L 11/1879; B60L 2200/26; H01M 10/0459; H01M 2220/10; H01M 2/021; H01M 2/0287; H01M 2/08; H01M 2/30; Y02T 10/7005; Y02T 10/7016; Y02T 10/705; Y10T 29/49115

USPC .......... 320/112, 128, 134, 137; 429/171, 200, 429/323, 332
See application file for complete search history.

(56) References Cited

U.S. PATENT DOCUMENTS 6,132,900 A * 10/2000 Yoshizawa et al. ........... 429/185
7,141,332 B2 * 11/2006 Kejha et al. .................. 429/176
(Continued)

FOREIGN PATENT DOCUMENTS

JP   56-071278   6/1981
JP   09-288998   11/1997
(Continued)

OTHER PUBLICATIONS

European Search Report issued Feb. 13, 2014 for corresponding European Appln. No. 12006988.

*Primary Examiner* — Helen Rossoshek
(74) *Attorney, Agent, or Firm* — Sony Corporation

(57) ABSTRACT

A battery including cladding members in which a metal layer, an external resin layer, an inner resin are laminated; an electrode body which includes a positive electrode and a negative electrode; electrolyte which is accommodated in the cladding member; a positive electrode lead which is electrically connected to the positive electrode; and a negative electrode lead which is electrically connected to the negative electrode, the thickness of the heat sealed portions of both end portions of the positive electrode lead is formed larger than the thickness of the heat sealed portion on a center line in a width direction of the positive electrode lead, and the thickness of the heat sealed portions of both end portions of the negative electrode lead is formed larger than the thickness of the heat sealed portion on a center line in a width direction of the negative electrode lead.

20 Claims, 13 Drawing Sheets

(51) Int. Cl.
*H01M 10/0562* (2010.01)
*H01M 6/16* (2006.01)
*H01M 2/02* (2006.01)
*H01M 2/08* (2006.01)
*H01M 2/06* (2006.01)
*B60L 11/18* (2006.01)
*H01M 2/30* (2006.01)
*H01M 10/04* (2006.01)

(52) U.S. Cl.
CPC .............. *H01M2/08* (2013.01); *B60L 2200/26* (2013.01); *H01M 2/30* (2013.01); *H01M 10/0459* (2013.01); *H01M 2220/10* (2013.01); *H01M 2220/20* (2013.01); *Y02T 10/705* (2013.01); *Y02T 10/7005* (2013.01); *Y02T 10/7016* (2013.01); *Y10T 29/49115* (2015.01)

(56) References Cited

U.S. PATENT DOCUMENTS

| | | | |
|---|---|---|---|
| 7,279,248 B2 * | 10/2007 | Fukuzawa et al. | 429/210 |
| 7,458,996 B2 * | 12/2008 | Ogura et al. | 29/623.2 |
| 7,803,483 B2 * | 9/2010 | Takami et al. | 429/181 |
| 8,257,865 B2 * | 9/2012 | Suzuki et al. | 429/223 |
| 8,586,246 B2 * | 11/2013 | Nakai et al. | 429/231.95 |
| 8,728,666 B2 * | 5/2014 | Itou et al. | 429/223 |
| 8,865,350 B2 * | 10/2014 | Yamada et al. | 429/231.8 |
| 2004/0062983 A1 | 4/2004 | Abe et al. | |
| 2004/0076877 A1 | 4/2004 | James et al. | |
| 2005/0031953 A1 | 2/2005 | Watanabe et al. | |
| 2006/0127760 A1 | 6/2006 | Hatta et al. | |
| 2008/0003503 A1 * | 1/2008 | Kawakami et al. | 429/231.5 |
| 2010/0310911 A1 * | 12/2010 | Yamamoto et al. | 429/94 |
| 2011/0273809 A1 * | 11/2011 | Falsett et al. | 361/104 |
| 2012/0034503 A1 * | 2/2012 | Toyama et al. | 429/91 |
| 2012/0114986 A1 * | 5/2012 | Kim et al. | 429/53 |
| 2012/0121965 A1 * | 5/2012 | Makino et al. | 429/156 |
| 2012/0121967 A1 * | 5/2012 | Nakamura et al. | 429/163 |
| 2012/0265385 A1 * | 10/2012 | Funada et al. | 701/22 |
| 2013/0260212 A1 * | 10/2013 | Kohno et al. | 429/158 |
| 2014/0011074 A1 * | 1/2014 | Oda et al. | 429/160 |
| 2014/0058598 A1 * | 2/2014 | Matsui et al. | 701/22 |
| 2014/0099543 A1 * | 4/2014 | Oda et al. | 429/211 |
| 2014/0242451 A1 * | 8/2014 | Sawayama et al. | 429/179 |

FOREIGN PATENT DOCUMENTS

| | | | |
|---|---|---|---|
| JP | 11185717 A | * | 7/1999 |
| JP | 2004273380 A | * | 9/2004 |
| JP | 2007317481 A | * | 12/2007 |
| JP | 2012238455 A | * | 12/2012 |
| WO | WO 2011007969 | * | 1/2011 |

* cited by examiner

BATTERY, METHOD OF MANUFACTURING BATTERY, BATTERY PACK, ELECTRONIC DEVICE, ELECTRIC VEHICLE, CAPACITIVE STORAGE DEVICE, AND POWER SYSTEM

CROSS REFERENCES TO RELATED APPLICATIONS

The present application claims priority to Japanese Priority Patent Application JP 2011-228280 filed in the Japan Patent Office on Oct. 17, 2011, the entire content of which is hereby incorporated by reference.

BACKGROUND

The present disclosure relates to a battery, and a method of manufacturing a battery where a laminate film or the like is used as the cladding member of the battery. In addition, the present disclosure also relates to a battery pack, an electronic device, an electric vehicle, a capacitive storage device, and a power system which use the battery.

In recent years, many portable electronic devices such as camera-integrated VTRs, mobile phones and portable computers have appeared, and the downsizing and lightening thereof is being undertaken. Furthermore, as a power source of these portable electronic devices, non-aqueous electrolyte batteries such as so-called lithium-ion batteries are particularly widely used, and research and development has been carried out on thin and bendable batteries.

In order to take advantage of the benefits of thin, light batteries, various batteries are being considered in which a battery power generating element is enclosed by using a so-called laminate film of resin film or laminated resin film and metal foil as a cladding member. In such a battery, it is an important issue as to whether or not a sealing reliability equal to or greater than that of metal cans can be achieved.

For example, when, as in the battery which was described below in Japanese Unexamined Patent Application Publication No. 56-71278, the cladding member is configured of a resin film which is formed by a single resin, disadvantages such as the moisture passing through the resin and permeating, or along with the power generating elements, non-aqueous electrolyte, which is accommodated in an inner portion, passing through the resin and volatilizing may not be avoided. Therefore, the resin film formed by a single resin, is not suitable for use as the cladding member of the non-aqueous electrolyte battery.

To eliminate this disadvantage, as the cladding member, employment of such a laminate film including metal foil in the laminated structure is effective, however, in this case, short circuiting is a big problem. For example, the strip-shaped electrode terminal will be derived from the heat-sealing interface of the laminate film, however, at this time, the metal foil which is exposed to the laminate film end face in the lead derivation portion, or the metal foil that was exposed after the resin to flowed out when heat-sealing was performed exceeding an appropriate temperature range or pressure range, comes into contact with the electrode terminals causing a short circuit.

Therefore, for example, in Japanese Unexamined Patent Application Publication No. 9-288998, when extracting the electrode terminals from the sheet-shaped battery inclusion bodies to the outside, the adhesion film is also used in the resin of the seal portion of the inclusion bodies by using a lead, part of which is covered by a cohesive film of maleic acid-modified polyolefin resin or the like in advance. This attempt to improve the sealability has been proposed.

SUMMARY

However, even in the configuration of Japanese Unexamined Patent Application Publication No. 56-71278 and Japanese Unexamined Patent Application Publication No. 9-288998, when a heater head which has a flat surface when performing heat-sealing of the laminate film, when the pressure at the time of heat-sealing, or the heat-sealing temperature is too large, the concern of short circuiting between the lead and the metal foil of the laminate film still remains. When performing the heat-sealing, it is considered to set the temperature and heat-sealing pressure lower with the object of avoidance of short circuiting, and there are concerns that sealing properties will decrease due to a lack of fusing and flowing of the resin. When the sealing properties of the laminate film deteriorate, airtightness of the non-aqueous electrolyte battery is significantly impaired, leading to degradation of battery characteristics.

In addition, the lead is made strip-shaped by cutting a metal plate, and in some cases a burr is formed in the cutting direction. Also even if the laminate film is sealed sufficiently by heat-sealing, there is a concern that the burr formed on the end portion of the lead will penetrate the resin layer opposite the lead and short circuit with the metal foil of the laminate film. Particularly in non-aqueous electrolyte battery capable of large current discharge that is in great demand in recent years, it is necessary to design the thickness of the lead such that it is thick, however in the end of a thick lead, large burrs are formed easily, and short circuiting is more likely to occur. In such a non-aqueous electrolyte battery capable of large current discharge, even when manufacturing using the heat-sealing method of the related art, it is difficult to prevent a short circuit.

Therefore, it is desirable to provide a battery in which, as well as high sealing properties, large current discharge is possible, and it is possible to prevent a short circuit.

According to an embodiment of the present disclosure, there is provided a battery including: a cladding member in which a metal layer, an external resin layer which was formed on the outer surface of the metal layer, and the inner resin layer which was formed on the inner surface of the metal layer are laminated; an electrode body which includes a positive electrode and a negative electrode that are accommodated in the cladding member; electrolyte which is accommodated in the cladding member; a positive electrode lead which is electrically connected to the positive electrode and is derived from the heat-sealed joint of the cladding member to the outside; and the negative electrode lead which is electrically connected to the negative electrode, and is derived from the heat-sealed joint to the outside, wherein, in the heat-sealed portion in which the positive electrode lead and the negative electrode lead are derived to the outside and the cladding members are heat-sealed to each other, the thickness of the heat-sealed portions of both end portions of the positive electrode lead, is formed larger than the thickness of the heat-sealed portion on the center line in the width direction of the positive electrode lead, and the thickness of the heat-sealed portions of both end portions of the lead negative electrode lead, is formed larger than the thickness of the heat-sealed portion on the center line in the width direction of the negative electrode lead.

According to another embodiment of the present disclosure, there is provided a manufacturing method of a battery including, forming an external resin layer, in which an electrode body and electrolyte including a positive electrode and a negative electrode are formed on the metal layer and the outer surface of the metal layer, and an internal resin layer on the inner surface of the metal layer by lamination; cladding using a cladding member which accommodates an electrode body and electrolyte in the inner portion using heat-sealing; deriving the positive electrode lead which is electrically connected to the positive electrode and the negative electrode lead that is electrically connected to the negative electrode from the joint of the cladding member to the outside; heat-sealing the cladding member of, among the outer periphery portion of the electrode body, the derivation side which derives the positive electrode lead or the negative electrode lead using the heater block which is provided with a positive electrode side cutout portion which is formed from a pair of first cutout portions which are respectively provided in a portion opposite the positive electrode and a portion opposite a region which straddles the end portions of the positive electrode, and a second cutout portion including the center line of the positive electrode lead between the pair of first cutout portions and formed shallower than the first cutout portions, and is provided with a negative electrode side cutout portion which is formed from a pair of third cutout portions which are respectively provided in a portion opposite the negative electrode lead and a portion opposite a region which straddles the end portions of the negative electrode lead, and a fourth cutout portion including the center line of the negative electrode lead between the pair of third cutout portions and formed shallower than the third cutout portions; and heat-sealing, among the outer periphery portion of the electrode body, the cladding member of a side which does not derive the positive electrode lead and the negative electrode lead.

In addition, the battery pack, the electronic device, the electric vehicle, the capacitive storage device, and the power system of embodiments according to the present disclosure are provided with the above-mentioned non-aqueous electrolyte battery which is produced by the method described above.

In the present disclosure, along with having high sealability, it is possible to prevent a short circuit between the metal foil of the laminate film and the lead caused by the burr that is fainted at the lead end portion.

According to an embodiment of the present disclosure, it is possible to obtain a non-aqueous electrolyte battery which realizes high sealability and suppression of degradation of battery performance due to short circuiting.

Additional features and advantages are described herein, and will be apparent from the following Detailed Description and the figures.

DETAILED DESCRIPTION

An embodiment of the present disclosure will be described below with reference to the drawings. Description is carried out in the following order. In each of the embodiments below, a case will be described in which, as a battery according to an embodiment of the present disclosure, a non-aqueous electrolyte battery of lithium ion secondary batteries, or the like is used.

1. First embodiment (an example showing the configuration of a non-aqueous electrolyte battery)
2. Second embodiment (an example of a non-aqueous electrolyte battery using the electrode body of other configuration)
3. Third embodiment (an example of a battery pack using a non-aqueous electrolyte battery)
4. Fourth embodiment (an example of a storage system or the like using a non-aqueous electrolyte battery)

1. First Embodiment 1-1 Configuration of Non-aqueous Electrolyte Battery

Figure 1A:
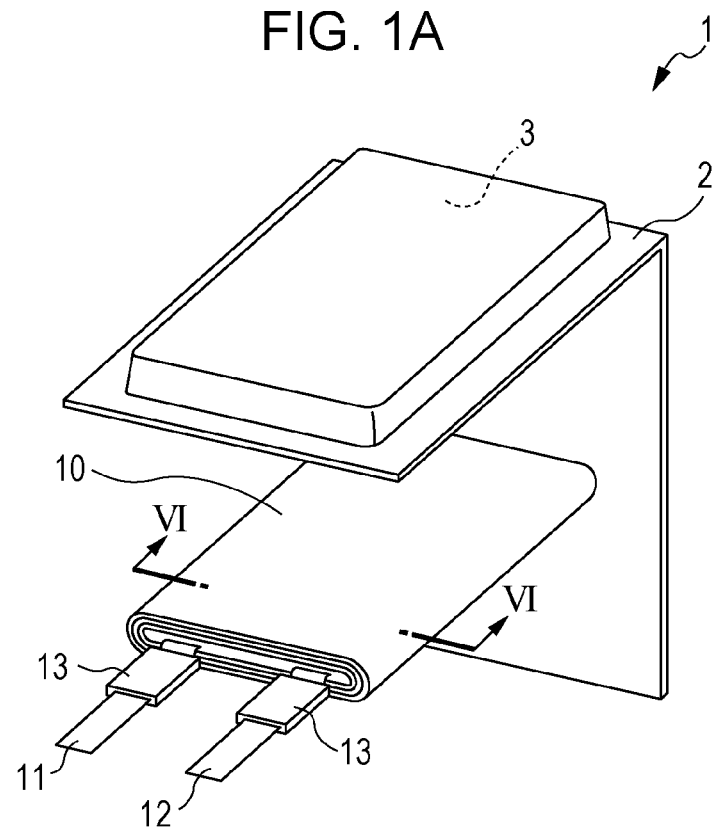
FIGS. 1A and 1B are perspective views showing a configuration example of a non-aqueous electrolyte battery according to a first embodiment.
Figure 1B:
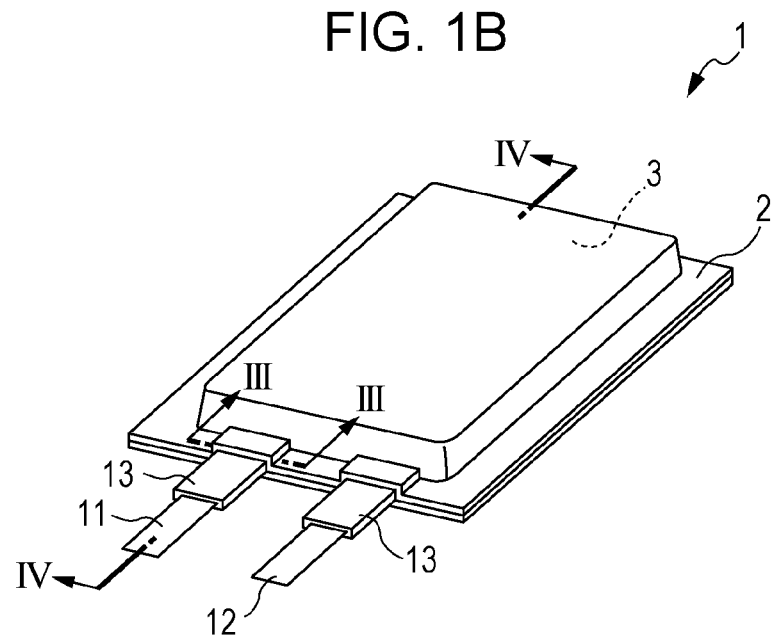

FIG. 1A is a perspective view showing a configuration example of the non-aqueous electrolyte battery 1 of lithium ion secondary batteries or the like according to the first embodiment. In addition, FIG. 1B is a perspective view showing the appearance of a non-aqueous electrolyte battery 1.

The non-aqueous electrolyte battery 1 uses a laminate film 2 as the cladding member, and accommodates the wound electrode body 10 to which the positive electrode lead 11 and the negative electrode lead 12 (below, when not distinguished, they will be referred to as leads as appropriate) are attached, in the inner portion of the laminate film 2. As shown in FIG. 1A, the laminate film 2 is provided with a concave portion 3 which was formed by a deep drawing step in advance. Wound electrode body 10 is accommodated in the concave portion 3. The laminate film 2 and the laminate film 2 are adhered to each other in an opposing state in the outer periphery of the wound electrode body 10 so as to cover the wound electrode body 10.

The positive electrode lead 11 and the negative electrode lead 12 are respectively connected to the wound electrode body 10, which is accommodated in the inner portion of the laminate film 2, and are derived to an external portion of a non-aqueous electrolyte battery 1. The positive electrode lead 11 and the negative electrode lead 12 may be derived from the same side of the non-aqueous electrolyte battery 1, and may also be derived from different sides, respectively.

The positive electrode lead 11 is connected by a method such as spot welding or ultrasonic welding to one end portion of the positive electrode current collector (not shown). The positive electrode lead 11 is preferably a metal foil of a mesh-shape, however there is no problem even if it is not a metal, as long as it is electrochemically and chemically stable and conductive. As the material of the positive electrode lead 11, aluminum (Al), nickel (Ni), or stainless steel (SUS) is used, for example.

The negative electrode lead 12 is connected by a method such as spot welding or ultrasonic welding to one end portion of the negative electrode current collector (not shown). The negative electrode lead 12 is preferably a metal foil of a mesh-shape, however there is no problem even if it is not a metal, as long as it is electrochemically and chemically stable and conductive. As the material of the negative electrode lead 12, copper (Cu), nickel (Ni), or the like is used, for example.

It is preferable that the adhesion film 13 for improving the adhesiveness between the laminate film 2 and the positive electrode lead 11 and the negative electrode lead 12 is provided between the laminate film 2 and the positive electrode lead 11 and the negative electrode lead 12.

Adhesion film 13 is formed from resin material with high adhesiveness between the negative electrode lead 12 and the positive electrode lead 11, and a polyolefin resin such as, for example, polyethylene (PE), polypropylene (PP), modified polyethylene or modified polypropylene can be used.

The thickness of the adhesion film 13 is preferably from 70 μm to 130 μm. Less than 70 μm, and the positive electrode lead 11 and the negative electrode lead 12 adhere poorly to laminate film 2, exceed 130 μm, and when heat-sealing is performed there is a large flow amount of the molten resin, which is undesirable in the manufacturing process.

It is preferable that the thickness of the positive electrode lead 11 and the thickness of the negative electrode lead 12 is from 70 μm to 400 μm. In addition, when the non-aqueous electrolyte battery 1 is used as a rechargeable battery for power tools, a rechargeable battery for hybrid cars, a rechargeable battery for electric vehicles, or the like, it is necessary to extract a large current. For this reason, the thickness of the positive electrode lead 11 and the negative electrode lead 12 is preferably from 100 μm to 400 μm. Furthermore, the thickness of the positive electrode lead 11 and the negative electrode lead 12, is the thickness on the center line in the width direction of the positive electrode lead 11 and the negative electrode lead 12.

In addition, when the non-aqueous electrolyte battery 1 is used as a rechargeable battery for power tools, a rechargeable battery for hybrid cars, a rechargeable battery for electric vehicles, or the like, it is preferable that the non-aqueous electrolyte battery 1 be a large capacity battery. For this reason, the thickness of a non-aqueous electrolyte battery 1 is preferably from 5 mm to 20 mm, and the discharge capacity is preferably from 3 Ah to 50 Ah.

The non-aqueous electrolyte battery 1 prevents a short circuit due to the burr which is formed at the end portion of the positive electrode lead 11 or the negative electrode lead 12 In particular, when the non-aqueous electrolyte battery 1 is made large-capacity, it is necessary to increase the thickness of the positive electrode lead 11 and the negative electrode lead 12, since it becomes easier for short circuiting to occur due to the high burr on the end portion of the lead, an effect of preventing short-circuiting is increased by applying the configuration of the present disclosure.

Cladding Member

Figure 2:
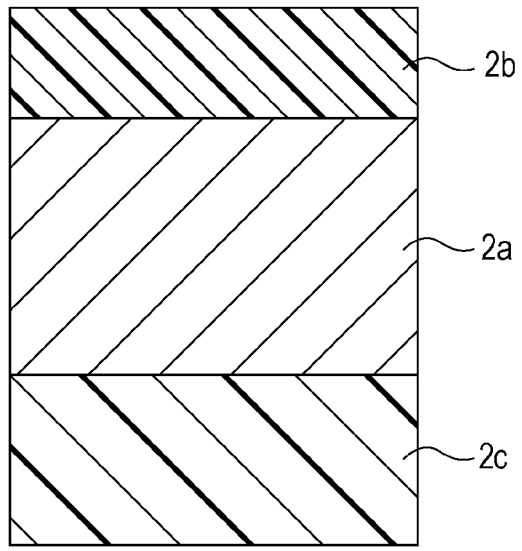
FIG. 2 is a cross-sectional view showing a configuration example of a laminate film.

The laminate film 2 which is a cladding member to clad the wound electrode body 10, as shown in FIG. 2, has a configuration in which a resin layer is provided on both sides of the metal layer $2a$ formed from a metal foil. A general configuration of the laminate film 2 can be represented by outer resin layer $2b$/metal layer $2a$/inner resin layer $2c$, and the inner resin layer $2c$ is formed so as to oppose the wound electrode body 10. The outer resin layer $2b$ and the inner resin layer $2c$ may be respectively configured by a plurality of layers. An adhesive layer (not shown) may be provided between the outer resin layer $2b$ and the inner resin layer $2c$, and the metal layer $2a$. The adhesive layer thickness is for example, from 2 μm to 7 μm.

As a metal material which configures the metal layer $2a$, it is favorable if the metal material functions as a moisture permeation resistant barrier film, and aluminum foil (Al), stainless (SUS), nickel (Ni), plated iron (Fe), and the like can be used. Among these, it is preferable to use aluminum, which is thin, lightweight and has excellent workability. In particular, from the viewpoint of workability, soft aluminum, for example pre-annealed aluminum (JIS A8021P-O), (JIS A8079P-O), (JIS AlN30-O), or the like can be used.

Furthermore, a non-aqueous electrolyte battery 1 may clad the wound electrode body 10 by opposing two sheets of the laminate film 2, and providing the concave portion 3 in only one of the laminate films 2. In this case, the metal layer $2a$ of the laminate film 2 provided with a concave portion 3 is set to the soft aluminum described above, the metal layer $2a$ of another laminate film 2 not provided with a concave portion 3 may be set to an aluminum which is harder than the above described soft aluminum. In this case, it is possible to form a non-aqueous electrolyte battery 1, in which the most outer cladding is the hard laminate film 2, by at least increasing the width of the hard laminate film 2 and making both end portions of the hard laminate film 2 contact each other on the bottom face of the concave portion 3. As hard aluminum, for example pre-annealed aluminum (JIS A3003P-H18), (JIS A3004P-H18) or the like can be used.

The thickness of the metal layer $2a$, is preferably from 30 μm to 100 μm. When less than 30 μm, the material strength is poor. In addition, when 100 μm is exceeded, processing becomes extremely difficult, the thickness of the laminate film 2 increases, leading to a decrease in volumetric efficiency of the non-aqueous electrolyte battery.

The inner resin layers $2c$ are portions for bonding with each other by melting in heat. The inner resin layer $2c$, for example, is heated and melted by a heater head which is a metal block provided with a heater. The temperature of the heater head is a temperature of a degree which does not damage the wound electrode body 10. Therefore, in the inner resin layer 2c, it is necessary to use a resin material having a melting point lower than the temperature of the above-mentioned heat-sealing, as such a resin material, polyethylene (PE), polypropylene non-axial stretch (CPP), polyethylene terephthalate (PET), low density polyethylene (LDPE), high-density polyethylene (HDPE), linear low density polyethylene (LLDPE), or the may be used, and it is also possible to use a plurality of types selected from these.

The thickness of the inner resin layer 2c, is preferably from 20 μm to 90 μm. Less than 20 μm, along with a reduction in adhesiveness, the pressure buffering action becomes insufficient and short circuiting is likely to occur. In addition, exceed 90 μm, and there are concerns that the inner resin layer 2c will melt, it will become easier for moisture to penetrate through the resin layer formed by solidification, gas generation inside the battery and the associated cell swelling, as well as degradation of battery characteristics may arise. Furthermore, the thickness of the inner resin layer 2c is the thickness of the wound electrode body 10 in a state before cladding. The wound electrode body 10 is clad with the laminate film 2, and after sealing, since the inner resin layer 2c melts and flows, the thickness of the resin layer 2c that is melted and solidified is different to the thickness of inner resin layer 2c when it is formed, and there are also cases in which the thickness deviates from the above range.

In addition, the inner resin layer 2c may, for example, be of a two-layer structure. In this case, it is preferable that, on the inner surface in contact with the metal layer 2a, a resin layer be formed using the resin material described above, and on the surface side opposite the positive electrode lead 11 and the negative electrode lead 12, a resin layer be formed using a resin material having superior adhesion to metal than the resin material described above. As a resin material having excellent adhesion to metal, it is possible to use a polyolefin resin such as polyethylene (PE), polypropylene (PP), modified polyethylene or modified polypropylene, for example.

For the outer resin layer 2b, beauty of appearance, toughness, flexibility, and the like are favorable. The outer resin layer 2b has a melting point higher than the heater head or the like that melts the inner resin layer 2c, and a resin material that is not melted during the heat-sealing of the laminate film 2 is used. As such a resin material, for example, polyolefin resin, polyamide resin, polyimide resin, polyester, and the like are used. Specifically, nylon (Ny), polyethylene terephthalate (PET), polyethylene naphthalate (PEN), polybutylene terephthalate (PBT) or polybutylene naphthalate (PBN) are used, and a plurality of types selected from these may also be used.

Furthermore, since the laminate film 2 is bonded by melting the inner resin layers 2c together by heat-sealing, the outer resin layer 2b has a melting point higher than the inner resin layer 2c. This is because only the inner resin layer 2c is melted when heat-sealing is performed. For this reason, for the outer resin layer 2b, it is necessary to select a material that can be used according to the resin material selected as the inner resin layer 2c.

The thickness of the outer resin layer 2b, is preferably from 25 μm to 50 μm. Less than 25 μm and function as a protective layer is poor, and exceeding 50 μm leads to a decrease in volumetric efficiency of the non-aqueous electrolyte battery.

Furthermore, in the laminate film 2 configured in this manner, it is preferable that the growth rate of the inner resin layer 2c be 350% or more. As described below, this is because it is possible to preferably form an uneven shape of the heat-sealed portion which can suppresses short circuiting caused by burrs.

The wound electrode body 10 is clad with the above-mentioned laminate film 2. The positive electrode lead 11 which is connected to the positive electrode 14 and the negative electrode lead 12 which is connected to the negative electrode 15 are derived from the sealing portion of the laminate film 2 to the battery outer portion.

In the present disclosure, by heating the peripheral portion of the wound electrode body 10 using a heater head, the laminate films 2 covering the wound electrode body 10 from both sides are sealed together by heat-sealing. In the non-aqueous electrolyte battery 1 of the first embodiment, by adjusting the heat-sealed portion of a lead derivation side in which the laminate films 2 are heat-sealed so as to interpose the positive electrode lead 11 or the negative electrode lead 12, it is possible to suppress a short circuit caused by the burrs which are easily formed at the end portions of the positive electrode lead 11 or the negative electrode lead 12. Below, the heat-sealed portion of a lead derivation side in which the laminate films 2 are heat-sealed so as to interpose the positive electrode lead 11 or the negative electrode lead 12 will be described in detail.

Configuration of Heat-Sealed Portion of Lead Derivation Side

Figure 3A:
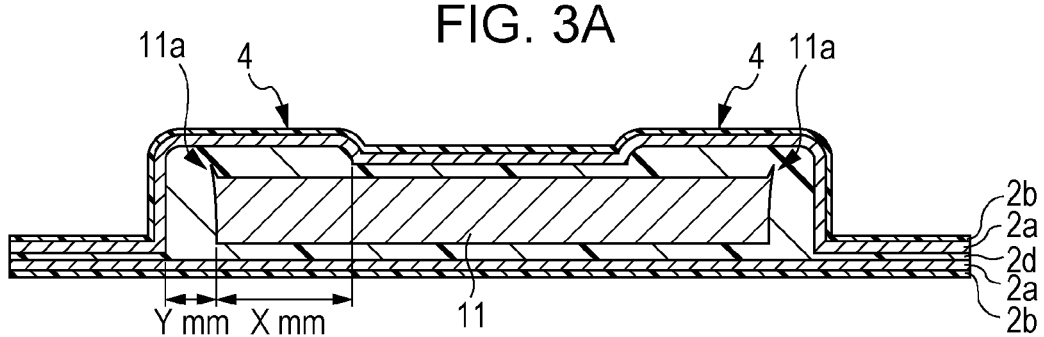
FIGS. 3A and 3B are cross-sectional views showing a configuration example of a positive electrode lead derived part of the non-aqueous electrolyte battery according to an embodiment of the present disclosure.
Figure 3B:
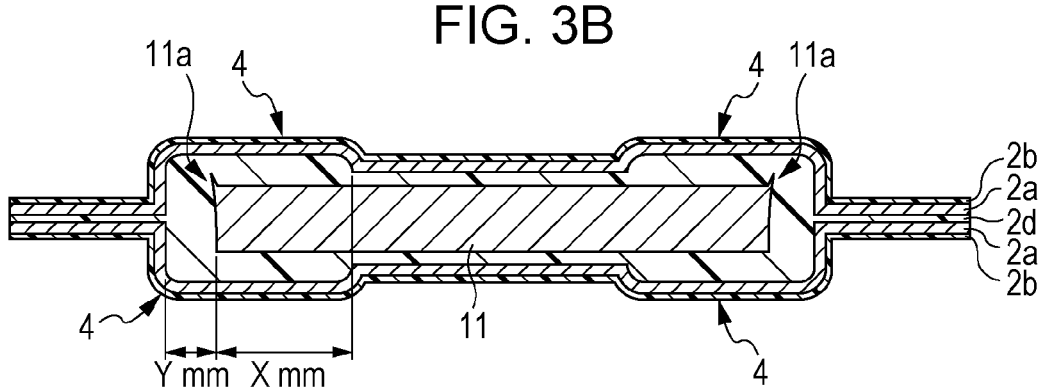

FIG. 3A is a cross-sectional view taken along the line IIIA-IIIA in the positive electrode lead 11 derived portion of the non-aqueous electrolyte battery 1 according to an embodiment of the present disclosure shown in FIG. 1B. FIG. 3B is another example of a cross-sectional view taken along the line IIIB-IIIB in the positive electrode lead 11 derived portion of the non-aqueous electrolyte battery 1 according to an embodiment of the present disclosure shown in FIG. 1B.

In a non-aqueous electrolyte battery 1 according to an embodiment of the present disclosure, as shown in FIG. 3A and FIG. 3B, the thickness of the heat-sealing portion in both end portions of the positive electrode lead 11, is formed larger than the thickness of the heat-sealing portion on the center line in the width direction of the positive electrode lead 11. The burr 11a is formed on the positive electrode lead 11 of FIG. 3A. In addition, in the same manner, the thickness of the heat-sealed portion in both end portions of the negative electrode lead 12 is formed larger than the thickness of the heat-sealing portion on the center line in the width direction of the negative electrode lead 12. Furthermore, the heat-sealed portion is the portion in which the inner resin layers 2c of the laminate film 2 are melted and adhered to each other. In addition, the thickness of the heat-sealed portion is the sum of the thicknesses of the metal layer 2a and the outer resin layer 2b of the respective opposing laminate films 2, the resin layer 2d in which the opposing inner resin layers 2c of the laminate film 2 melted and became integral with each other, and the lead in the portion interposing the lead. In addition, burr 11a formed in the positive electrode lead 11, if you do not distinguish between a burr is formed on the negative electrode lead 12, the burr is referred to as appropriate.

Specifically, the thickness of the resin layer 2d between the metal layer 2a of the laminate film 2 in both end portions of the positive electrode lead 11 and the positive electrode lead 11, is formed larger than the thickness of the resin layer 2d between the metal layer 2a of the laminate film 2 on the center line of the positive electrode lead 11 and the positive electrode lead 11. When the adhesion film 13 is provided between the laminate film 2 and the positive electrode lead 11, the resin layer 2d is formed from the molten resin layer in which the inner resin layer 2c after melting and the adhesion film 13 melted and became integral with each other. The thickness of the resin layer 2d is formed differently, since the inner resin layer 2c of the laminate film 2 melts and flows, unlike the inner resin layer 2c of the laminate film 2 before heat-sealing, the thickness in the respective portions is not uniform. Therefore, a step is provided between the heat-sealed portion in the end portion of the positive electrode lead 11 and the heat-sealed portion on the center line of the positive electrode lead 11, and convex portion 4 is formed so that the heat-sealed portion in the end portion of the positive electrode lead 11 is convex in the direction of the outer resin layer 2b.

Furthermore, in the heat-sealed portion interposing the positive electrode lead 11, the resin layer 2d is in a state where both sides of the positive electrode lead 11 are bonded. In addition, in the heat-sealing portion not interposing the positive electrode lead 11, the inner resin layers 2c opposing each other of the laminate film 2 are melted together and become integral, thereby the resin layer 2d is formed. Such a configuration is the same in the heat-sealed portion interposing the negative electrode lead 12.

In the same manner, the thickness of the resin layer 2d between the metal layer 2a of the laminate film 2 in both end portions of the negative electrode lead 12 and the negative electrode lead 12, is formed larger than the thickness of the resin layer 2d between the metal layer 2a of the laminate film 2 on the center line of the negative electrode lead 12 and the negative electrode lead 12. Therefore, a step is provided between the heat-sealed portion in the end portion of the negative electrode lead 12 and the heat-sealed portion on the center line of the negative electrode lead 12, and convex portion 4 is formed so that the heat-sealed portion in the end portion of the negative electrode lead 12 is convex in the direction of the outer resin layer 2b.

Therefore, since the thickness of the resin layer 2d in the respective end portions of the positive electrode lead 11 and the negative electrode lead 12 in which burrs form easily, can be thickened to a sufficient degree to embed the burr in the resin layer 2d, it is possible to make it difficult for short circuits to occur due to the burrs.

It is preferable that the convex portion 4 of the heat-sealed portion including the end portion of the positive electrode lead 11 and the convex portion 4 of the heat-sealing portion including the end portion of the negative electrode lead 12 be provided on the surface side of at least one of the positive electrode lead 11 and the negative electrode lead 12. In other words, as shown in FIG. 3A, the convex portion 4 may be formed so as to be convex in one direction, or, as shown in FIG. 3B, the convex portion 4 may also be formed so as to be convex in the direction of both sides.

Furthermore, the burrs of the end portions of the positive electrode lead 11 and the negative electrode lead 12, often occur in the cut direction of the metal plate when the positive electrode lead 11 and the negative electrode lead 12 are cut from a metal plate. For this reason, it is preferable that the convex portion 4 of the heat-sealed portion including the respective end portions of the positive electrode lead 11 and the negative electrode lead 12 and, as shown in FIG. 3A, be at least provided on the surface side of the burr formation direction of the positive electrode lead 11 and the negative electrode lead 12. In this case, it is necessary to adjust so that the convex portion 4 is formed on the surface of the burr formation direction of the positive electrode lead 11 and the negative electrode lead 12.

Figure 4:
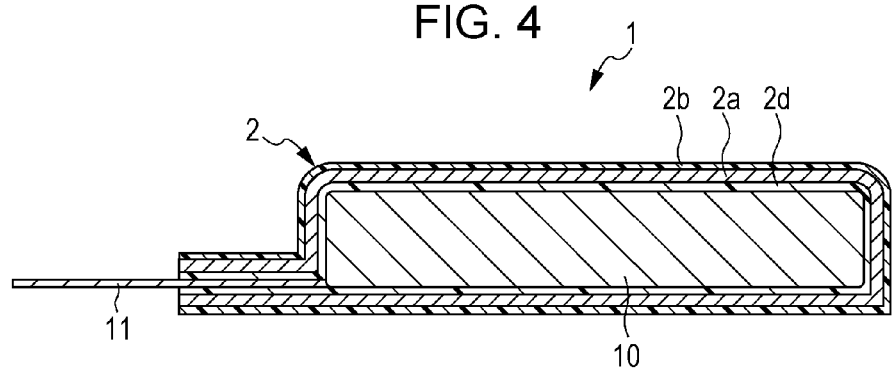
FIG. 4 is a cross-sectional view showing a configuration example of a non-aqueous electrolyte battery according to the first embodiment.

Furthermore, the non-aqueous electrolyte battery 1 according to an embodiment of the present disclosure, as shown in FIG. 4 (cross-sectional view taken along the line IV-IV of FIG. 1B), is often of a configuration where the lead derivation portion is continuous with one on the main surfaces of the non-aqueous electrolyte battery 1, and, in the thickness direction of the lead derivation portion, a space portion part of an approximately same thickness as the wound electrode body 10. By setting the surface of the burr formation direction of positive electrode lead 11 and the negative electrode lead 12 to the above described space portion side, and forming the convex portion 4 of the heat-sealing portion to be convex in the direction of the above described space portion, the non-aqueous electrolyte battery 1 can be formed in a smooth state without causing irregularities in the appearance of the non-aqueous electrolyte battery 1, which is preferable.

On the other hand, when the convex portion 4 of the heat-sealed portion is provided in the both side direction of the positive electrode lead 11 and the negative electrode lead 12, in a configuration where the lead derivation portion is provided so as to be continuous with one of the main surfaces of the wound electrode body 10, irregularities occur in the appearance of the non-aqueous electrolyte battery 1. However, since it is not necessary to check the formation surface of the burr of the positive electrode lead 11 and the negative electrode lead 12, the convex portion formation process becomes easy, which is preferable.

The convex portion 4 which is provided in a portion opposed to the positive electrode lead 11 when the thickness of the resin layer 2d in the end portions of the positive electrode lead 11 is Tc1, and the thickness of the resin layer 2d on the center line of the width direction of the positive electrode lead 11 is Tc2, it is preferable to form the convex portion 4 such that $1.1 \leq Tc1/Tc2 \leq 11$, and preferably $1.2 \leq Tc1/Tc2 \leq 10$.

Figure 5A:
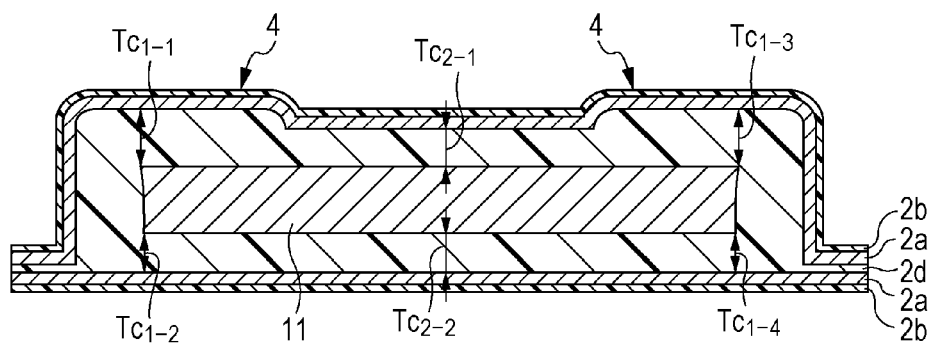
FIGS. 5A and 5B are cross-sectional views showing the position to measure the thickness of the resin layer in the positive electrode lead derivation portion of the non-aqueous electrolyte battery according to an embodiment of the present disclosure.

The thickness Tc1 of the Resin layer 2d in the end portions of the positive electrode lead 11, as shown in FIG. 5A, is the average of measuring the distance between the positive electrode lead 11 surface and the metal layer 2a of the laminate film 2 in four locations on a line which is orthogonal to both end portions of the positive electrode lead 11 as the thickness of the resin layer 2d. In other words, when the thicknesses of the resin layer 2d in the four locations shown in FIG. 5A are respectively $Tc_{1-1}$, $Tc_{1-2}$, $Tc_{1-3}$, and $Tc_{1-4}$, the thickness Tc1 of the resin layer 2d in the end portions of the positive electrode lead 11 is represented by the formula below.

$$Tc1 = (Tc_{1-1} + Tc_{1-2} + Tc_{1-3} + Tc_{1-4})/4$$

Figure 5B:
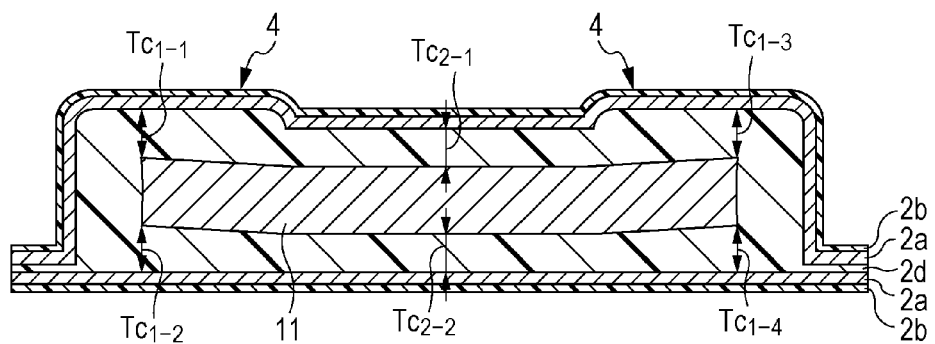

In addition, as shown in FIG. 5B, in the step of forming the convex portion 4, The central portion of the positive electrode lead 11 is pressed with a power stronger than both end portions of the positive electrode lead 11, And a case in which both end portions of the positive electrode lead 11 are bent slightly can also be considered. Similarly, in this case, the thickness Tc1 of the resin layer 2d can be calculated as the average of the thickness of the resin layer 2d at four locations. At this time, as shown in FIG. 5B, based on the main surface of one side of the positive electrode lead 11 (the lower surface of the pressing direction, for example), on the vertical line that intersects with the main surface, the thickness Tc1 of the resin layer 2d in the end portions of the positive electrode lead 11 from the thicknesses $Tc_{1-1}$, $Tc_{1-2}$, $Tc_{1-3}$, and $Tc_{1-4}$, of the resin layer 2d of the respective locations is obtained. Furthermore, the method of calculating the thickness of the resin layer 2d is the same in both end portions of and on the center line of the negative electrode lead 12.

The thickness Tc2 of the Resin layer 2d on the center line of the width direction of the positive electrode lead 11, as shown in FIGS. 5A and 5B, is the average of measuring the distance between the positive electrode lead 11 surface and the metal layer 2a of the laminate film 2 in two locations on a line which is orthogonal to the center line of the width direction of the positive electrode lead 11 as the thickness of the resin layer 2d. In other words, when the thicknesses of the resin layer 2d in the two locations shown in FIGS. 5A and 5B are respectively $Tc_{2-1}$, and $Tc_{2-2}$, the thickness Tc2 of the resin layer 2d in the center line of the width direction of the positive electrode lead 11 is represented by the formula below.

$$Tc2=(Tc_{2-1}+Tc_{2-2})/2$$

When the value of Tc1/Tc2 is small outside the above described scope, there are concerns that the burr is not sufficiently buried in the resin layer 2d which was formed by the inner resin layer 2c solidifying after melting and short circuiting will occur easily. In addition, when the value of Tc1/Tc2 is large outside the above described scope, there are concerns that the resin layer 2d will become thinner in the heat-sealed portion other than the heat-sealed portion including the end portions of the positive electrode lead 11, and the sealing properties of the non-aqueous electrolyte battery 1 will be lowered.

The convex portion 4 which is provided in a portion opposed to the negative electrode lead 12 when the thickness of the resin layer 2d between the metal layer 2a and the negative electrode lead 12 in the end portions of the negative electrode lead 12 is Ta1, and the thickness of the resin layer 2d between the metal layer 2a and negative electrode lead 12 on the center line of the width direction of the negative electrode lead 12 is Ta2, it is preferable to form the convex portion 4 such that $1.1 \leq Ta1/Ta2 \leq 11$, and preferably $1.2 \leq Ta1/Ta2 \leq 10$.

The thickness Ta1 of the resin layer 2d in the end portion of the negative electrode lead 12, in the same manner as Tc1 described above, is the average of the thickness of the resin layer 2d of four measured locations in the end portion of the negative electrode lead 12. In other words, when the thicknesses of the resin layer 2d in the end portion of the negative electrode lead 12 are respectively $Ta_{1-1}$, $Ta_{1-2}$, $Ta_{1-3}$, and $Ta_{1-4}$, the thickness Ta1 of the resin layer 2d in the end portion of the negative electrode lead 12 is represented by the formula below. $Ta_{1-1}$, $Ta_{1-2}$, $Ta_{1-3}$, and $Ta_{1-4}$, are respectively the thicknesses at the same locations as the thicknesses $Tc_{1-1}$, $Tc_{1-2}$, $Tc_{1-3}$, and $Tc_{1-4}$ of the resin layer 2d in the end portions of the positive electrode lead 11 of FIGS. 5A and 5B.

$$Ta1=(Ta_{1-1}+Ta_{1-2}+Ta_{1-3}+Ta_{1-4})/4$$

The thickness Ta2 of the resin layer 2d on the center line of the width direction of the negative electrode lead 12, in the same manner as Tc2 described above, is the average of the thickness of the resin layer 2d on the line intersecting the center line of the width direction of the negative electrode lead 12. In other words, when the thicknesses of the resin layer 2d on the center line of the negative electrode lead 12 are respectively $Ta_{2-1}$, and $Ta_{2-2}$, the thickness Ta2 of the resin layer 2d on the center line of the width direction of the negative electrode lead 12 is represented by the formula below. $Ta_{2-1}$, and $Ta_{2-2}$ are respectively the thicknesses at the same locations as the thicknesses $Tc_{2-1}$, and $Tc_{2-2}$ of the resin layer 2d on the center line of the positive electrode lead 11 of FIGS. 5A and 5B.

$$Ta2=(Ta_{2-1}+Ta_{2-2})/2$$

When the value of Ta1/Ta2 is small outside the above described scope, there are concerns that the burr is not sufficiently buried in the resin layer 2d of the convex portion 4 which was formed by the inner resin layer 2c solidifying after melting and short circuiting will occur easily. In addition, when the value of Ta1/Ta2 is large outside the above described scope, there are concerns that the resin layer 2d will become thinner in the heat-sealed portion other than the heat-sealed portion including the end portions of the negative electrode lead 12, and the sealing properties of the non-aqueous electrolyte battery 1 will be lowered.

The thickness Tc2 of the resin layer 2d on the center line of the width direction of the positive electrode lead 11 and the thickness Ta2 of the resin layer 2d on the center line of the width direction of the negative electrode lead 12, are preferably from 5 μm to 50 μm, respectively. When the value of Tc2 and Ta2 is small outside the above described scope, there are concerns that the sealing properties of the non-aqueous electrolyte battery 1 will be lowered. In addition, when the value of Tc2 and Ta2 is large outside the above described scope, there are concerns that moisture will easily penetrate the inner portion of the non-aqueous electrolyte battery 1 through the resin layer 2d. Furthermore, there are concerns that the resin layer 2d in both end portions of the positive electrode lead 11, the burrs are not buried to a sufficient extent, and short circuiting will occur easily.

The width of the convex portion 4 of the heat-sealed portion that is provided to each location including the end portions of the positive electrode lead 11 and the end portions of the negative electrode lead 12 is preferably 0.6 mm or more. This is because the smaller the width of the convex portion 4 outside the above described range, the burr may not be sufficiently buried. In addition, the upper limit of the width of the convex portion 4, is preferably adjusted appropriately according to the size (in particular, the width of the positive electrode lead 11 and the negative electrode lead 12) of the non-aqueous electrolyte battery 1. Specifically, it is preferable that the convex portion 4 overlaps with the lead in a range of ⅓ or less of the lead width from the lead end portion. This is because, when the width of the convex portion 4 is large outside the above described range, the inner resin layer 2c melts and flows, the amount of resin flowing into the convex portion 4 increases, and in portions apart from the convex portion 4, the thickness of the resin layer thins and sealability decreases.

The convex portion 4 is divided into a region which overlaps the lead, and a region which does not overlap the lead formed on the outside of the lead. Among the convex portions 4, the width of the region which does not overlap with the lead, is preferably from 0.5 mm to 3.0 mm in the direction of the outside of the lead from the end portion of the lead. In addition, among the convex portions 4, the width of the region which overlaps with the lead, is preferably from 0.1 mm to ⅓ of the width of the lead in the inside direction of the lead from the end portion of the lead. For example, when the non-aqueous electrolyte battery 1 according to an embodiment of the present disclosure is formed with a discharge capacity of a size of from 3 Ah to 50 Ah, it is preferable that the lead width be from 10 mm to 90 mm. For this reason, among the convex portions 4, the width of the region which overlaps with the lead is preferably from 0.5 mm to 30 mm. In other words, in the non-aqueous electrolyte battery 1 of a discharge capacity of from 3 Ah to 50 Ah, it is preferable that the convex portion 4 be from 0.6 mm to 33 mm.

Wound Electrode Body

The configuration of the wound electrode body 10 which is clad by the laminate film 2, will be described in detail below.

Figure 6:
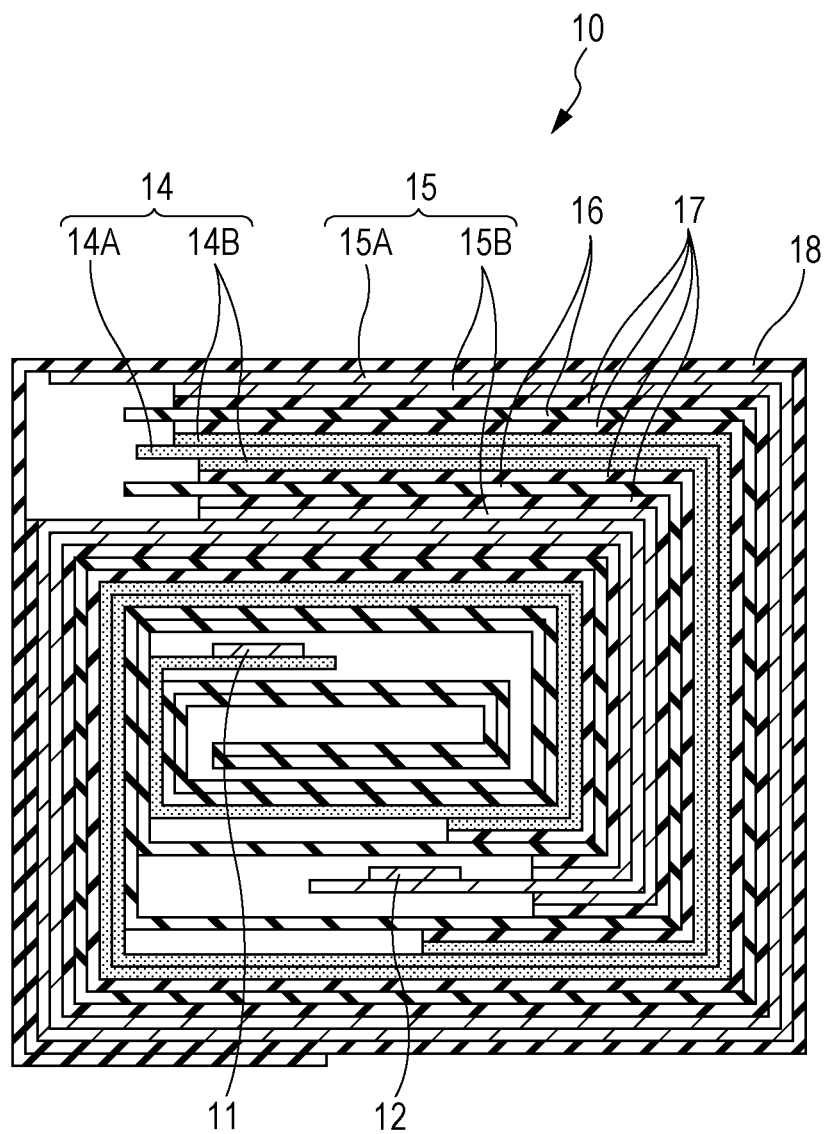
FIG. 6 is a cross-sectional view showing a configuration example of a wound electrode body according to the first embodiment.

FIG. 6 is an example of a cross-sectional structure taken along the line III-III of the wound electrode body 10 shown in FIG. 1A. The wound electrode body 10 is made by laminating and winding the positive electrode 14 and the negative electrode 15 via the separator 16 and the gel electrolyte layer 17, and the outermost periphery is protected by the protective tape 18 as necessary.

Positive Electrode

The positive electrode 14, for example, has a structure in which the positive electrode active material layer 14B is provided on both sides of the positive electrode current collector 14A having a pair of opposing sides. Furthermore, although not shown, a positive electrode active material layer 14B may be provided on only one side of the positive electrode current collector 14A. The positive electrode current collector 14A, for example, is configured by a metal foil such as aluminum foil.

The positive electrode active material layer 14B is configured so as to contain, for example, a positive electrode active material, a conductive agent, and a binder. As the positive electrode active material, the positive electrode active material layer 14B includes one or two or more types of a positive electrode material which is able to occlude and release lithium, and, as necessary, may also contain other materials such as conductive agent and binder.

As a positive electrode material which is able to occlude and release lithium, for example, a lithium-containing compound such as an intercalation compound including lithium oxide, lithium phosphorus oxide, a lithium sulfide, or lithium is suitable, and a mixture of two types or more of these may be used. In order to increase the energy density, a lithium-containing compound containing lithium, a transition metal element, and oxygen(O) is preferable. As such a lithium-containing compound, for example, a lithium composite oxide having a layered rock salt type structure shown in (Chem. I), a lithium phosphate complex having an olivine-type structure shown in (Chem. II), and the like may be exemplified. As the lithium-containing compound, as a transition metal element, it is more preferable if at least one among a group configured of cobalt (Co), nickel (Ni), manganese (Mn), and iron (Fe) is included. As such a lithium-containing compound, for example, a lithium composite oxide having a layered rock salt type structure shown in (Chem. III), (Chem. IV) or (Chem. V), a lithium composite oxide having a structure of spinel type shown in (Chem. VI), or a lithium phosphate complex salt having a structure of an olivine-type shown in (Chem. VII) and the like can be exemplified, and specifically may be $LiNi_{0.50}Co_{0.20}Mn_{0.30}O_2$, $Li_aCoO_2$ (a≈1), $Li_bNiO_2$ (b≈1), $Li_{c1}Ni_{c2}Co_{1-c2}O_2$ (c1≈1, 0<c2<1), $Li_dMn_2O_4$ (d≈1), $Li_eFePO_4$ (e≈1), or the like.

$$Li_pNi_{(1-q-r)}Mn_qM1_rO_{(1-y)}X_z \qquad \text{Chem. I}$$

(In the formula, M1 indicates at least one of the elements selected from group 2 to group 15 except for, nickel (Ni), manganese (Mn). X represents at least one of the elements of the group 16 elements other than oxygen (O) and the group 17 elements. p, q, y, and z are values within the range of, 0≤p≤1.5, 0≤q≤1.0, 0≤r≤1.0, −0.10≤y≤0.20, 0≤z≤0.2.)

$$Li_aM2_bPO_4 \qquad \text{Chem. II}$$

(In the formula, M2 indicates at least one of the elements selected from group 2 to group 15, where a and b are values in the range of 0≤a≤2.0, 0.5≤b≤2.0.)

$$Li_jMn_{(1-g-h)}Ni_gM3_hO_{(1-j)}F_k \qquad \text{Chem. III}$$

(In the formula, M3 represents at least one of the groups selected from cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). f, g, h, j, and k are values in the range of 0.8≤f≤1.2, 0<g<0.5, 0≤h≤0.5, g+h<1, −0.1≤j≤0.2, 0≤k≤0.1. Furthermore, the composition of lithium changes according to the state of charge and discharge, and the value of f represents the value in a fully discharged state.)

$$Li_mNi_{(1-n)}M4_nO_{(1-p)}F_q \qquad \text{Chem. IV}$$

(In the formula, M4 represents at least one of the groups selected from cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). m, n, p and q are values in the range 0.8≤m≤1.2, 0.005≤n≤0.5, −0.1≤p≤0.2, 0≤q≤0.1. Furthermore, the composition of lithium changes according to the state of charge and discharge, and the value of m represents the value in a fully discharged state.)

$$Li_rCo_{(1-s)}M5_sO_{(1-t)}F_u \qquad \text{Chem. V}$$

(In the formula, M5 represents at least one of the groups selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). r, s, t and u are values in the range 0.8≤r<1.2, 0≤s<0.5, −0.1≤t≤0.2, 0≤u≤0.1. Furthermore, the composition of lithium changes according to the state of charge and discharge, and the value of r represents the value in a fully discharged state.)

$$Li_vMn_{(1-w)}M6_wO_xF_y \qquad \text{Chem. VI}$$

(In the formula, M6 represents at least one of the groups selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). v, w, x and y are values in the range 0.9≤v≤1.1, 0≤w≤0.6, 3.7≤x≤4.1, 023 y≤0.1. Furthermore, the composition of lithium changes according to the state of charge and discharge, and the value of v represents the value in a fully discharged state.)

$$Li_zM7PO_4 \qquad \text{Chem. VII}$$

(In the formula, M7 represents at least one of the groups selected from cobalt (Co), manganese (Mn), iron (Fe), nickel (Ni), magnesium (Mg), aluminum (Al), boron (B), titanium (Ti), vanadium (V), the and niobium (Nb), copper (Cu), zinc (Zn), molybdenum (Mo), calcium (Ca), strontium (Sr), tungsten (W), and zirconium (Zr). z is a value in the range of 0.9≤z≤1.1. Furthermore, the composition of lithium changes according to the state of charge and discharge, and the value of z represents the value in a fully discharged state.)

Furthermore, from the viewpoint of being able to obtain higher electrode filling properties and cycle characteristics, the surface of the core particles formed of one of the lithium-containing compounds, may be composite particles which were coated with fine particles formed of any one of other lithium-containing compounds.

In addition, as a positive electrode material which is able to occlude and release lithium, for example, oxide, disulfide, chalcogenide, conductive polymer, and the like may be exemplified. The oxide is, for example, vanadium oxide ($V_2O_5$), titanium dioxide ($TiO_2$), manganese dioxide ($MnO_2$), or the like. The disulfide is, for example, iron disulfide ($FeS_2$), titanium disulfide ($TiS_2$), molybdenum disulfide ($MoS_2$), or the like. The chalcogenide compound is, in particular, preferably a layered compound, or a spinel-type compound, for example, niobium selenide ($NbSe_2$), and the like. The conductive polymer is, for example, sulfur, polyaniline, polythiophene, polyacetylene, polypyrrole, or the like. Of course, the positive electrode material may be something other than the above. In addition, the series of positive electrode materials described above may be mixed in an arbitrary combination of two or more kinds.

In addition, carbon materials and the like such as, for example, carbon black or graphite are used as the conductive agent. At least one type selected from, for example, resin materials such as, for example, polyvinylidene fluoride (PVdF), polytetrafluoroethylene (PTFE), polyacrylonitrile (PAN), styrene-butadiene rubber (SBR), and carboxymethyl cellulose (CMC), as well as a copolymer or the like based on these resins, is used as the binder.

Negative Electrode

The negative electrode 15, for example, has a structure in which the negative electrode active material layer 15B is provided on both sides of the negative electrode current collector 15A having a pair of opposing sides. Furthermore, although not shown, a negative electrode active material layer 15B may be provided on only one side of the negative electrode current collector 15A. The negative electrode current collector 15A, for example, is configured by a metal foil such as aluminum foil.

As the negative electrode active material, the negative electrode active material layer 15B is configured including one or two or more types of a negative electrode material which is able to occlude and release lithium, and, as necessary, may also contain other materials such as conductive agent and binder the same as in the positive electrode active material layer 14B.

Furthermore, in the non-aqueous electrolyte battery 1, the electrochemical equivalent of the negative electrode material, which is able to occlude and release lithium, is larger than the electrochemical equivalent of the positive electrode 14, and theoretically, lithium metal is not deposited on the negative electrode 15 while charging.

In addition, as a negative electrode material which is able to occlude and release lithium, for example, a carbon material such as, non-graphitizable carbon, graphitizable carbon, graphite, pyrolytic carbon, coke, glassy carbon, organic polymer compound fired body, carbon fiber, or activated carbon may be exemplified. Of these, the coke is pitch coke, needle coke, petroleum coke, or the like. The organic polymer compound fired body is carbonized by firing polymeric materials such as phenol resin or furan resin at an appropriate temperature, and some are classified as non-graphitizable carbon or graphitizable carbon. In these carbon materials, the changes in crystal structure which occur when charging and discharging are extremely small, a high charge-discharge capacity may be obtained and favorable cycle characteristics may be obtained, therefore making these carbon materials preferable. In particular, graphite is preferable since the electrochemical equivalent is large and a high energy density can be obtained. In addition, since in the non-graphitizable carbon, superior cycle characteristics can be obtained it is preferable. Furthermore, since the charge and discharge potential is low, specifically, a charge and discharge potential close to lithium metal can easily realize high energy density batteries, it is preferable.

In addition, as a negative electrode material which is able to occlude and release lithium, a material is exemplified which includes, as constituent elements, at least one of a metal element and a metalloid element which are able to occlude and release lithium. This is because by using such a material, it is possible to obtain high energy density. In particular, when used together with a material like carbon, along with obtaining high energy density, excellent cycle characteristics may be obtained, therefore it is preferable. This negative electrode material may be a singular, an alloy, or a compound of the metallic elements or the metalloid elements, and it may also have a phase of one or two or more kinds of these in at least part of itself. Furthermore, in the present disclosure, in addition to the alloy formed from two or more metal elements, an alloy which includes one or more metal elements and one or more metalloid elements is also included. In addition, it may also contain a nonmetallic element. The structure of the alloy may be a solid solution, eutectic (eutectic mixture), an intermetallic compound or an alloy in which two or more of these coexist.

As a metal element or a metalloid element which configure the negative electrode material, for example, a metal element or a metalloid element which are able to form lithium and an alloy can be exemplified. Specifically, magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), or the like may be exemplified. These may also be crystalline or amorphous.

As a negative electrode material, for example, a material which includes, as a constituent element, lithium titanate ($Li_4Ti_5O_{12}$), or a metal element or a metalloid element of group 4B in the periodic table is preferable, more preferably, a material which includes, as a constituent element, at least one of silicon (Si) and tin (Sn), and particularly preferably a material which includes at least silicon (Si). This is because silicon (Si) and tin (Sn) have a great ability to occlude and release lithium and it is possible to obtain high energy density. As a negative electrode material having at least one of silicon and tin, for example, a singular, an alloy, or a compound of silicon, a singular, an alloy, or a compound of tin, a material having a phase of one or two or more kinds of these in at least part of itself.

As an alloy of silicon, for example, as a second constituent element other than silicon, an alloy containing at least one group selected from tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr) can be exemplified. As an alloy of tin, for example, as a second constituent element other than tin, an alloy containing at least one group selected from tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr) can be exemplified.

As a compound of tin (Sn) or a compound of silicon (Si), for example, a compound including oxygen (O), or carbon (C) may be exemplified, or in addition to the tin (Sn) or the silicon (Si), in the above described second constituent element may also be included.

In particular, as the negative electrode material, an SnCoC-containing material is preferable in which, cobalt (Co), tin (Sn), and carbon (C) are included as constituent elements, the carbon content is from 9.9 mass % to 29.7 mass %, proportion of cobalt (Co) to the total of tin (Sn) and cobalt (Co) is from 30 mass % to 70 mass %. In such a composition range, along with obtaining high energy density, excellent cycle characteristics may be obtained, therefore it is preferable.

This SnCoC-containing material may also further include other constituent elements if necessary. As another constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), or bismuth (Bi) is preferable, but two or more may also be included. This is because it is possible to further improve the capacity or cycle characteristics.

Furthermore, it is preferable that this SnCoC-containing material has a phase containing tin (Sn), cobalt (Co), and carbon (C), and has a structure with a low crystallinity or is amorphous. In addition, in this SnCoC-containing material, it is preferable that at least part of the carbon (C), which is a constituent element, is bonded with the metal element or the metalloid element which is the other constituent element. It may be considered that the reduction in cycle characteristics is caused by aggregation or crystallization of the tin (Sn) or the like, and this is because it is possible to suppress such aggregation or crystallization by binding carbon (C) with other elements.

As a method of measuring to discover the bonding state of elements, for example, X-ray photoelectron spectroscopy (XPS) can be exemplified. In XPS, the peak of the is orbit (C is) of carbon, if graphite, appears at 284.5 eV in the equipment that is energy calibrated such that a peak of the 4f orbit (Au4f) of a gold atom is 84.0 eV. In addition, if there is carbon surface contamination, the peak appears at 284.8 eV. Conversely, when the charge density of carbon element increases, for example, when the carbon is bonded to the metal element or the metalloid element, the peak of C1s appears at a region lower than 284.5 eV. In other words, when the peak of the composite wave of the C1s obtained in the SnCoC-containing material appears in a region that is lower than 284.5 eV, at least part of the carbon contained in the SnCoC-containing material is bound to the metal element or the metalloid element which is another constituent element.

Furthermore, in the XPS measurement, for the correction of the energy axis of the spectrum, for example, the peak of the C1s is used. Typically, since there is a presence of carbon surface contamination in the surface, the peak of the carbon surface contamination C1s is set to 284.8 eV and this is set to the energy standard. In the XPS measurements, since the waveform of the peak of C1s is obtained as a shape containing the peak of carbon of the peak of the carbon surface contamination and the SnCoC-containing material, for example, by analyzing using commercially available software, the waveform of the peak of C1s is separated into a peak of the surface contamination carbon and a peak of the carbon in the SnCoC-containing material. In the analysis of the waveform, the location of the main peaks present in the lowest binding energy side are set to the energy standard (284.8 eV).

Separator

The separator 16, isolates the positive electrode 14 and the negative electrode 15, allows lithium ions to pass through while preventing short circuiting of the current due to contact of the electrodes. This separator 16, for example, is configured by a porous membrane made of a synthetic resin formed of a polyolefin resin, or a porous membrane made of ceramic, and may be of a structure in which a porous film is laminated with two or more of these.

The separator 16 is preferably formed from one of polyethylene (PE), polypropylene (PP), and polytetrafluoroethylene (PTFE). In addition, the separator 16 may also be a porous membrane formed from resin material of a mixture of two or more of polyethylene (PE), polypropylene (PP), polyvinylidene fluoride (PVdF), and polytetrafluoroethylene (PTFE). In addition, the separator 16 is configured by a porous membrane made of ceramic, and may also be a porous membrane of a mixture of two or more of polyethylene (PE), polypropylene (PP), and polytetrafluoroethylene (PTFE).

Furthermore, on the surface of the porous membrane of polyethylene (PE), polypropylene (PP), polytetrafluoroethylene (PTFE), a layer of a mixture of ceramics such as polyvinylidene fluoride (PVdF), alumina ($Al_2O_3$), silica zirconia ($ZrO_2$), a layer of a mixture of ceramics such as titania ($TiO_2$) and magnesia (MgO) may be provided. In addition, the separator 16 may also be a structure in which a porous film of two or more of polyethylene (PE), polypropylene (PP), and polytetrafluoroethylene (PTFE) is laminated. The porous membrane made of polyolefin is preferable because it has an excellent short circuiting prevention effect, and it is possible to improve the safety of the battery due to the shut down effect.

Gel Electrolyte Layer

The gel electrolyte layer 17, the non-aqueous electrolyte solution which includes an electrolyte salt, and a non-aqueous solvent for dissolving the electrolyte salt is held in the polymer compound. The gel electrolyte is preferable because a high ionic conductivity can be obtained, and it is possible to prevent leakage of the battery.

The electrolyte salt, for example, contains one or two or more light metal salts such as lithium salt. As the lithium salt, for example, Lithium phosphate hexafluoride ($LiPF_6$), lithium borate tetrafluoride ($LiBF_4$), lithium perchlorate ($LiClO_4$), lithium arsenate hexafluoride ($LiAsF_6$), Lithium tetraphenyl borate ($LiB(C_6H_5)_4$), methane sulfonic acid lithium ($LiCH_3SO_3$), lithium trifluoromethanesulfonate ($LiCF_3SO_3$), Lithium tetrachloro aluminate ($LiAlCl_4$), two lithium silicate hexafluoride ($Li_2SiF_6$), lithium chloride (LiCl), or lithium bromide (LiBr) can be exemplified. In particular, at least one group formed from lithium phosphate hexafluoride ($LiPF_6$), lithium borate tetrafluoride ($LiBF_4$), lithium perchlorate ($LiClO_4$), lithium arsenate hexafluoride ($LiAsF_6$) is preferable, and lithium phosphate hexafluoride ($LiPF_6$) is more preferable. This is because the resistance of the non-aqueous electrolyte is reduced. In particular, it is preferable to use of lithium borate tetrafluoride ($LiBF_4$) together with lithium phosphate hexafluoride ($LiPF_6$). This is because a high effect is obtained.

As a non-aqueous solvent, it is possible to use for example, carbonate ester solvents such as ethylene carbonate (EC), propylene carbonate (PC), butylene carbonate (BC), vinylene carbonate (VC), dimethyl carbonate (DMC), diethyl carbonate (DEC), ethyl methyl carbonate (EMC), or methyl propyl carbonate(MPC), lactone-based solvents such as γ-butyrolactone, γ-valerolactone or ε-caprolactone, ether solvents such as 1,2-dimethoxyethane, tetrahydrofuran, 2-methyl tetrahydrofuran, tetrahydropyran, 1,3-dioxolane, 4-methyl-1,3-dioxolane, 1,3-dioxane, or 1,4-dioxane, ester solvents such as methyl acetate, ethyl acetate, methyl propionate, ethyl propionate, methyl butyrate, methyl isobutyrate, methyl acetate trimethyl, or trimethyl ethyl acetate nitrile solvents such as acetonitrile, glutaronitrile nitrile, adiponitrile, methoxy acetonitrile, 3-methoxypropionitrile, Amide solvents such as N,N-dimethyl formamide, N-methylpyrrolidinone, N-methyl oxazolidinone, or N,N'-dimethyl imidazolidinone, nitro solvents such as nitromethane or nitroethane, ester phosphate solvents such as sulfolane, or trimethyl phosphate, or dimethyl sulfoxide and the like. This is because, in an electrochemical device such as a battery provided with non-aqueous electrolyte, it is possible to obtain excellent capacity, cycle characteristics and storage characteristics. These may be used alone, or a mixture of plural types may be used.

In particular, it is preferable to use a non-aqueous solvent containing at least one of the carbonic ester solvents. This is because a sufficient effect is obtained. In this case, in particular, it is preferable to use a non-aqueous solvent containing a mixture of a cyclic carbonate such as an ethylene carbonate or a propylene carbonate which is a high-viscosity (high dielectric constant) solvent (for example, 30 relative permittivity), and a chain carbonate such as a dimethyl carbonate, a diethyl carbonate or an ethyl methyl carbonate which is a Low-viscosity solvent (for example, viscosity 1 mPa·s). This is because, due to dissociation of the electrolyte salt and the mobility of ions increasing, a high effect is obtained. In addition, it is preferable that as a non-aqueous solvent, some or all of the hydrogen of the cyclic carbonate or the chain carbonate contain a fluorinated compound. As the fluorinated compound, it is preferable to use least one of fluoro ethylene carbonate (4-fluoro-1,3-dioxolan-2-one) and difluoroethylene carbonate (4,5-difluoro-1,3-dioxolan-2-one).

As the polymer compound, for example, a polymeric material that is soluble in the non-aqueous solvent is used. Specifically, silicon gel, acrylic gel, acrylonitrile gel, polyphosphazene modified polymer, polyethylene oxide, polypropylene oxide, and complex polymers, cross-linked polymers, modified polymers, and the like of these are used. In addition, as the fluorine polymer, polymers such as a copolymer containing repeat units of polyvinylidene fluoride (PVdF), vinylidene fluoride (VdF), and hexafluoropropylene (HFP), and, a copolymer containing repeat units of vinylidene fluoride (VdF) and trifluoroethylene (TFE) can be exemplified. Such polymers may be used alone, or a mixture of two types or more may be used.

Furthermore, in FIG. 6, a configuration in which a gel electrolyte layer 17 is formed is disclosed, the non-aqueous electrolyte battery 1 where the separator 16 is impregnated with non-aqueous electrolyte may also be used.

1-2 First Manufacturing Method of Non-Aqueous Electrolyte Battery

The non-aqueous electrolyte battery 1 as described above can be manufactured by the first manufacturing method as follows. In the first manufacturing method, a manufacturing method of the case of forming a gel electrolyte layer will be described.

Manufacturing Method of Positive Electrode

A paste positive electrode mixture slurry is manufactured by mixing the positive electrode active material, the conductive agent, and the binder to prepare a positive electrode mixture, and dispersing this positive electrode mixture to prepare a positive electrode material in a solvent such as N-methyl-2-pyrrolidone. Next the positive electrode 14 is prepared by applying the positive electrode mixture slurry to the positive electrode current collector 14A, drying the solvent, and forming a positive electrode active material layer 14B by compression molding in a roll press machine or the like.

Manufacturing Method of Negative Electrode

A paste negative electrode mixture slurry is manufactured by mixing the negative electrode active material and the binder to prepare a negative electrode mixture, and dispersing this negative electrode mixture to prepare a negative electrode material in a solvent such as N-methyl-2-pyrrolidone. Next the negative electrode 15 is prepared by applying the negative electrode mixture slurry to the negative electrode current collector 15A, drying the solvent, and forming a positive electrode active material layer 15B by compression molding in a roll press machine or the like.

Preparation of Gel Electrolyte Precursor Solution

The non-aqueous electrolyte in which an electrolyte salt is dissolved in a non-aqueous solvent, is mixed with a polymer compound, and a solvent mixture, and a sol precursor solution is prepared.

Assembly of Non-Aqueous Electrolyte Battery

A gel electrolyte layer 17 is formed by applying the precursor solution described above to both sides of each of the positive electrode 14 and the negative electrode 15 which were prepared in the above described manner, and evaporating the solvent mixture. Next, after making the positive electrode 14 and the negative electrode 15, in which the gel electrolyte layer 17 is formed, a laminated body by laminating via the separator 16, the laminated body is wound in the longitudinal direction in a flat manner, protective tape 18 is adhered to the wound end portion, and the wound electrode body 10 is formed. Subsequently, for example, the wound electrode body 10 is interposed between the laminated film 2, under reduced pressure, the laminated film 2 of the outer edge of the wound electrode body 10 is adhered using heat-sealing and is sealed. At this time, in sides other than the lead derivation side, for example, the laminate films 2 are heat-sealed to each other using a heater block of a pair of flat surfaces. In addition, in the lead derivation side, the laminated films 2 are heat-sealed to each other using a heater block having a cutout portion on the surface.

Figure 7:
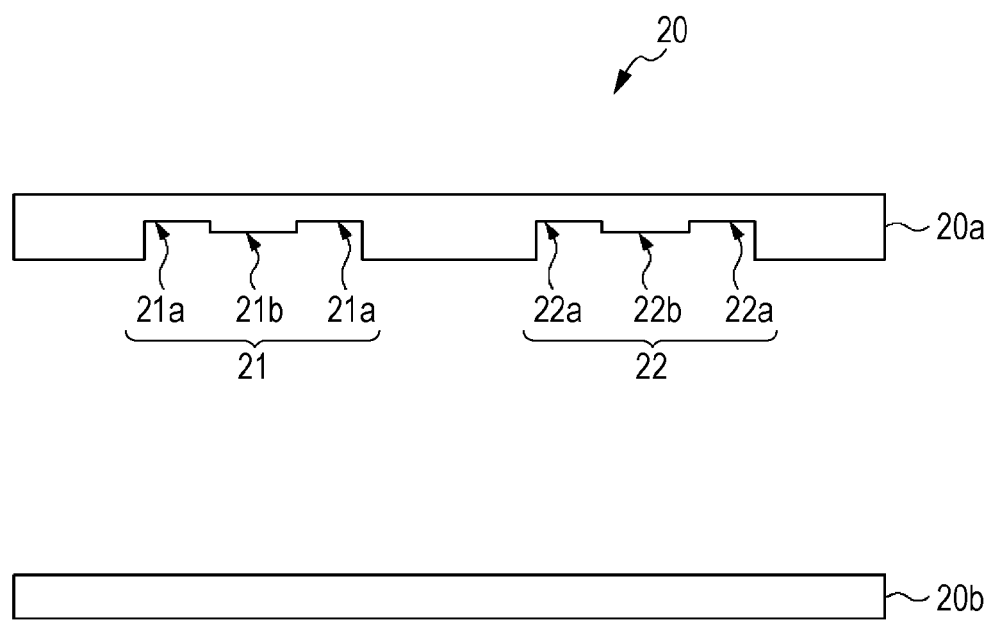
FIG. 7 is a cross-sectional view showing a configuration example of a heater block which performs heat-sealing of the lead derivation portion of the non-aqueous electrolyte battery according to an embodiment of the present disclosure.

FIG. 7 is a cross-sectional view of a pair of heater blocks 20 which are formed from heater block 20a having predetermined cutouts for heat-sealing the laminated films 2 to each other in the lead derivation side, and heater block 20b which has a flat surface. As shown in FIG. 7, the heater block 20a is provided with, on one side, a positive electrode side cutout portion 21 and a negative electrode side cutout portion 22. The positive electrode side cutout portion 21 and the negative electrode side cutout portion 22, are respectively provided at the positions of the positive electrode lead 11 and the negative electrode lead 12.

The positive side cutouts 21 provided in the heater block 20a are provided with, two cutout portions 21a which are respectively provided in a portion opposite a region including both end portions of the positive electrode lead 11, and the cutout portion 21b which is formed shallower than the cutout portions 21a which are provided so as to include center line of the positive electrode lead 11 between the two cutout portions 21a. The pair of cutout portions 21a are respectively provided in a portion opposite a region including both end portions of the positive electrode lead 11 when performing the heat-sealing of the lead derivation side of the non-aqueous electrolyte battery 1.

In addition, the negative side cutout portions 22 provided in the heater block 20a are provided with, two cutout portions 22a which are respectively provided in a portion opposite a region including both end portions of the negative electrode lead 12, and the cutout portion 22b which is formed shallower than the cutout portions 22a which are provided so as to include center line of the negative electrode lead 12 between the two cutout portions 22a. The pair of cutout portions 22a are respectively provided in a portion opposite a region including both end portions of the negative electrode lead 12 when performing the heat-sealing of the lead derivation side of the non-aqueous electrolyte battery 1.

In the positive electrode side cutout portion 21 of the heater block 20a, the depth of the cutout portion 21a is set to Dc1, and when the depth of the cutout portion 21b which is formed shallower than cutout portion 21a and is disposed between the cutout portion 21a is set to Dc2 it is preferable that the depth of the cutout portion 21a be $1.006 \leq Dc1/Dc2 \leq 1.635$, and $1.010 \leq Dc1/Dc2 \leq 1.550$ is more preferable. Therefore, when the thickness Tc1 of the resin layer between the metal layer 2a and the positive electrode lead 11 in the end portions of the positive electrode lead 11, and the thickness Tc2 of the resin layer between the metal layer 2a and the positive electrode lead 11 on the center line in the width direction of the positive electrode lead 11 is $1.1 \leq Tc1/Tc2 \leq 12$, or preferably $1.2 \leq Tc1/Tc2 \leq 10$, the convex portion 4 can be formed.

In the same manner, in the negative electrode side cutout portion 22 of the heater block 20a, the depth of the cutout portion 22a is set to Da1, and when the depth of the cutout portion 22b which is formed shallower than cutout portion 22a and is disposed between the cutout portion 22a is set to Da2 it is preferable that the depth of the cutout portion 22a be $1.006 \leq Da1/Da2 \leq 1.635$, and $1.010 \leq Da1/Da2 \leq 1.550$ is more preferable. Therefore, when the thickness Ta1 of the resin layer between the metal layer 2a and the negative electrode lead 12 in the end portions of the negative electrode lead 12, and the thickness Ta2 of the resin layer between the metal layer 2a and the negative electrode lead 12 on the center line in the width direction of the negative electrode lead 12 is $1.1 \leq Ta1/Ta2 \leq 12$, or preferably $1.2 \leq Ta1/Ta2 \leq 10$, the convex portion 4 can be formed.

It is preferable that the width of the cutout portion 21a of the positive electrode side cutouts 21, and the width of the cutout portion 22a of the negative electrode side cutouts 22, respectively be from 0.6 mm to 33 mm. Therefore, it is preferable that the width of the convex portion 4 of the heat-sealed portion that is provided to each location including the end portions of the positive electrode lead 11 and the end portions of the lead negative electrode 12 be from 0.6 mm to 33 mm Short circuiting caused by burrs can be sufficiently suppressed by setting the cutout portion 22a and the cutout portion 21a to within the above range.

Furthermore, when performing the heat-sealing, the cutout portion 21a of the positive electrode side cutout portion 21 are respectively positioned to straddle both end portions of the positive electrode lead 11, in other words, it is necessary to perform adjustment such that the portion opposite the positive electrode lead 11 and the portion not opposite the positive electrode lead 11 be present in the cutout portion 21a.

The width of the portion opposed to the positive electrode lead 11 among the cutout portions 21a is preferably 0.1 mm or more, and the width of the portion opposed to the positive electrode lead 11 among the cutout portions 21a is preferably ⅓ or less of the width of the positive electrode lead 11. In addition, among the convex portions 4, the width of the portion that does not oppose the positive electrode lead 11 among the cutout portions 21a is preferably from 0.5 mm to 30 mm. When the width of a portion that opposes the positive electrode lead 11 and the portion that does not oppose the positive electrode lead 11 is small outside the range described above, the burr 11a becomes difficult to sufficiently bury in the resin layer 2d of the convex portion 4 formed by the cutout portion 21a. In addition, when the width of a portion that opposes the positive electrode lead 11 and the portion that does not oppose the positive electrode lead 11 is large outside the range described above, there are concerns that too much resin will flows the convex portion 4, the amount of resin of portions other than the convex portion 4 is insufficient, and the sealability decreases.

Similarly, it is necessary to perform adjustment such that the portion opposite the negative electrode lead 12 and the portion not opposite the negative electrode lead 12 be present in the cutout portion 22a of the negative electrode side cutouts 22. The width of the portion that opposes the negative electrode lead 12 among the cutout portions 22a is preferably from 0.1 mm to ⅓ or less of the width of the negative electrode lead 12. In addition, the width of the portion that does not oppose the negative electrode lead 12 among the cutout portions 22a is preferably from 0.5 mm to 3.0 mm. When the width of a portion that opposes the negative electrode lead 12 and the portion that does not oppose the negative electrode lead 12 is small outside the range described above, the burr becomes difficult to sufficiently bury in the resin layer 2d of the convex portion 4 formed by the cutout portion 22a. In addition, when the width of a portion that opposes the negative electrode lead 12 and the portion that does not oppose the negative electrode lead 12 is large outside the range described above, there are concerns that too much resin will flows the convex portion 4, the amount of resin of portions other than the convex portion 4 is insufficient, and the sealability decreases.

Figure 8A:
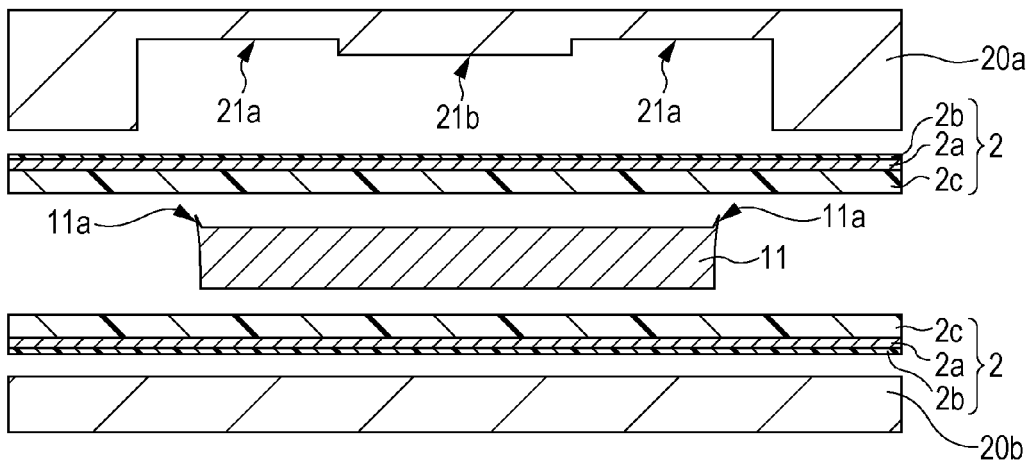
FIGS. 8A, 8B and 8C are cross-sectional views showing a heat-sealing step of the lead derivation portion of the non-aqueous electrolyte battery according to an embodiment of the present disclosure.
Figure 8B:
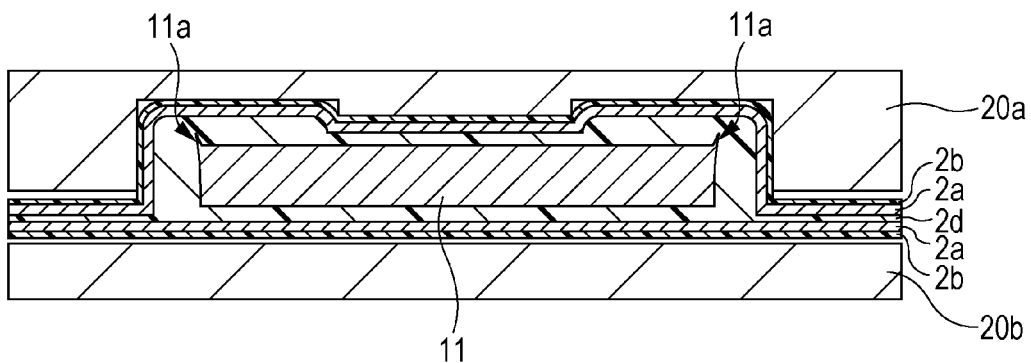
Figure 8C:
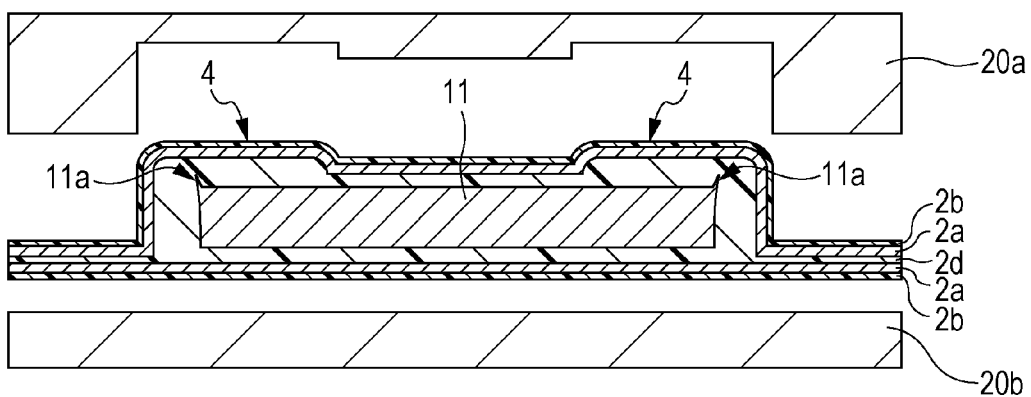

In FIG. 8A to FIG. 8C, using such a heater block 20, such as this, the steps of heat-sealing the derivation lead side are shown. Furthermore, in FIG. 8A to FIG. 8C, only the state of the vicinity of the positive electrode lead 11 is shown. FIG. 8A to FIG. 8C are cross-sectional views showing a case where the positive electrode side cutout portion 21 and the negative electrode side cutout portion 22 are only provided to the heater block 20a, and a heater block 20b with a flat surface is used.

As shown in FIG. 8A, the heater block 20a which is provided with the positive electrode side cutout portions 21 and the negative electrode side cutout portions 22 (not shown), is arranged on one side of the positive electrode lead 11, the heater block 20b with a flat surface is arranged on the other side of the positive electrode lead 11. Subsequently, as shown in FIG. 8B, both sides of the laminate film 2, in which the positive electrode lead 11 is derived, are heated and pressurized by the heater block 20a and the heater block 20b, thereby heat-sealing the laminate films 2 to each other. At this time, the heater block 20a is adjusted such that the positive side cutout portions 21 are opposed to the derivation portion of the positive electrode lead 11, and the cutout portions 21a are in positions to respectively straddle both end portions of the positive electrode lead 11. In addition, the heater block 20a is adjusted such that the negative side cutout portions 22 are opposed to the derivation portion of the negative electrode lead 12, and the cutout portions 22a are in positions to respectively straddle both end portions of the negative electrode lead 12. In addition, when a burr is formed at the end portions of the positive electrode lead 11 and the negative electrode lead 12, it is preferable that burrs be formed opposite the heater block 20a in which the positive electrode side cutout portion 21 and the negative electrode side cutout portion 22 are formed.

Finally, as shown in FIG. 8C, by separating the heater blocks 20a and 20b from each other, the heat-sealed non-aqueous electrolyte battery 1 can be obtained such that the lead derivation side has a desired uneven shape. In the lead derivation side after heat-sealing, the inner resin layers 2c melt, solidify, and are integrally heat-sealed in the portion which does not interpose the positive electrode lead 11 and the negative electrode lead 12. In addition, in the portion which interposes the positive electrode lead 11 and the negative electrode lead 12, the inner resin layer 2c melts, solidifies and is respectively heat-sealed in a close contact state with the positive electrode lead 11 and the negative electrode lead 12. When the adhesion film 13 is inserted between the laminate film 2, the positive electrode lead 11 and the negative electrode lead 12, the inner resin layer 2c and the adhesion film 13 melt, become integral, and are respectively heat-sealed with the positive electrode lead 11 and the negative electrode lead 12.

By sealing the lead derivation edges using the method described above, the inner resin layer 2c of the laminate film 2 is melted, in the portion opposed to the heater block 20a, to fit the shape of the positive electrode cutout portion 21 and the negative electrode side cutout portion 22, inner resin layer 2c melts and solidifies forming the resin layer 2d. In other words, the thickness of the resin layer 2d in both end portions of the positive electrode lead 11, Is formed larger than the thickness of the resin layer 2d on the center line of the positive electrode lead 11. When the adhesion film 13 is provided between the laminate film 2 and the positive electrode lead 11, the resin layer 2d is formed from the molten resin layer in which the inner resin layer 2c after melting and the adhesion film 13 melted and became integral with each other.

Therefore, in the heat-sealing portion of the lead derivation edge, the thickness of the heat-sealing portion in both ends of the positive electrode lead 11, is formed larger than the thickness of the heat-sealing portion on the center line in the width direction of the positive electrode lead 11, and the thickness of the heat-sealing portion in both ends of the negative electrode lead 12, is formed larger than the thickness of the heat-sealing portion on the center line in the width direction of the negative electrode lead 12.

Furthermore, when forming a convex portion 4 according to an embodiment of the present disclosure the non-aqueous electrolyte battery 1 in this manner, it is preferable to use a material in which the growth rate of the inner resin layer 2c as the laminate film 2 is 350% or more. This is because, when the inner resin layer 2c melts and flows, the laminate film 2 can easily follow the shape of the cutouts of the heater block 20a, and it is favorable to form the convex portion 4.

According to the steps described above, the non-aqueous electrolyte battery 1 shown in FIG. 1A, FIG. 1B, FIG. 3A and FIG. 6 is completed. Furthermore, an example was shown where, in the heat-sealing method of the above-mentioned lead derivation side, the positive side cutout portion 21 and the negative side cutout portion 22 are formed on one of the pair of the heater block 20a and the heater block 20b, however the positive electrode side cutout portion 21 and the negative electrode side cutout portion 22 may be formed on both sides of the pair of the heater block 20a and the heater block 20b.

In addition, when the positive electrode lead 11 and the negative electrode lead 12 are derived from different sides to each other, the positive side cutout 21 is provided only to the heater block opposite the positive electrode lead 11, and the negative side cutout portion 22 is provided only to the heater block opposite the negative electrode lead 12.

Furthermore, the gel electrolyte layer 17 may be formed by the following method.

First, the positive electrode 14 and the negative electrode 15 which were prepared as described above are laminated via the separator 16 and wound, the protective tape 18 is adhered to the outermost periphery, and the wound electrode body 10 is formed. Then, the wound electrode body 10 is interposed in the laminate film 2, the outer peripheral edge except for one side is heat-sealed, made into a bag-shape, and is stored inside of the laminate film 2. Subsequently, with the non-aqueous electrolyte, a composition for the electrolyte containing other materials such as a monomer which is a raw material of a polymer compound, a polymerization initiator, and if necessary, a polymerization inhibitor, is prepared and is injected into the interior of the laminate film 2.

After injecting the composition for the electrolyte, the opening portion of the laminate film 2 is heat-sealed and sealed in a vacuum atmosphere. Finally, the sealed portion of the wound electrode body portion 10 is heated while being pressurized, and, by making the monomer in the laminate film 2 the polymer compound by polymerizing, the gel electrolyte layer 17 including non-aqueous electrolyte is formed. According to the steps described above, the non-aqueous electrolyte battery 1 shown in FIG. 1A, FIG. 1B, FIG. 3A and FIG. 6 is completed.

In addition, after preparing the wound electrode body 10 by using the separator 16 which has a polymer compound adhered to the surface thereof, and sealing the wound electrode body 10 together with the non-aqueous electrolyte in the laminated film 2, the gel electrolyte layer 17 including non-aqueous electrolyte may be foamed while applying pressure to the portion in which the wound electrode body portion 10 is sealed. According to the steps described above, the non-aqueous electrolyte battery 1 shown in FIG. 1A, FIG. 1B, FIG. 3A and FIG. 6 is completed.

In a case of using either manufacturing method, in the lead derivation edge of the laminate film 2, the thickness of the heat-sealing portion in both end portions of the positive electrode lead is formed larger than the thickness of the heat-sealing portion on the center line of the positive electrode lead. In addition, in the same manner, the thickness of the heat-sealed portion in both end portions of the negative electrode lead is formed larger than the thickness of the heat-sealing portion on the center line of the negative electrode lead.

1-3 Second Manufacturing Method of Non-Aqueous Electrolyte Battery

In addition, a non-aqueous electrolyte battery may also be manufactured by a second manufacturing method as follows. In the second manufacturing method, a manufacturing method of a case of injecting a non-aqueous electrolyte into a non-aqueous electrolyte battery will be described.

Manufacturing Method of Positive Electrode

The positive electrode 14 can be prepared in the same manner as the first manufacturing method.

Manufacturing Method of Negative Electrode

The negative electrode 15 can be prepared in the same manner as the first manufacturing method.

Preparation of Non-Aqueous Electrolyte

The non-aqueous electrolyte is prepared by dissolving the electrolyte salt in a non-aqueous solvent.

Assembly of Non-Aqueous Electrolyte Battery

After making the positive electrode 14 and the negative electrode 15, which are formed in the manner described above, a laminated body by laminating via the separator 16, the laminated body is wound in the longitudinal direction in a flat manner, protective tape 18 is adhered to the wound end portion, and the wound electrode body 10 is formed. Subsequently, for example, the wound electrode body 10 is interposed between the laminated film 2, the laminated films 2 are adhered to each other using heat-sealing and are sealed in a state derived outside the negative electrode lead 12 and positive electrode lead 11. At this time, by allowing laminate films 2 to fuse to each other except for one side among the outer side portions of the wound electrode body 10, the laminate film 2 is made bag-shaped. The non-heat-sealed side, in the manufacturing process of the non-aqueous electrolyte battery 1, is preferably a side other than the lead derived sides. This is because, after injecting the non-aqueous electrolyte, the process when performing the heat-sealing on the last side becomes easier.

At this time, from between the opposing laminated films 2, In the lead derivation side derived from the positive electrode lead 11 and the negative electrode lead 12, heat sealing is performed using a method similar to the first manufacturing method. Therefore, the thickness of the heat-sealed portion in both end portions of the positive electrode lead is formed larger than the thickness of the heat-sealed portion on the center line of the positive electrode lead. In addition, in the same manner, the thickness of the heat-sealed portion in both end portions of the negative electrode lead is formed larger than the thickness of the heat-sealing portion on the center line of the negative electrode lead. According to the steps described above, the non-aqueous electrolyte battery 1 shown in FIG. 1A, FIG. 1B, FIG. 3A and FIG. 6 is completed.

Subsequently, the non-aqueous electrolyte is injected into the inside of the bag-shaped laminate film 2 from the opening of the laminate film 2. Finally, the opening portion of the laminate film 2 is heat-sealed and sealed in a vacuum atmosphere. Therefore, the separator 16 is impregnated with the non-aqueous electrolyte solution. According to the steps described above, the non-aqueous electrolyte battery 1 shown in FIG. 1A, FIG. 1B, and FIG. 3A is completed.

2. Second Embodiment 2-1 Configuration of Non-aqueous Electrolyte Battery

Figure 9A:
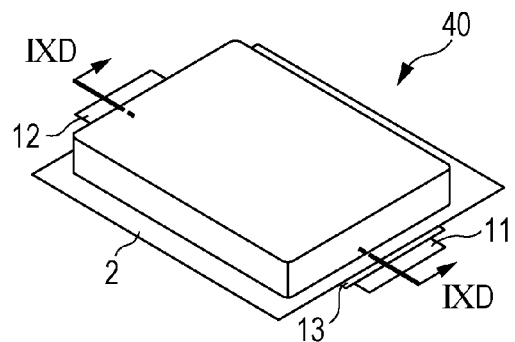
FIGS. 9A, 9B, 9C and 9D are perspective views and a cross-sectional view showing a configuration example of a laminated electrode body used in the non-aqueous electrolyte battery according to a second embodiment.
Figure 9B:
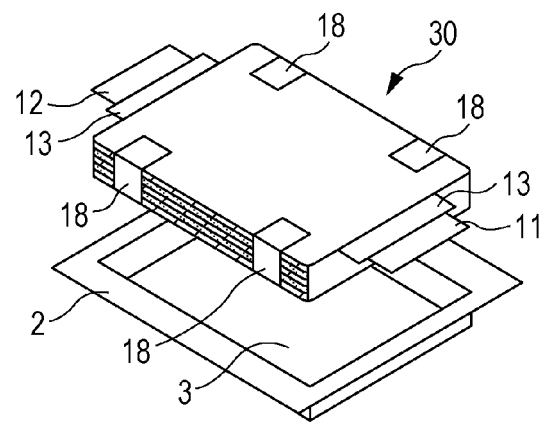
Figure 9C:
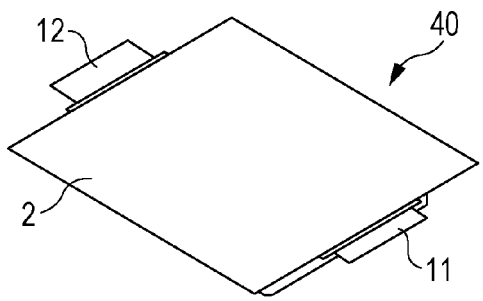
Figure 9D:
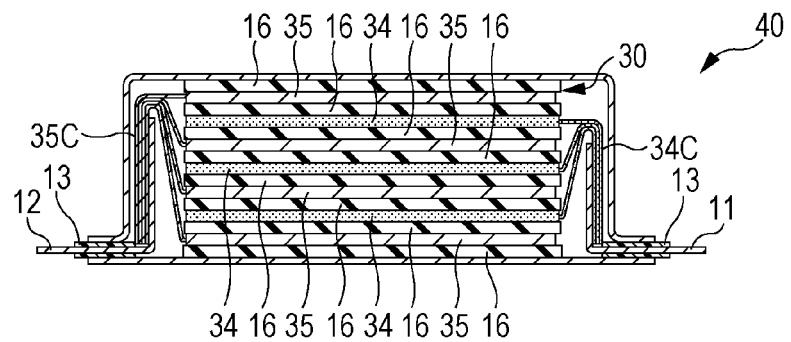

FIG. 9A is a perspective view showing the appearance of the non-aqueous electrolyte battery 40 which is the second embodiment of the present disclosure, FIG. 9B is an exploded perspective view showing the configuration of the non-aqueous electrolyte battery 40. In addition, FIG. 9C is a perspective view showing the configuration of the underside of the non-aqueous electrolyte battery 40 shown in FIG. 9A, and FIG. 9D is a cross-sectional view illustrating a cross-section IXD-IXD of the non-aqueous electrolyte battery 40 of FIG. 9A.

In the non-aqueous electrolyte battery 40 according to an embodiment of the present disclosure, the laminated electrode body 30 is clad using the laminate film 2, and from the portion in which the laminate films 2 are sealed to each other, the positive electrode lead 11 and the negative electrode lead 12, which are connected to the laminated electrode body 30, are derived to outside the battery. Furthermore, the laminate film 2 used in the first embodiment may be used.

Similarly to the first embodiment, the thickness of a non-aqueous electrolyte battery 40 is preferably from 5 mm to 20 mm, and the discharge capacity is preferably from 3 Ah to 50 Ah.

Furthermore, for the laminate film 2, the adhesion film 13, the separator 16, the positive electrode lead 11 and the negative electrode lead 12, since the same as those of the first embodiment may be used, they will be omitted.

Laminated Electrode Body

Figure 10A:
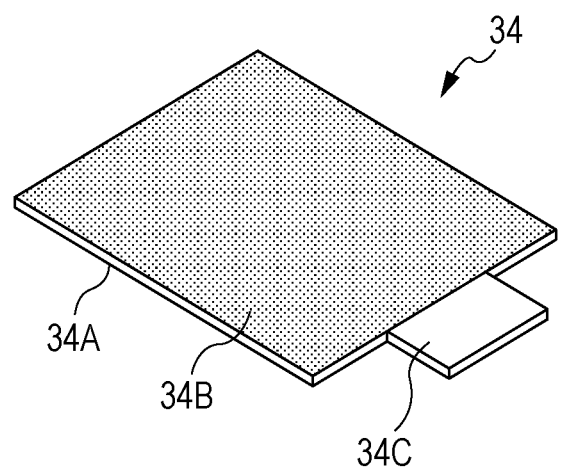
FIGS. 10A and 10B are perspective views showing a configuration example of a positive electrode and a negative electrode in the non-aqueous electrolyte battery according to the second embodiment.
Figure 10B:
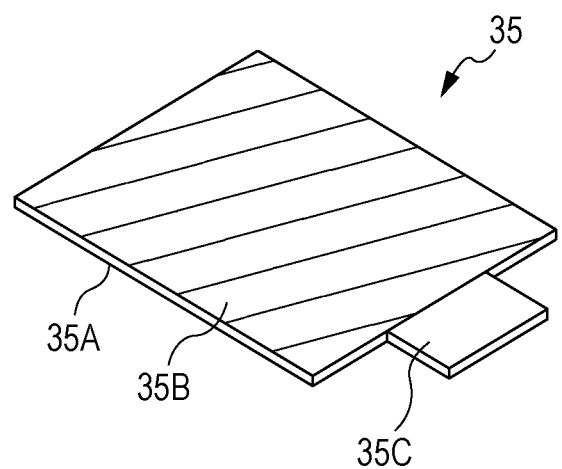
Figure 11A:
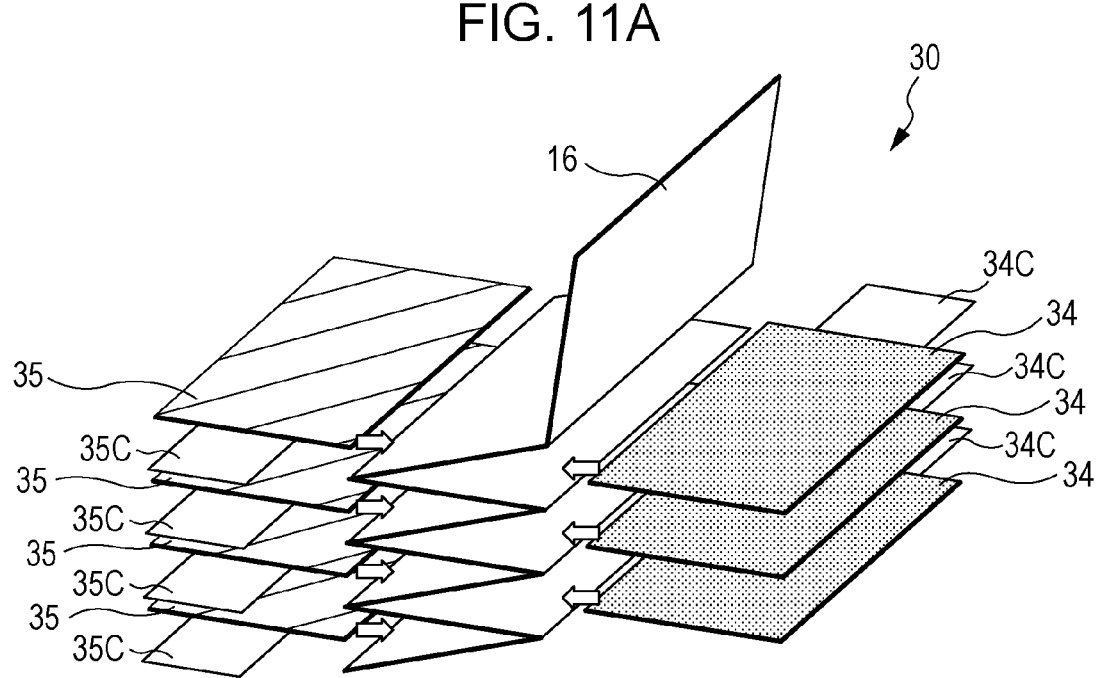
FIGS. 11A and 11B are perspective views and a cross-sectional view showing a configuration example of a laminated electrode body used in the non-aqueous electrolyte battery according to the second embodiment.
Figure 11B:
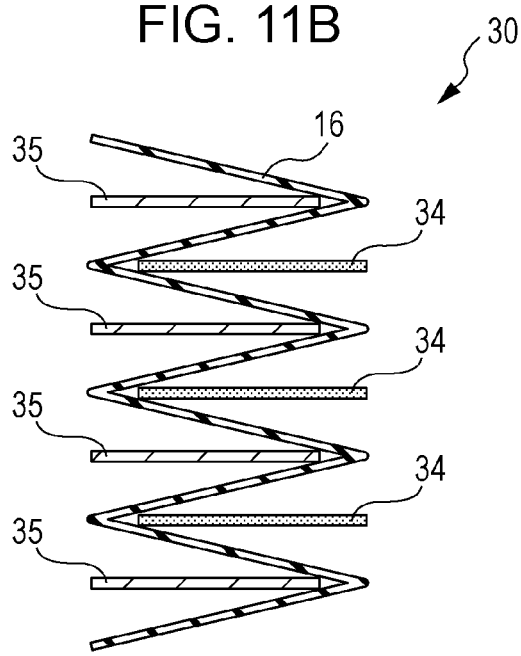

The laminated electrode body 30 which is accommodated in non-aqueous electrolyte battery 40 is of a configuration in which the positive electrode 34 of a rectangular shape as shown in FIG. 10A, and the negative electrode 35 of a rectangular shape as shown in FIG. 10B, are laminated through a separator 16. Specifically, as shown in FIG. 11A and FIG. 11B, for example, a configurations in which the positive electrode 34 and the negative electrode 35 are alternately laminated via the separator 16 which is pleated. A gel electrolyte layer (not shown) may be provided on the surface of the positive electrode 34 and negative electrode 35.

Positive Electrode

As shown in FIG. 10A, in the positive electrode 34, the positive electrode active material layer 34B containing a positive electrode active material is formed on both sides of the positive electrode current collector 34A. As the positive electrode current collector 34A, for example, a metal foil, such as aluminum foil (Al), nickel foil (Ni) or stainless foil (SUS) is used.

The positive electrode current collector 34A is provided with an extended portion extending from the main surface of a rectangular shape, and the positive electrode active material layer 34B is formed on the main surface of the rectangular portion. The extended portion of the state where the positive electrode current collector 34A is exposed, includes a function as a positive electrode tab 34C that is a connection tab for connecting the positive electrode lead 11. The width of the positive electrode tab 34C can be set arbitrarily. In particular, when the positive electrode lead 11 and the negative electrode lead 12 are derived from the same side, it is necessary that the width of the positive electrode tab 34C be less than 50% of the width of the positive electrode 34.

For the positive electrode active material, the conductive agent, and the binder which configure the positive electrode active material layer 34B, the same material as used in the first embodiment may be used.

Negative Electrode

As shown in FIG. 10A, in the negative electrode 35, the negative electrode active material layer 35B containing a negative electrode active material is formed on both sides of the negative electrode current collector 35A. As the negative electrode current collector 35A, for example, a metal foil, such as copper (Cu) foil, nickel (Ni) foil, or stainless (SUS) foil is used.

The negative electrode current collector 35A is provided with an extended portion extending from the main surface of a rectangular shape, and the negative electrode active material layer 35B is formed on the main surface of the rectangular portion. The extended portion of the state where the negative electrode current collector 35A is exposed, includes a function as a negative electrode tab 35C that is a connection tab for connecting the negative electrode lead 12. The width of the negative electrode tab 35C can be set arbitrarily. In particular, when the positive electrode lead 11 and the negative electrode lead 12 are derived from the same side, it is necessary that the width of the negative electrode tab 35C be less than 50% of the width of the negative electrode 35. In such a negative electrode 35, the negative electrode active material layer 35B is formed so as to provide the negative electrode current collector exposed portion on one side of the rectangular negative electrode current collector 35A, thereby cutting unwanted parts and obtaining the negative electrode 35.

For the negative electrode active material, the conductive agent, and the binder which configure the negative electrode active material layer 35B, the same material as used in the first embodiment may be used.

As shown in FIG. 9D, in the laminated electrode body 30, the positive electrode tabs 34C extending respectively from the plurality of positive electrodes 34 are overlapped, the negative electrode tabs 35C extending from the plurality of negative electrodes 35 are overlapped, and the positive electrode 34 and the negative electrode 35 are laminated in order. The plurality of overlapped positive electrode tabs 34C are configured such that the cross section is folded into an approximate U-shape in a state where there is an appropriate slackness in the folded portion. In the tip portion of the plurality of overlapped positive electrode tabs 34C, the positive electrode lead 11 is connected by a method such as ultrasonic welding or resistance welding.

In addition, in the same manner as the positive electrode 34, the plurality of overlapped negative electrode tab 35C are configured such that the cross section is folded into an approximate U-shape in a state where there is an appropriate slackness in the folded portion. In the tip portion of the plurality of overlapped negative electrode tabs 35C, the negative electrode lead 12 is connected by a method such as ultrasonic welding or resistance welding.

In addition, the adhesion film 13 for improving the adhesiveness between the laminate film 2 and the positive electrode lead 11 and the negative electrode lead 12 is provided in the interface portion of the laminate film 2 and the positive electrode lead 11 and the negative electrode lead 12.

Gel Electrolyte Layer

The gel electrolyte layer may be the same configuration as the first embodiment. In addition, similar to the first embodiment, the separator 16 may be impregnated with a non-aqueous electrolyte.

Configuration of Electrolyte Battery

In the non-aqueous electrolyte battery 40, the above described laminated electrode body 30 is clad using the laminate film 2 together with a non-aqueous electrolyte or a gel electrolyte layer, and from the sealed portion of the laminate film 2, the positive electrode lead 11 and the negative electrode lead 12, which are connected electrically to the laminated electrode body 30, are derived to outside the battery.

(2-2) Manufacturing Method of the Non-aqueous Electrolyte Battery

A non-aqueous electrolyte battery as described above can be manufactured by the steps as follows.

Production of Positive Electrode

According to the same method as the first embodiment, after forming a positive electrode active material layer 34B that is provided with the positive electrode current collector exposed portion on one side of the positive electrode current collector 34A, the positive electrode active material layer 34B is cut into a rectangular shape, and by cutting the unnecessary portions of the positive electrode current collector exposed portion, a positive electrode 34 that is integrally formed with the positive electrode tab 34C is obtained.

Production of Negative Electrode

According to the same method as the first embodiment, after forming a negative electrode active material layer 35B that is provided with the negative electrode current collector exposed portion on one side of the negative electrode current collector 35A, the negative electrode active material layer 35B is cut into a rectangular shape, and by cutting the unnecessary portions of the negative electrode current collector exposed portion, a negative electrode 35 that is integrally formed with the negative electrode tab 35C is obtained.

Battery Assembly Step

As shown in FIG. 11A and FIG. 11B, the positive electrode 34 and the negative electrode 35 are alternately inserted between the separator 16 which is pleated, for example, a predetermined number of the positive electrodes 34 and the negative electrodes 35 are laminated so as to overlap like separator 16, negative electrode 35, separator 16, positive electrode 34, separator 16, negative electrode 35 . . . separator 16, negative electrode 35, separator 16. Subsequently, in a state where the positive electrode 34, the negative electrode 35, and separator 16 pressed so as to adhere, and are fixed using the protection tape 18, thereby producing the laminated electrode body 30. The protective tape 18, as shown in FIG. 9B, for example, is provided on both sides of the laminated electrode body 30.

Next, the plurality of positive electrode tabs 34C and the plurality of negative electrode tabs 35C are bent so as to have a U-shaped cross section, and the tips of the positive electrode tab 34C and the negative electrode tab 35C are cut to an even length. Finally, the positive electrode lead 11, is connected to the plurality of overlapped positive electrode tabs 34C together with the negative electrode lead 12 being connected to the plurality of overlapped negative electrode tabs 35C.

After this, the produced laminated electrode body 30 is clad by the laminate film 2, and the periphery of the laminated electrode body 30 is sealed by heat-sealing. In the heat-sealing of the lead derivation portion is, as described in the first embodiment, the thicknesses of both ends of the positive electrode lead 11 and the negative electrode lead 12 are formed to be thicker than the other portions. In other words, by performing the heat-sealing of the lead derivation side using a pair of heater blocks 20, the convex portion 4 is formed such that the heat-sealing portion in the end portion of the positive electrode lead 11 and the heat-sealing portion in the end of the negative electrode lead 12, are respectively formed so as to be convex in the direction of the outer resin layer 2b.

In addition, when a gel electrolyte is used, as described in the first embodiment, various methods may be used such as a method of laminating via the separator 16 after forming a gel electrolyte layer on both sides of the positive electrode 34 and the negative electrode 35, or a method of forming a gel electrolyte layer by holding the non-aqueous electrolyte in a polymer compound inside the battery after sealing the laminate film 2

In addition, when a non-aqueous electrolyte is used, for example, a method in which the laminated electrode body 30 is clad by the laminate film 2, after the laminate film 2 is heat-sealed except for on one side, the non-aqueous electrolyte is injected inside, and the remaining side is sealed in reduced pressure may be used.

3. Third Embodiment

In the third embodiment, a battery pack that is provided with a non-aqueous electrolyte battery 1 according to the first embodiment, or a non-aqueous electrolyte battery 40 according to the second embodiment, is described.

Figure 12:
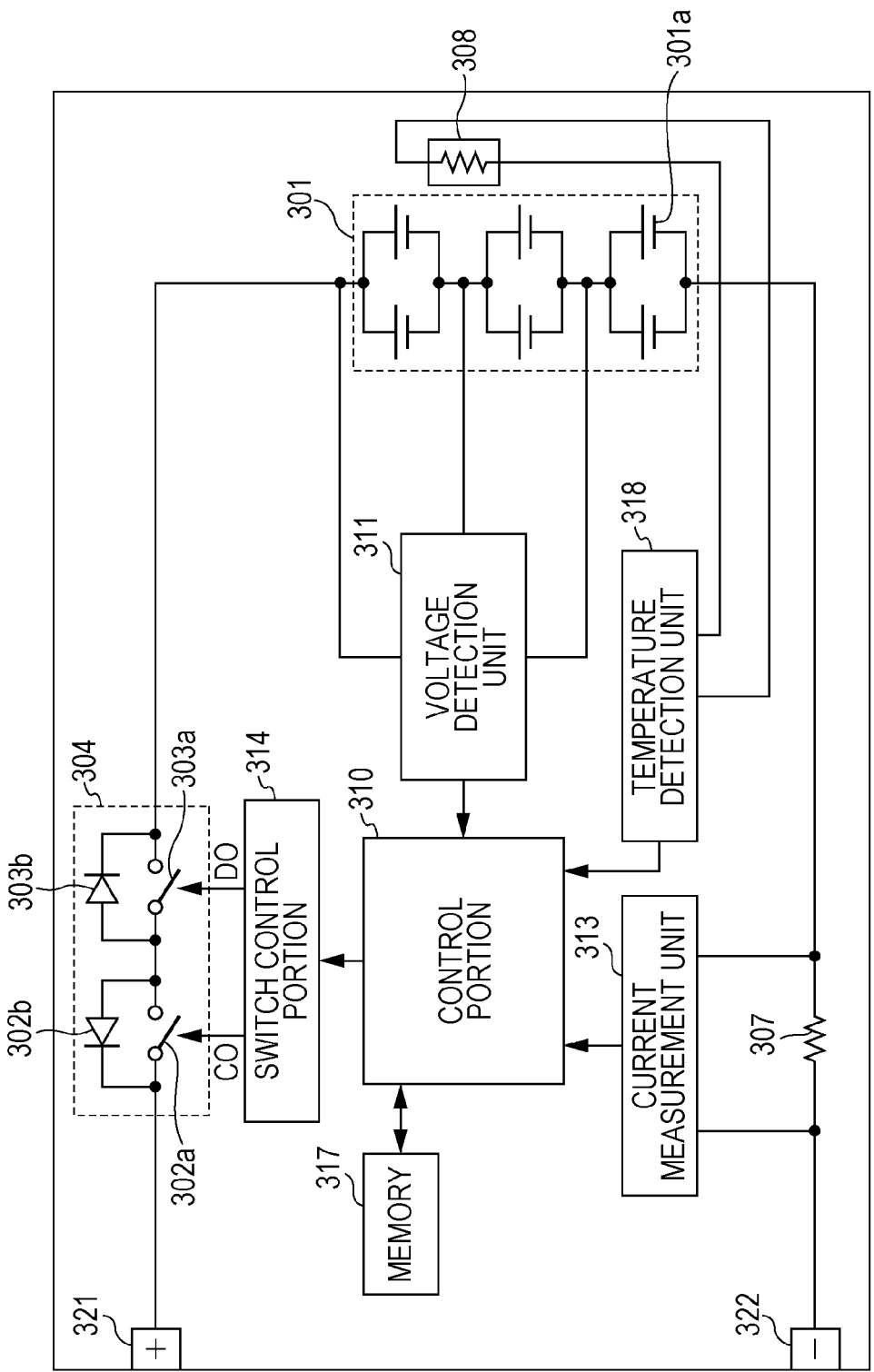
FIG. 12 is a block diagram showing a configuration example of a circuit of a battery pack according to an embodiment of the present disclosure.

FIG. 12 is a block diagram showing a circuit configuration example of a case where the non-aqueous electrolyte battery according to an embodiment of the present disclosure is applied to the battery pack. The battery pack includes a battery pack 301, cladding, a switch unit 304 including a charge control switch 302a and a discharge control switch 303a, a current detection resistor 307, a temperature detection element 308, and a control unit 310.

In addition, the battery pack is provided with the positive terminal 321 and the negative terminal 322, when charging, the positive terminal 321 and the negative terminal 322 are connected respectively to the positive terminal and the negative terminal of the charger, and charging is performed. In addition, when using electronic equipment, the positive terminal 321 and the negative terminal 322 are connected respectively to the positive terminal and the negative terminal of the electronic equipment, and charging is performed.

The battery pack 301 is formed by connecting in series and/or parallel a plurality of non-aqueous electrolyte batteries 301a. This non-aqueous electrolyte battery 301a is a non-aqueous electrolyte battery according to an embodiment of the present disclosure. Furthermore, in FIG. 12, a case in which six non-aqueous electrolyte batteries 301a are connected in (2P3S) two parallel three series is shown as an example. However, other than that any connection method may be used such as n-parallel m-series (n and m are integers).

The switch unit 304 is provided with a charge control switch 302a and a diode 302b, a discharge control switch 303a and diode 303b, and is controlled by the control unit 310. The diode 302b has a polarity which is in the opposite direction to the charging current that flows in the direction of the battery pack 301 from the positive terminal 321, and is in the forward direction to the discharge current that flows in the direction of the battery pack 301 from the negative terminal 322. The diode 303b has a polarity which is in the forward direction to the charging current, and is in the opposite direction to the discharge current. Furthermore, in the example a switch unit is provided on the + side, however, it may also be provided on the − side.

The charging control switch 302a switches off when the battery voltage reaches the overcharge detection voltage, and control is performed by the charging and discharging control unit so that the charge current does not flow in the current path of the battery pack 301. After the charging control switch switches off, it is made possible only to charge by going through the diode 302b. In addition, when a large current flows when charging, the charging control switch switches off, and control is performed by the control unit 310 so that the charge current is blocked in the current path of the battery pack 301.

The discharging control switch 303a switches off when the battery voltage reaches the overdischarge detection voltage, and control is performed by the control unit 310 so that the discharge current does not flow in the current path of the battery pack 301. After the discharging control switch 303a switches off, it is made possible only to discharge by going through the diode 303b. In addition, when a large current flows when discharging, the charging control switch switches off, and control is performed by the control unit 310 so that the discharge current is blocked in the current path of the battery pack 301.

The temperature detection element 308 is, for example, a thermistor, is provided in the vicinity of the battery pack 301, measures the temperature of the battery pack 301 and supplies the measured temperature to the control unit 310. The voltage detection unit 311 measures the voltage of the battery pack 301 and of each non-aqueous electrolyte battery 301a which configures the battery pack 301, performs A/D conversion on this measured voltage, and supplies it to the control unit 310. The current measuring unit 313 measures the current using a current detection resistor 307, and supplies the measured current to the control unit 310.

The switch control unit 314, based on the voltage and the current that is input from the voltage detection unit 311 and the current measurement unit 313, controls the charging control switch 302a and the discharge control switch 303a of the switch unit 304. In the switch control unit 314, when the voltage on one of the non-aqueous electrolyte batteries 301a is the overdischarge detection voltage or overcharge detection voltage or less, or, when a large current suddenly flows, by sending a control signal to the switch unit 304, overcharge and overdischarge, over-current charging and discharging, is prevented.

Here, for example, when the non-aqueous electrolyte battery is a lithium ion secondary battery, the overcharge detection voltage is determined to be, for example, 4.20V±0.05V, and the overdischarge detection voltage is determined to be, for example, 2.4V±0.1V.

As the charge-discharge switch, for example, semiconductor switches such as a MOSFET can be used. In this case, a MOSFET parasitic diode functions as diodes 302b and 303b. As a charge-discharge switch, when a P-channel type FET is used, the switch control unit 314 supplies the control signals DO and CO respectively to the gates of the charge control switch 302a and the discharge control switch 303a. When the charging control switch 302a and the discharge control switch 303a are a P-channel type, they are switched on by a low gate potential of a predetermined value or higher than the source potential. In other words, in the normal charge and discharge behavior, the control signals DO and CO are at low level, and the charge control switch 302a and the discharge control switch 303a are in an ON state.

Then, when for example, the overcharge or over discharge occurs, control signal DO and CO are at a high level, charge control switch 302a and discharge control 303a switch turn to the OFF state.

Memory 317, is configured of, for example, RAM and ROM which is configured of EPROM (Erasable Programmable Read Only Memory) or the like which is a nonvolatile memory. In the memory 317, the numerical values calculated by the control portion 310, or the values such as the internal resistance of the battery in the initial state of each non-aqueous electrolyte battery 301a which was measured at the stage of the manufacturing process, is stored in advance. Accordingly, it is also possible to rewrite. In addition, by storing the full charge capacity of the non-aqueous electrolyte battery 301a, for example, the remaining capacity can be calculated for example with the control portion 310.

The temperature detection section 318 measures the temperature using the temperature detection element 308, charge-discharge control is performed when abnormal heat is generated, and correction is performed on the calculation of the remaining capacity.

4. Fourth Embodiment

In the fourth embodiment, description will be given of the non-aqueous electrolyte battery 1 according to the first embodiment, the non-aqueous electrolyte battery 40 according to the second embodiment, or electronic devices, electric vehicles and the capacitive storage device provided with a battery pack according to the third embodiment. The non-aqueous electrolyte battery and the battery pack described in the first to third embodiments, may be used to supply power to devices such as electronics devices, electric vehicles, and capacitive storage devices.

As electronic devices, for example, laptops, PDAs (portable information terminals), mobile phones, cordless phone handsets, camcorders, digital still cameras, electronic books, electronic dictionaries, music players, radios, headphones, game consoles, navigation systems, memory cards, pacemakers, hearing aids, electric tools, electric shavers, refrigerators, air conditioning, TVs, stereos, water heaters, microwave ovens, dish washing machines, washing machines, dryers, lighting equipment, toys, medical equipment, robots, load-conditioners, traffic lights, and the like may be exemplified.

In addition, as the electric vehicle, railway carriages, golf carts, electric carts, electric vehicles (including hybrid vehicles) and the like may be exemplified, and the non-aqueous electrolyte battery and the battery pack may be used as the drive power supply for these or for an auxiliary power supply.

As an capacitive storage device, a power supply for energy storage for buildings such as housing, or for power generation facilities and the like may be exemplified.

In the following, among the application examples described above, a specific example of the electrical storage system using an capacitive storage device that applies the non-aqueous electrolyte battery according to an embodiment of the present disclosure will be described.

For this storage system, for example, a configuration such as the following may be exemplified. In the first electrical storage system, an capacitive storage device is charged by power generation equipment to generate electricity from renewable energy. The second electrical storage system has an capacitive storage device and supplies electrical power to the electronic devices which are connected to the capacitive storage device. The third electrical storage system is an electronic device which receives the supply of electrical power from the capacitive storage device. These electrical storage systems cooperate with an external power supply network in order to obtain efficient supply of electrical power.

Furthermore, the fourth storage system is an electric vehicle including a conversion device to convert the drive power of the vehicle that receives a supply of electrical power from the capacitive storage device and, a control device to perform information processing related to the vehicle control based on information about the capacitive storage device. The fifth storage system is provided with electrical power information transmission and reception unit which sends and receives signals with other devices via the network, and performs charging and discharging control of the capacitive storage device as described above based on the information received by the transceiver unit. The sixth electrical storage system, receives a supply of electrical power from the capacitive storage device as described above, or supplies electrical power to power generation equipment or to an capacitive storage device from the power grid. An electrical storage system will be described below.

4-1 Storage System in Housing Applications as an Example

Figure 13:
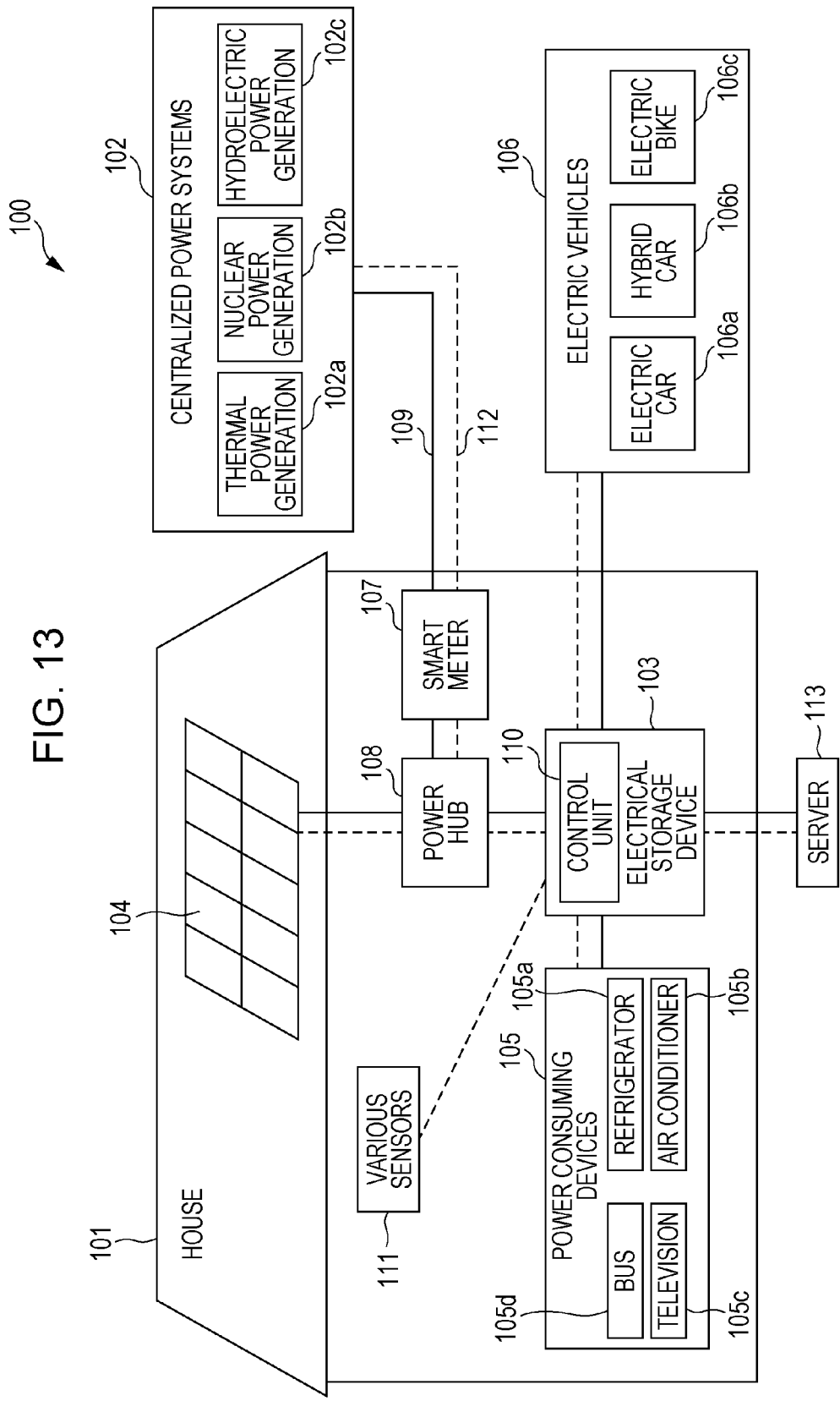
FIG. 13 is a schematic diagram showing an example of applying the non-aqueous electrolyte battery according to an embodiment of the present disclosure to the energy storage system for housing.

An example of applying a capacitive storage device which uses the non-aqueous electrolyte battery according to an embodiment of the present disclosure to the energy storage system for housing will be described with reference to FIG. 13. In the storage system 100 for housing 101, for example, electrical power from centralized power systems 102 such as thermal power generation 102a, nuclear power generation 102b, or hydroelectric power generation 102c, is supplied to the capacitive storage device 103 via the power grid 109, the information network 112, the smart meter 107, the power hub 108, or the like. Along with this, electrical power is supplied to the capacitive storage device 103 from an independent power source such as a home power generation equipment 104. Electrical power which is supplied to the capacitive storage device 103 is electrically stored. Using the capacitive storage device 103, electrical power used in the housing 101 is supplied. The same storage system can be used with respect to buildings, and is not limited to housing 101.

The housing 101 is provided with household power generation equipment 104, power consuming devices 105, capacitive storage device 103, control device 110 to control each device, smart meters 107, sensor 111 to obtain the various pieces of information. Each device is connected by a power grid 109 and an information network 112. As household power generation equipment 104, solar cells, fuel cells and the like are utilized, generated power is supplied to the power consuming devices 105 and/or the capacitive storage devices 103. The power consuming devices 105 are refrigerators 105a, air-conditioning systems 105b, television receivers 105c, baths 105d, and the like. Furthermore, power consuming devices 105 includes electric vehicles 106. The electric vehicles 106 are electric cars 106a, hybrid cars 106b, and electric bikes 106c.

The non-aqueous electrolyte battery according to an embodiment of the present disclosure is applied to the capacitive storage device 103. The non-aqueous electrolyte battery according to an embodiment of the present disclosure may be configured by the lithium ion secondary battery described above, for example. Smart meters 107 are provided with a function of measuring the usage amount of commercial power, and sending it to the power company. The power grid 109, may be one or a combined plurality of any of DC power supply, AC power supply, or non-contact power supply.

The various sensors 111 are, for example, a human presence sensor, an illuminance sensor, an object detecting sensor, a power consumption sensor, a vibration sensor, a contact sensor, a temperature sensor, an infrared sensor and the like. Information that has been acquired by the various sensors 111, is sent to the control device 110. According to the information from the sensor 111, the state of the weather, the state of a human and the like are understood, and energy consumption may be minimized by automatically controlling the power consuming devices 105. Furthermore, the control unit 110 may send information relating to the housing 101 to an outside power company via the Internet.

According to the power hub 108, processing such as branching of power lines and direct current alternating current conversion. As communication systems of an information network 112 that is connected to the control device 110, there is a method to use a communication interface such as UART (Universal Asynchronous Receiver-Transceiver), and a method to use a sensor network according to a wireless communication standard such as Bluetooth, ZigBee and Wi-Fi. The Bluetooth system is applied to multimedia communication, and communicate of one-to-many connections may be performed. ZigBee uses the physical layer of the IEEE (Institute of Electrical and Electronics Engineers) 802.15.4. IEEE 802.15.4 is the name of the short-range wireless networking standard called PAN (Personal Area Network), or W (Wireless) PAN.

The control unit 110 is connected to an external server 113. This server 113 may be managed by one of the housing 101, the electric power companies, or the service providers. The information that the server 113 transmits and receives, for example, is power consumption information, life patterns information, electricity rates, weather information, natural disaster information, and information relating to power transactions. This information may be transmitted to and received from a household power consuming device (a television receiver, for example), and may also be transmitted to and received from equipment outside the home (a mobile phone, for example). This information may be displayed on a device with a display function, for example, television receivers, mobile phones, PDAs (Personal Digital Assistants), and the like.

The control unit 110 controlling each part is configured by a CPU (Central Processing Unit), RAM (Random Access Memory), ROM (Read Only Memory), and the like and in this example, is stored in the capacitive storage device 103. The control unit 110 is connected by a network of information 112 to capacitive storage devices 103, household power generation equipment 104, power consuming devices 105, various sensors 111, and servers 113, and for example, has a function to adjust the usage amount of commercial power and the power generation amount. Furthermore, other than that, functions and the like to perform power transactions in the electricity market may also be provided.

As described above, not only a centralized power system 102, such as thermal power 102a, nuclear power 102b, and hydropower 102c, but generated power of the household power generation equipment 104 (solar power generator, wind power generator) can be stored in the capacitive power storage device 103. Therefore, even if the power generation of power household generation equipment 104 fluctuates, the amount of power transmitted to the outside may be made constant, or controlling such as performing discharging only as necessary is possible. For example, as well as storing electrical power obtained using solar power generation in the capacitive storage device 103, storing electrical power during the night when the late night power rate is cheap and discharging the electrical power, which was stored by the capacitive storage device 103, during the daytime when rates are expensive to use is a possible usage.

Furthermore, in this example, an example in which the control unit 110 is stored in the capacitive storage device 103 has been described, however, it may be stored in the smart meter 107, and may be configured independently. Furthermore, the electrical storage system 100, may be used as intended for a plurality of households in a housing complex, or may also be used as intended for a plurality of detached houses.

(4-2) Storage System in a Vehicle as an Application Example

Figure 14:
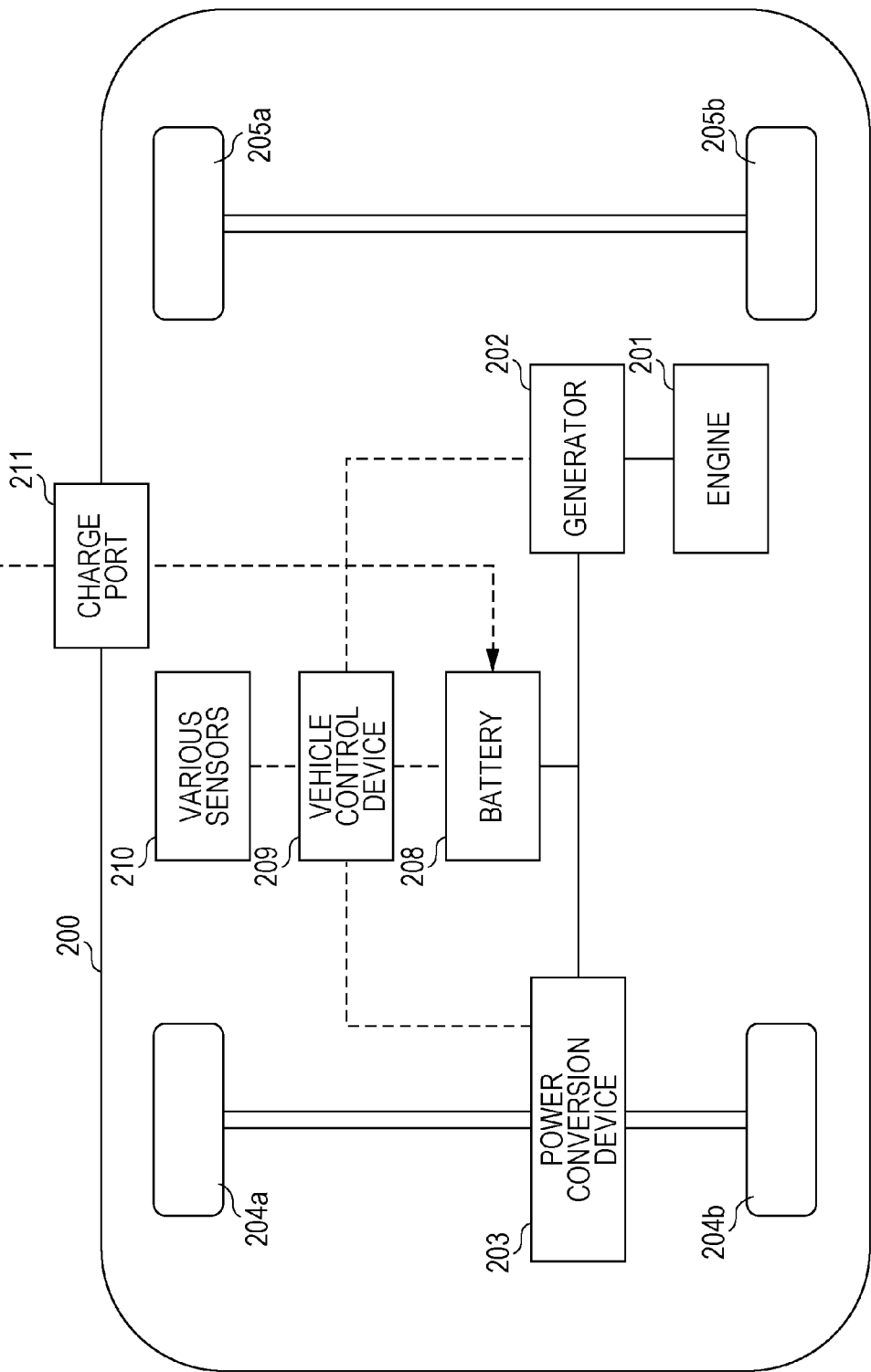
FIG. 14 is a schematic diagram schematically showing an example of the configuration of a hybrid vehicle which employs a series hybrid system to which the present disclosure is applied.

An example in which the present disclosure is applied to the electrical storage system for a vehicle will be described with reference to FIG. 14. In FIG. 14, an example of a configuration of a hybrid vehicle which employs a series hybrid system to which the present disclosure is applied is schematically shown. A series hybrid system is a vehicle which travels using an electrical power driving force conversion device by using the electrical power that is generated in the generator run by the engine, or the electrical power thereof which is temporarily stored in a battery.

This hybrid vehicle 200 is equipped with engine 201, generator 202, the electrical power driving force conversion device 203, drive wheel 204a, drive wheel 204b, wheel 205a, wheel 205b, battery 208, vehicle control device 209, various sensors 210, and charge port 211. The above described non-aqueous electrolyte battery according to an embodiment of the present disclosure is applied to the battery 208.

The hybrid vehicle 200, travels with the electrical power driving force conversion device 203 as a power source. An example of an electrical power driving force conversion device 203 is a motor. The electrical power driving force conversion device 203 is operated according to the electrical power of the battery 208, and the rotational force of the power driving force conversion device 203 is transmitted to the drive wheels 204a and 204b. Furthermore, by using direct current-alternating current (DC-AC) or reverse conversion (AC-DC conversion) in the necessary locations, the electrical power driving force conversion device 203 may be applied whether it is an AC motor or a DC motor. The various sensors 210, control the engine rotational frequency via the vehicle control device 209, or control the degree of opening of the throttle valve (throttle opening degree) which is not shown. The various sensors 210 include a speed sensor, an acceleration sensor, engine rotational frequency sensor and the like.

The rotational force of the engine 201 is transmitted to the generator 202, and it is possible to store the electrical power of the rotational force generated by the generator 202 in the battery 208.

When the hybrid vehicle 200 decelerates due to the braking mechanism (not shown), the resistance during deceleration is added to the electrical power driving force conversion device 203 as a rotational force, and regenerative power generated by the electrical power driving force conversion device 203 by this rotational force is accumulated in the battery 208.

In the battery 208, by connecting to the power supply external to the hybrid vehicle 200, the power supply is received with the charge port 211 as the input port, it is also possible to accumulate the received electrical power from an external power supply.

Although not shown, the battery 208 may also be provided with an information processing apparatus to perform information processing related to the vehicle control based on information related to the non-aqueous electrolyte battery. As such an information processing apparatus, for example, there is an information processing apparatus or the like which performs battery level display based on the information relating to the remaining amount of battery.

Furthermore, above, the series hybrid car which travels using a motor by using the electrical power that is generated in the generator run by the engine, or the electrical power thereof which is temporarily stored in a battery has been described as an example. However, The output of either of the engine and the motor is a driving source, and the present disclosure may be effectively applied to a parallel hybrid car which appropriately switches between three systems of traveling with only the engine, traveling with only the motor, and traveling with the engine and the motor to use. Furthermore, the present disclosure can be applied effectively even for the so-called electric vehicle which travels using the drive by only the motor without using the engine.

Embodiments

<Embodiment 1-1> to <Embodiment 1-7> and <Comparative Example 1-1> to <Comparative Example 1-2>

In Embodiment 1-1 to Embodiment 1-7 and Comparative Example 1-1 to Comparative Example 1-2, the thickness Tc1 of the resin layer is changed at the end portion of the positive electrode lead, the ratio between the thickness Tc1 and the thickness Tc2 of the resin layer on the center line in the width direction of the positive electrode lead is changed, a non-aqueous electrolyte battery is prepared and checking for battery faults is performed.

<Embodiment 1-1>

Production of Positive Electrode 95 mass % of lithium iron phosphate (LiFePO$_4$) is set as the positive electrode active material, 2 mass % of graphite is set as a conductive agent, 3 mass % of polyvinylidene fluoride (PVdF) is set as a binder, and a positive electrode material mixture in which these are mixed evenly is dispersed in N-methyl-2-pyrrolidone (NMP), and a positive electrode mixture slurry is obtained. Next, the obtained positive electrode mixture slurry is uniformly coated on both sides of the aluminum (Al) foil of 15 μm thickness, and after drying, a positive electrode active material layer of 40 μm per side compression-molded in the roll press machine is formed. Furthermore, when the positive electrode active material layer is formed, on the positive electrode current collector which is continuous in a strip-shape, the positive electrode mixture slurry is coated so that a side in the longitudinal direction of the positive electrode current collector is exposed. Subsequently, the positive electrode current collector which is continuous in a strip-shape where the positive electrode active material layer is formed is cut parallel to the short direction so as to be a width of 105 mm, thereby forming the positive electrode sheet. Then, the positive electrode current collector exposed portion positive electrode is cut so that the positive electrode tab is a width of 90 mm, and is set as the positive electrode. Furthermore, the positive electrode tab is formed so as to be located at the centre of the positive electrode.

Production of Negative Electrode 95 mass % graphite is set as a negative electrode active material, 5 mass % of polyvinylidene fluoride (PVdF) is set as a binder, and a negative electrode material mixture in which these are mixed evenly is dispersed in N-methyl-2-pyrrolidone (NMP), and a negative electrode mixture slurry is obtained. Next, the obtained negative electrode mixture slurry is uniformly coated on both sides of the copper foil of 8 μm thickness, and after drying, a negative electrode active material layer of 40 μm per side compression-molded in the roll press machine is formed. Furthermore, when the negative electrode active material layer is formed, on the negative electrode current collector which is continuous in a strip-shape, the negative electrode mixture slurry is coated so that a side in the longitudinal direction of the negative electrode current collector is exposed. Subsequently, the negative electrode current collector which is continuous in a strip-shape where the negative electrode active material layer is formed is cut parallel to the short direction so as to be a width of 105 mm, thereby forming the positive electrode sheet. Then, the negative electrode current collector exposed portion is cut so that the negative electrode tab is a width of 90 mm, and is set as the negative electrode. Furthermore, the negative electrode tab is formed so as to be located at the centre of the negative electrode.

Production of Laminated Electrode Body

The positive electrode and the negative electrode which have been prepared in the above described manner, are alternately laminated via a separator which is folded into pleats, and the positive electrode and the negative electrode have been laminated through a separator. At this time, as shown in FIG. 11A, the positive electrode tab and the negative electrode tab, are laminated so as to be positioned on different opposed sides, and the positive electrode tabs, and the negative electrode tabs respectively extend so as to overlap from the same side. As the separator, a microporous polyethylene film of 16 μm thickness coated with a polyvinylidene fluoride (PVdF) powder on both sides is used.

Subsequently, after fixing the positive electrode, the negative electrode and the separator with protecting tape to prevent misalignment, the positive electrode tabs extending from the laminated positive electrode are overlapped and connected by resistance welding. Then, after cutting the excess portion of the positive electrode tab tip portion, the positive electrode lead is connected to the positive electrode tab. The positive electrode lead is an aluminum piece with a thickness of 200 μm, and a width of 90 mm. Similarly, after overlapping all of the laminated negative electrode tabs of the negative electrodes, connecting, and cutting the excess portion of the negative electrode tab tip portion, the negative electrode lead is connected to the negative electrode tab. The negative electrode lead is a nickel piece with a thickness of 200 μm, and a width of 90 mm. This is to prepare a laminated electrode body in which the positive electrode lead and the negative electrode lead are derived from each of two opposing sides. On both sides of the portion of the positive electrode lead and the negative electrode lead opposing the cladding member, the respective sealants formed from modified polypropylene of a thickness of 100 μm, and a width of 47 mm are pasted.

Production of Non-Aqueous Electrolyte Battery

As the cladding member of the non-aqueous electrolyte battery, using a laminate film layer in which a nylon layer which is an outer resin layer, or a non-axial stretch polypropylene layer (CPP layer) which is an aluminium layer and an inner resin layer is laminated, and covering is performed so as to interpose the laminated electrode body described above. Subsequently, a side where neither the positive electrode lead and negative electrode lead are derived and the respective derivation side in which the positive electrode lead is derived and the derivation side in which the negative electrode lead is derived are interposed with the heater blocks, and the laminate films are heat-sealed to each other. At this time, in a side where neither the positive electrode lead and negative electrode lead are derived, the laminate films are heat-sealed to each other using a heater block of a pair of flat surfaces.

In the positive electrode lead derivation side, as shown in FIG. 7, heat-sealing is performed by using two cutout portions of a depth Dc1 which were provided at a position interposing the respective end portions of the positive electrode lead, a heater block in which a cutout portion of a depth Dc2 (Dc2<Dc1) which is provided at a portion excluding the end portion on the positive electrode lead, and a heater block with a flat surface. At this time, in the heater block, the depth of the cutout portion Dc1 which is provided at a position interposing the end portions of the positive electrode lead is set to 261.5 μm, the depth of the cutout portion Dc2 which is provided at a position interposing the top of the end portions of the positive electrode lead is set to 260 μm (Dc1/Dc2=1.006). The cutout portions of depth Dc1 which were provided at a position interposing the respective end portions of the positive electrode lead are formed with a width of 4 mm in a position interposing the respective end portions of the positive electrode lead (a region of 3 mm from the end portions of the positive electrode lead to the inside, 1 mm from the edge of the positive electrode lead to the outside). The cutout portions of a depth Dc2 are formed at a position except the lead end portions through the center line of the positive electrode lead.

Therefore, the thickness Tc1 of the resin layer after the heat-sealing in both end portions of the positive electrode lead is 16 μm, and the thickness Tc2 of the resin layer after the heat-sealing on the center line of the positive electrode lead is 15 μm (Tc1/Tc2=1.1). In addition, the width of the convex portion which is fainted at both end portions of the positive electrode lead is 4 mm. Furthermore, for the thickness Tc1 of the above described resin layer, the thickness of four locations is measured as shown in FIG. 5A, and the thickness Tc1 is calculated from $\{Tc1=(Tc_{1-1}+Tc_{1-2}+Tc_{1-3}+Tc_{1-4})/4\}$. In addition, for the thickness Tc2 of the above described resin layer, the thickness of two locations is measured as shown in FIG. 5A, and the thickness Tc2 is calculated from $\{Tc2=(Tc_{2-1}+Tc_{2-2})/2\}$.

In addition, in the negative electrode lead derivation side, heat-sealing is performed by using two cutout portions of a depth Da1 which were provided at a position interposing the respective end portions of the negative electrode lead, a heater block in which a cutout portion of a depth Da2 (Da2<Da1) which is provided at a portion excluding the end portion on the negative electrode lead, and a heater block with a flat surface. At this time, in the heater block, the depth of the cutout portion Da1 which is provided at a position interposing the end portions of the negative electrode lead is set to 275 μm, the depth of the cutout portion Da2 which is provided at a position interposing the top of the end portions of the negative electrode lead is set to 260 μm (Da1/Da2=1.058). The cutout portions of depth Da1 which were provided at a position interposing the respective end portions of the negative electrode lead are formed with a width of 4 mm in a position interposing the respective end portions of the negative electrode lead (a region of 3 mm from the edge of the positive electrode lead to the inside, 1 mm from the edge of the negative electrode lead to the outside). The cutout portions of a depth Da2 are formed at a position except the lead end portion through the center line of the negative electrode lead.

Therefore, the thickness Ta1 of the resin layer after the heat-sealing in both end portions of the negative electrode lead is 30 μm, and the thickness Ta2 of the resin layer after the heat-sealing on the center line of the negative electrode lead is 15 μm (Ta1/Ta2=2). In addition, the width of the convex portion which is formed at both end portions of the positive electrode lead is 4 mm. Furthermore, for the thickness Ta1 of the above described resin layer, the thickness of four locations is measured in the same manner as in Tc1, and the thickness Ta1 is calculated from $\{Ta1=(Ta_{1-1}+Ta_{1-2}+Ta_{1-3}+Ta_{1-4})/4\}$. In addition, for the thickness Ta2 of the above described resin layer, the thickness of two locations is measured in the same manner as in Tc2, and the thickness Ta2 is calculated from $\{Ta2=+Ta_{2-2})/2\}$.

Subsequently, from the opening portion of one side that has not been heat-sealed, the non-aqueous electrolyte solution is inserted. The non-aqueous electrolyte is prepared by mixing ethylene carbonate (EC) and propylene carbonate (PC) in a 6:4 mass ratio and dissolving this in a 1.0 mol/kg lithium phosphate hexafluoride ($LiPF_6$). After this, after one side of the laminate film which remains under reduced pressure is sealed by heat-sealing using a pair of flat heater blocks it is heated while pressurizing the laminated electrode body portion, the non-aqueous electrolyte solution that is attached to the separator surface with polyvinylidene fluoride swells to form a gel electrolyte layer. This is the preparation of the non-aqueous electrolyte battery of embodiment 1-1 of the shape as shown in FIG. 9A.

<Embodiment 1-2>

The depth Dc1 of the cutout portion provided at a position interposing the end portions of the positive electrode lead is 263 μm (Dc1/Dc2=1.012), the thickness Tc1 of the resin layer after heat-sealing at both end portions of the positive electrode lead is 18 μm (Tc1/Tc2=1.2), and other than this, the non-aqueous electrolyte battery was prepared in the same manner as in Example 1-1.

<Embodiment 1-3>

The depth Dc1 of the cutout portion provided at a position interposing the end portions of the positive electrode lead is 275 μm (Dc1/Dc2=1.058), the thickness Tc1 of the resin layer after heat-sealing at both end portions of the positive electrode lead is 30 μm (Tc1/Tc2=2), and other than this, the non-aqueous electrolyte battery was prepared in the same manner as in Example 1-1.

<Embodiment 1-4>

The depth Dc1 of the cutout portion provided at a position interposing the end portions of the positive electrode lead is 320 μm (Dc1/Dc2=1.231), the thickness Tc1 of the resin layer after heat-sealing at both end portions of the positive electrode lead is 75 μm (Tc1/Tc2=5), and other than this, the non-aqueous electrolyte battery was prepared in the same manner as in Example 1-1.

<Embodiment 1-5>

The depth Dc1 of the cutout portion provided at a position interposing the end portions of the positive electrode lead is 395 μm (Dc1/Dc2=1.519), the thickness Tc1 of the resin layer after heat-sealing at both end portions of the positive electrode lead is 150 μm (Tc1/Tc2=10), and other than this, the non-aqueous electrolyte battery was prepared in the same manner as in Example 1-1.

<Embodiment 1-6>

The depth Dc1 of the cutout portion provided at a position interposing the end portions of the positive electrode lead is 410 μm (Dc1/Dc2=1.577), the thickness Tc1 of the resin layer after heat-sealing at both end portions of the positive electrode lead is 165 μm (Tc1/Tc2=11), and other than this, the non-aqueous electrolyte battery was prepared in the same manner as in Example 1-1.

<Embodiment 1-7>

The depth Dc1 of the cutout portion provided at a position interposing the end portions of the positive electrode lead is 425 μm (Dc1/Dc2=1.635), the thickness Tc1 of the resin layer after heat-sealing at both end portions of the positive electrode lead is 180 μm (Tc1/Tc2=12), and other than this, the non-aqueous electrolyte battery was prepared in the same manner as in Example 1-1.

COMPARATIVE EXAMPLE 1-1

The depth Dc1 of the cutout portion provided at a position interposing the end portions of the positive electrode lead is 260 μm (Dc1/Dc2=1.000), the thickness Tc1 of the resin layer after heat-sealing at both end portions of the positive electrode lead is 14 μm (Tc1/Tc2=1), the depth Da1 of the cutout portion provided at a position interposing the end portions of the negative electrode lead is 260 μm (Da1/Da2=1.000), the thickness Ta1 of the resin layer after heat-sealing at both end portions of the negative electrode lead is 15 μm (Tc1/Tc2=1), and other than this, the non-aqueous electrolyte battery was prepared in the same manner as in Example 1-1.

COMPARATIVE EXAMPLE 1-2

The depth Dc1 of the cutout portion provided at a position interposing the end portions of the positive electrode lead is 260 μm (Dc1/Dc2=1.000), the thickness Tc1 of the resin layer after heat-sealing at both end portions of the positive electrode lead is 15 μm (Tc1/Tc2=1), and other than this, the non-aqueous electrolyte battery was prepared in the same manner as in Example 1-1.

Battery Evaluation (a) Short Circuit Test

In the non-aqueous electrolyte battery of each of the embodiments and the comparative examples, the terminal was placed between the positive electrode lead and the aluminum layer of the laminate film, as well as checking to see if there was a short circuit between the positive electrode lead and the aluminum layer of the laminate film, the presence of short circuiting between the negative electrode lead and the aluminum layer of the laminate film was checked using the same method. In each of the embodiments and the comparative examples, the test described above was performed respectively on 100 non-aqueous electrolyte batteries. When there is a short circuit between the aluminum layer of the laminated film and one of the positive electrode lead and the negative electrode lead, then there is a short circuit, when no short circuit occurs in the aluminum layer of the laminated film and both the positive electrode lead and the negative electrode lead, then there is no short circuit, thereby the number of non-aqueous electrolyte batteries in which a short circuit occurred was confirmed.

(b) Leak Test

The non-aqueous electrolyte battery of each of the embodiments and the comparative examples are placed in a vacuum environment, and were checked as to whether or not enough heat-sealing was sufficient over the entire surface of heat-sealed portion. Specifically, by placing the non-aqueous electrolyte battery in a vacuum environment, it was visually checked as to whether or not a change in the in non-aqueous electrolyte battery such as the non-aqueous electrolyte solution leaking from insufficiently heat-sealed portions of the laminate film (in particular, a heat-sealed portion in the vicinity of the positive electrode lead and the negative electrode lead), and the non-aqueous electrolyte battery swelling due to moisture and the like from the insufficiently heat-sealed portions permeating.

Table 1 below shows the results of the evaluation.

TABLE 1

| | Positive electrode lead side uneven shape | | | | Negative electrode lead side uneven shape | | | | Positive electrode lead side cutout portion shape | | | Negative electrode lead side cutout portion shape | | | Short circuit test | Leak test |
|---|---|---|---|---|---|---|---|---|---|---|---|---|---|---|---|---|
| | | | | Convex portion | | | | Convex portion | | | | | | | | |
| | Tc1 [μm] | Tc2 [μm] | Tc1/Tc2 | width [mm] | Ta1 [μm] | Ta2 [μm] | Ta1/Ta2 | width [mm] | Dc1 [μm] | Dc2 [μm] | Dc1/Dc2 | Da1 [μm] | Da2 [μm] | Da1/Da2 | | |
| Embodiment 1-1 | 16 | 15 | 1.1 | 4 | 30 | 15 | 2 | 4 | 261.5 | 260 | 1.006 | 275 | 260 | 1.058 | 3/100 | 0/100 |
| Embodiment 1-2 | 18 | 15 | 1.2 | 4 | 30 | 15 | 2 | 4 | 263 | 260 | 1.012 | 275 | 260 | 1.058 | 0/100 | 0/100 |

TABLE 1-continued

| | Positive electrode lead side uneven shape | | | | Negative electrode lead side uneven shape | | | | Positive electrode lead side cutout portion shape | | | Negative electrode lead side cutout portion shape | | | Short circuit test | Leak test |
|---|---|---|---|---|---|---|---|---|---|---|---|---|---|---|---|---|
| | Tc1 [μm] | Tc2 [μm] | Tc1/Tc2 | Convex portion width [mm] | Ta1 [μm] | Ta2 [μm] | Ta1/Ta2 | Convex portion width [mm] | Dc1 [μm] | Dc2 [μm] | Dc1/Dc2 | Da1 [μm] | Da2 [μm] | Da1/Da2 | | |
| Embodiment 1-3 | 30 | 15 | 2 | 4 | 30 | 15 | 2 | 4 | 275 | 260 | 1.058 | 275 | 260 | 1.058 | 0/100 | 0/100 |
| Embodiment 1-4 | 75 | 15 | 5 | 4 | 30 | 15 | 2 | 4 | 320 | 260 | 1.231 | 275 | 260 | 1.058 | 0/100 | 0/100 |
| Embodiment 1-5 | 150 | 15 | 10 | 4 | 30 | 15 | 2 | 4 | 395 | 260 | 1.519 | 275 | 260 | 1.058 | 0/100 | 0/100 |
| Embodiment 1-6 | 165 | 15 | 11 | 4 | 30 | 15 | 2 | 4 | 410 | 260 | 1.577 | 275 | 260 | 1.058 | 0/100 | 2/100 |
| Embodiment 1-7 | 180 | 15 | 12 | 4 | 30 | 15 | 2 | 4 | 425 | 260 | 1.635 | 275 | 260 | 1.058 | 0/100 | 4/100 |
| Comparative Example 1-1 | 15 | 15 | 1 | — | 15 | 15 | 1 | — | 260 | 260 | 1.000 | 260 | 260 | 1.000 | 15/100 | 0/100 |
| Comparative Example 1-2 | 15 | 15 | 1 | 4 | 30 | 15 | 2 | 4 | 260 | 260 | 1.000 | 275 | 260 | 1.058 | 6/100 | 0/100 |

As can be seen from Table 1, each embodiment in which convex portions were formed respectively on the end portion of the positive electrode lead and the end portion of the negative electrode lead, the number of faulty batteries of the short circuit test had decreased in comparison with Comparative Example 1-1 where convex portions were not formed at all, and Comparative Example 1-2 where convex portions were formed only in the vicinity of the positive electrode lead. In particular, in Embodiment 1-2 to Embodiment 1-7, Tc1/Tc2, which is the ratio of the thickness Tc1 of the resin layer at the end portion of the positive electrode lead, and the thickness Tc2 of the resin layer on the center line in the width direction of the positive electrode lead, was set to 1.2 or more, absolutely no faults occurred in the short circuit test. Furthermore, in Embodiment 1-2 to Embodiment 1-5, Tc1/Tc2 was set to from 1.2 to 10, and absolutely no faults occurred in the leak test in addition to the short-circuit test.

In Example 1 Tc1/Tc2 was set to less than 1.2, and some faults occurred in the short circuit test where there was a short circuit in the positive electrode lead and the aluminum layer of the laminate film. This was because the thickness Tc1 of the resin layer in the end portion of the positive electrode lead was not thick enough to sufficiently bury the burrs, making it easier for the positive electrode lead and the aluminum layer of the laminate film to contact.

In addition, in Embodiment 1-6 and Embodiment 1-7 Tc1/Tc2 was greater than 10, and faulty sealing was confirmed in some of the laminate films in the leak tests. This was because, although the thickness Tc1 of the resin layer in the end portion of the positive electrode lead was sufficiently large, the resin layer of the other portions becomes thin to that extent and sealability is decreased.

From the above results, it is preferable for the Tc1/Tc2 ratio of the thickness Tc1 of the resin layer at the end portion of the positive electrode lead and the thickness Tc2 of the resin layer on the center line in the width direction of the positive electrode lead to be from 1.2 to 10.

<Embodiment 2-1> to <Embodiment 2-7> and <Comparative Example 2-1> to <Comparative Example 2-2>

In Embodiment 2-1 to Embodiment 2-7 and Comparative Example 2-1 to Comparative Example 2-2, the thickness Ta1 of the resin layer is changed at the end portion of the negative electrode lead, the ratio between the thickness Ta1 and the thickness Ta2 of the resin layer on the center line in the width direction of the negative electrode lead is changed, a non-aqueous electrolyte battery is prepared and checking for battery faults is performed.

<Embodiment 2-1>

A heater block is used where, when heat-sealing the negative electrode lead derivation side, the depth of the cutout portion Da1 which is provided at a position interposing the end portions of the negative electrode lead is set to 261.5 μm, the depth of the cutout portion Da2 which is provided at a position interposing the top of the end portions of the negative electrode lead is set to 260 μm (Da1/Da2=1.006). Therefore, the thickness Ta1 of the resin layer after the heat-sealing in both end portions of the negative electrode lead is 16.5 μm, and the thickness Ta2 of the resin layer after the heat-sealing on the center line of the negative electrode lead is 15 μm (Ta1/Ta2=1.1).

In addition, a heater block is used where, when heat-sealing the negative electrode lead derivation side, the depth Dc1 of the cutout portion which is provided at a position interposing the end portions of the positive electrode lead is set to 275 μm, the depth of the cutout portion Dc2 which is provided at a position interposing the top of the end portions of the positive electrode lead is set to 260 μm (Dc1/Dc2=1.058). Therefore, the thickness Tc1 of the resin layer after the heat-sealing in both end portions of the positive electrode lead is 30 μm, and the thickness Tc2 of the resin layer after the heat-sealing on the center line of the positive electrode lead is 15 μm (Tc1/Tc2=2).

Other than this, the non-aqueous electrolyte battery was prepared in the same manner as in Embodiment 1-1.

<Embodiment 2-2>

The depth Da1 of the cutout portion provided at a position interposing the end portions of the negative electrode lead is 263 μm (Da1/Da2=1.012), the thickness Ta1 of the resin layer after heat-sealing at both end portions of the negative electrode lead is 18 μm (Ta1/Ta2=1.2), and other than this, the non-aqueous electrolyte battery was prepared in the same manner as in Example 2-1.

<Embodiment 2-3>

The depth Da1 of the cutout portion provided at a position interposing the end portions of the negative electrode lead is 275 μm (Da1/Da2=1.058), the thickness Ta1 of the resin layer after heat-sealing at both end portions of the negative electrode lead is 30 μm (Ta1/Ta2=2), and other than this, the non-aqueous electrolyte battery was prepared in the same manner as in Example 2-1.

<Embodiment 2-4>

The depth Da1 of the cutout portion provided at a position interposing the end portions of the negative electrode lead is 320 m (Da1/Da2=1.231), the thickness Ta1 of the resin layer after heat-sealing at both end portions of the negative electrode lead is 75 μm (Ta1/Ta2=5), and other than this, the non-aqueous electrolyte battery was prepared in the same manner as in Example 2-1.

<Embodiment 2-5>

The depth Da1 of the cutout portion provided at a position interposing the end portions of the negative electrode lead is 395 μm (Da1/Da2=1.519), the thickness Ta1 of the resin layer after heat-sealing at both end portions of the negative electrode lead is 150 μm (Ta1/Ta2=10), and other than this, the non-aqueous electrolyte battery was prepared in the same manner as in Example 2-1.

<Embodiment 2-6>

The depth Da1 of the cutout portion provided at a position interposing the end portions of the negative electrode lead is 410 μm (Da1/Da2=1.577), the thickness Ta1 of the resin layer after heat-sealing at both end portions of the negative electrode lead is 165 μm (Ta1/Ta2=11), and other than this, the non-aqueous electrolyte battery was prepared in the same manner as in Example 2-1.

<Embodiment 2-7>

The depth Da1 of the cutout portion provided at a position interposing the end portions of the negative electrode lead is 425 μm (Da1/Da2=1.635), the thickness Ta1 of the resin layer after heat-sealing at both end portions of the negative electrode lead is 180 μm (Ta1/Ta2=12), and other than this, the non-aqueous electrolyte battery was prepared in the same manner as in Example 2-1.

COMPARATIVE EXAMPLE 2-1

The depth Dc1 of the cutout portion provided at a position interposing the end portions of the positive electrode lead is 260 μm (Dc1/Dc2=1.000), the thickness Tc1 of the resin layer after heat-sealing at both end portions of the positive electrode lead is 15 μm (Ta1/Ta2=1), the depth Da1 of the cutout portion provided at a position interposing the end portions of the negative electrode lead is 260 μm (Da1/Da2=1.000), the thickness Ta1 of the resin layer after heat-sealing at both end portions of the negative electrode lead is 15 μm (Ta1/Ta2=1), and other than this, the non-aqueous electrolyte battery was prepared in the same manner as in Example 2-1.

COMPARATIVE EXAMPLE 2-2

The depth Da1 of the cutout portion provided at a position interposing the end portions of the negative electrode lead is 260 μm (Da1/Da2=1.000), the thickness Ta1 of the resin layer after heat-sealing at both end portions of the negative electrode lead is 15 μm (Ta1/Ta2=1), and other than this, the non-aqueous electrolyte battery was prepared in the same manner as in Example 2-1.

Battery Evaluation (a) Short Circuit Test
(b) Leak Test

The short circuit tests and the leak tests were performed on the non-aqueous electrolyte batteries of each of the embodiments and each of the comparative examples which were produced, in the same manner as in Embodiment 1-1.

Table 2 below shows the results of the evaluation.

TABLE 2

| | Positive electrode lead side uneven shape | | | Negative electrode lead side uneven shape | | | | Positive electrode lead side cutout portion shape | | | Negative electrode lead side cutout portion shape | | | Short circuit test | Leak test |
|---|---|---|---|---|---|---|---|---|---|---|---|---|---|---|---|
| | Tc1 [μm] | Tc2 [μm] | Tc1/Tc2 | Convex portion width [mm] | Ta1 [μm] | Ta2 [μm] | Ta1/Ta2 | Convex portion width [mm] | Dc1 [μm] | Dc2 [μm] | Dc1/Dc2 | Da1 [μm] | Da2 [μm] | Da1/Da2 | | |
| Embodiment 2-1 | 30 | 15 | 2 | 4 | 16.5 | 15 | 1.1 | 4 | 275 | 260 | 1.058 | 261.5 | 260 | 1.006 | 1/100 | 0/100 |
| Embodiment 2-2 | 30 | 15 | 2 | 4 | 18 | 15 | 1.2 | 4 | 275 | 260 | 1.058 | 263 | 260 | 1.012 | 0/100 | 0/100 |
| Embodiment 2-3 | 30 | 15 | 2 | 4 | 30 | 15 | 2 | 4 | 275 | 260 | 1.058 | 275 | 260 | 1.058 | 0/100 | 0/100 |
| Embodiment 2-4 | 30 | 15 | 2 | 4 | 75 | 15 | 5 | 4 | 275 | 260 | 1.058 | 320 | 260 | 1.231 | 0/100 | 0/100 |
| Embodiment 2-5 | 30 | 15 | 2 | 4 | 150 | 15 | 10 | 4 | 275 | 260 | 1.058 | 395 | 260 | 1.519 | 0/100 | 0/100 |
| Embodiment 2-6 | 30 | 15 | 2 | 4 | 165 | 15 | 11 | 4 | 275 | 260 | 1.058 | 410 | 260 | 1.577 | 0/100 | 3/100 |
| Embodiment 2-7 | 30 | 15 | 2 | 4 | 180 | 15 | 12 | 4 | 275 | 260 | 1.058 | 425 | 260 | 1.635 | 0/100 | 4/100 |
| Comparative Example 2-1 | 15 | 15 | 1 | — | 15 | 15 | 1 | — | 260 | 260 | 1.000 | 260 | 260 | 1.000 | 15/100 | 0/100 |
| Comparative Example 2-2 | 30 | 15 | 2 | 4 | 15 | 15 | 1 | 4 | 275 | 260 | 1.058 | 260 | 260 | 1.000 | 5/100 | 0/100 |

As can be seen from Table 2, each embodiment in which convex portions were formed respectively on the end portion of the positive electrode lead and the end portion of the negative electrode lead, the number of faulty batteries of the short circuit test had decreased in comparison with Comparative Example 2-1 where convex portions were not formed at all, and Comparative Example 2-2 where convex portions were formed only in the vicinity of the negative electrode lead. In particular, in Embodiment 2-2 to Embodiment 2-7, Tc1/Tc2, which is the ratio of the thickness Ta1 of the resin layer at the end portion of the negative electrode lead, and the thickness Ta2 of the resin layer on the center line in the width direction of the negative electrode lead, was set to 1.2 or more, absolutely no faults occurred in the short circuit test. Furthermore, in Embodiment 2-2 to Embodiment 2-5, Ta1/Ta2 was set to from 1.2 to 10, and absolutely no faults occurred in the leak test in addition to the short-circuit test.

In Example 2-1, Ta1/Ta2 was set to less than 1.2, and some faults occurred in the short circuit test where there was a short circuit in the negative electrode lead and the aluminum layer of the laminate film. In addition, in Embodiment 2-6 and Embodiment 2-7, Ta1/Ta2 was greater than 10, and faulty sealing was confirmed in some of the laminate films in the leak tests.

From the above results, it is preferable for the Ta1/Ta2 ratio of the thickness Ta1 of the resin layer at the end portion of the negative electrode lead and the thickness Ta2 of the resin layer on the center line in the width direction of the negative electrode lead to be from 1.2 to 10.

<Embodiment 3-1> to <Embodiment 3-14> and <Comparative Example 3-1>

In Embodiment 3-1 to Embodiment 3-14 and Comparative Example 3-1, the width of the convex portion formed containing the end portion of the positive electrode lead and the end portion of the negative electrode lead is changed, a non-aqueous electrolyte battery is prepared and checking for battery faults is performed.

<Embodiment 3-1>

The width of the convex portions formed respectively at both end portions of the positive electrode lead and the negative electrode lead is 0.4 mm (the region of 0.05 mm from the lead end portion to the inside, and 0.35 mm from the lead end portion to the outside), and other than this, the non-aqueous electrolyte battery was prepared in the same manner as in Embodiment 1-2.

<Embodiment 3-2>

The width of the convex portions formed respectively at both end portions of the positive electrode lead and the negative electrode lead is 0.5 mm (the region of 0.1 mm from the lead end portion to the inside, and 0.4 mm from the lead end portion to the outside), and other than this, the non-aqueous electrolyte battery was prepared in the same manner as in Embodiment 3-1.

<Embodiment 3-3>

The width of the convex portions formed respectively at both end portions of the positive electrode lead and the negative electrode lead is 0.6 mm (the region of 0.1 mm from the lead end portion to the inside, and 0.5 mm from the lead end portion to the outside), and other than this, the non-aqueous electrolyte battery was prepared in the same manner as in Embodiment 3-1.

<Embodiment 3-4>

The width of the convex portions formed respectively at both end portions of the positive electrode lead and the negative electrode lead is 0.7 mm (the region of 0.1 mm from the lead end portion to the inside, and 0.6 mm from the lead end portion to the outside), and other than this, the non-aqueous electrolyte battery was prepared in the same manner as in Embodiment 3-1.

<Embodiment 3-5>

The width of the convex portions formed respectively at both end portions of the positive electrode lead and the negative electrode lead is 0.8 mm (the region of 0.2 mm from the lead end portion to the inside, and 0.6 mm from the lead end portion to the outside), and other than this, the non-aqueous electrolyte battery was prepared in the same manner as in Embodiment 3-1.

<Embodiment 3-6>

The width of the convex portions formed respectively at both end portions of the positive electrode lead and the negative electrode lead is 3 mm (the region of 2.0 mm from the lead end portion to the inside, and 1.0 mm from the lead end portion to the outside), and other than this, the non-aqueous electrolyte battery was prepared in the same manner as in Embodiment 3-1.

<Embodiment 3-7>

The width of the convex portions formed respectively at both end portions of the positive electrode lead and the negative electrode lead is 4 mm (the region of 2.0 mm from the lead end portion to the inside, and 2.0 mm from the lead end portion to the outside), and other than this, the non-aqueous electrolyte battery was prepared in the same manner as in Embodiment 3-1.

<Embodiment 3-8>

The width of the convex portions formed respectively at both end portions of the positive electrode lead and the negative electrode lead is 10 mm (the region of 8.0 mm from the lead end portion to the inside, and 2.0 mm from the lead end portion to the outside), and other than this, the non-aqueous electrolyte battery was prepared in the same manner as in Embodiment 3-1.

<Embodiment 3-9>

The width of the convex portions formed respectively at both end portions of the positive electrode lead and the negative electrode lead is 20 mm (the region of 18 mm from the lead end portion to the inside, and 2.0 mm from the lead end portion to the outside), and other than this, the non-aqueous electrolyte battery was prepared in the same manner as in Embodiment 3-1.

<Embodiment 3-10>

The width of the convex portions formed respectively at both end portions of the positive electrode lead and the negative electrode lead is 31 mm (the region of 28 mm from the lead end portion to the inside, and 3.0 mm from the lead end portion to the outside), and other than this, the non-aqueous electrolyte battery was prepared in the same manner as in Embodiment 3-1.

<Embodiment 3-11>

The width of the convex portions formed respectively at both end portions of the positive electrode lead and the negative electrode lead is 32 mm (the region of 29 mm from the lead end portion to the inside, and 3.0 mm from the lead end portion to the outside), and other than this, the non-aqueous electrolyte battery was prepared in the same manner as in Embodiment 3-1.

<Embodiment 3-12>

The width of the convex portions formed respectively at both end portions of the positive electrode lead and the negative electrode lead is 33 mm (the region of 30 mm from the lead end portion to the inside, and 3.0 mm from the lead end portion to the outside), and other than this, the non-aqueous electrolyte battery was prepared in the same manner as in Embodiment 3-1.

<Embodiment 3-13>

The width of the convex portions formed respectively at both end portions of the positive electrode lead and the negative electrode lead is 34 mm (the region of 30 mm from the lead end portion to the inside, and 4.0 mm from the lead end portion to the outside), and other than this, the non-aqueous electrolyte battery was prepared in the same manner as in Embodiment 3-1.

<Embodiment 3-14>

The width of the convex portions formed respectively at both end portions of the positive electrode lead and the negative electrode lead is 35 mm (the region of 31 mm from the lead end portion to the inside, and 4.0 mm from the lead end portion to the outside), and other than this, the non-aqueous electrolyte battery was prepared in the same manner as in Embodiment 3-1.

COMPARATIVE EXAMPLE 3-1

The depth Dc1 of the cutout portion provided at a position interposing the end portions of the positive electrode lead is 260 μm (Dc1/Dc2=1.000), the thickness Tc1 of the resin layer after heat-sealing at both end portions of the positive electrode lead is 15 μm (Tc1/Tc2=1), the depth Da1 of the cutout portion provided at a position interposing the end portions of the negative electrode lead is 260 μm (Da1/Da2=1.000), the thickness Ta1 of the resin layer after heat-sealing at both end portions of the negative electrode lead is 15 μm (Tc1/Tc2=1), and other than that not forming a convex portion in this manner, the non-aqueous electrolyte battery was prepared in the same manner as in Example 3-1.

Battery Evaluation
(a) Short Circuit Test
(b) Leak Test

The short circuit tests and the leak tests were performed on the non-aqueous electrolyte batteries of each of the embodiments and each of the comparative examples which were produced, in the same manner as in Embodiment 1-1.

Table 3 below shows the results of the evaluation.

Furthermore, the above results are the preferable convex portion when the lead width is 90 mm. When the lead width is 90 mm, it is preferable that the width of the convex portion overlapping with the lead be 30 mm or less. In other words, it is preferable for the width of the convex portion that overlaps with the lead to be within ⅓ of the lead width. The preferable convex portion width varies depending on the lead width.

<Sample 4-1> to <Sample 4-5>

In Sample 4-1 to Sample 4-5, the thickness of the positive electrode lead and the negative electrode lead is changed, a non-aqueous electrolyte battery is prepared and checking for battery faults is performed.

TABLE 3

| | Positive electrode lead side uneven shape | | | | Negative electrode lead side uneven shape | | | | Positive electrode lead side cutout portion shape | | | Negative electrode lead side cutout portion shape | | | Short circuit test | Leak test |
|---|---|---|---|---|---|---|---|---|---|---|---|---|---|---|---|---|
| | Tc1 [μm] | Tc2 [μm] | Tc1/Tc2 | Convex portion width [mm] | Ta1 [μm] | Ta2 [μm] | Ta1/Ta2 | Convex portion width [mm] | Dc1 [μm] | Dc2 [μm] | Dc1/Dc2 | Da1 [μm] | Da2 [μm] | Da1/Da2 | | |
| Embodiment 3-1 | 30 | 15 | 2 | 0.4 | 30 | 15 | 2 | 0.4 | 275 | 260 | 1.058 | 275 | 260 | 1.058 | 4/100 | 0/100 |
| Embodiment 3-2 | 30 | 15 | 2 | 0.5 | 30 | 15 | 2 | 0.5 | 275 | 260 | 1.058 | 275 | 260 | 1.058 | 2/100 | 0/100 |
| Embodiment 3-3 | 30 | 15 | 2 | 0.6 | 30 | 15 | 2 | 0.6 | 275 | 260 | 1.058 | 275 | 260 | 1.058 | 0/100 | 0/100 |
| Embodiment 3-4 | 30 | 15 | 2 | 0.7 | 30 | 15 | 2 | 0.7 | 275 | 260 | 1.058 | 275 | 260 | 1.058 | 0/100 | 0/100 |
| Embodiment 3-5 | 30 | 15 | 2 | 0.8 | 30 | 15 | 2 | 0.8 | 275 | 260 | 1.058 | 275 | 260 | 1.058 | 0/100 | 0/100 |
| Embodiment 3-6 | 30 | 15 | 2 | 3 | 30 | 15 | 2 | 3 | 275 | 260 | 1.058 | 275 | 260 | 1.058 | 0/100 | 0/100 |
| Embodiment 3-7 | 30 | 15 | 2 | 4 | 30 | 15 | 2 | 4 | 275 | 260 | 1.058 | 275 | 260 | 1.058 | 0/100 | 0/100 |
| Embodiment 3-8 | 30 | 15 | 2 | 10 | 30 | 15 | 2 | 10 | 275 | 260 | 1.058 | 275 | 260 | 1.058 | 0/100 | 0/100 |
| Embodiment 3-9 | 30 | 15 | 2 | 20 | 30 | 15 | 2 | 20 | 275 | 260 | 1.058 | 275 | 260 | 1.058 | 0/100 | 0/100 |
| Embodiment 3-10 | 30 | 15 | 2 | 31 | 30 | 15 | 2 | 31 | 275 | 260 | 1.058 | 275 | 260 | 1.058 | 0/100 | 0/100 |
| Embodiment 3-11 | 30 | 15 | 2 | 32 | 30 | 15 | 2 | 32 | 275 | 260 | 1.058 | 275 | 260 | 1.058 | 0/100 | 0/100 |
| Embodiment 3-12 | 30 | 15 | 2 | 33 | 30 | 15 | 2 | 33 | 275 | 260 | 1.058 | 275 | 260 | 1.058 | 0/100 | 0/100 |
| Embodiment 3-13 | 30 | 15 | 2 | 34 | 30 | 15 | 2 | 34 | 275 | 260 | 1.058 | 275 | 260 | 1.058 | 0/100 | 1/100 |
| Embodiment 3-14 | 30 | 15 | 2 | 35 | 30 | 15 | 2 | 35 | 275 | 260 | 1.058 | 275 | 260 | 1.058 | 0/100 | 3/100 |
| Comparative Example 3-1 | 15 | 15 | 1 | — | 15 | 15 | 1 | — | 260 | 260 | 1.000 | 260 | 260 | 1.000 | 15/100 | 0/100 |

As can be seen from Table 3, each embodiment in which convex portions were formed respectively on the end portion of the positive electrode lead and the end portion of the negative electrode lead, the number of faulty batteries of the short circuit test had decreased in comparison with the Comparative Example 1-1 where convex portions were not formed at all. Among them, in Embodiment 3-3 to Embodiment 3-14 where the convex portion formed at both end portions of the lead is set to 0.1 mm or more from the lead end portion to the inside, 0.5 or more from the lead end portion to the outside, is formed, and the width of the convex portion is set to 0.6 or more, absolutely no faults occurred in the short circuit test. Furthermore, in Embodiment 3-3 to Embodiment 3-12 where the convex portion is formed in a range where it is set to from 0.1 mm to 30 mm from the lead end portion to the inside, from 0.5 to 3.0 mm from the lead end portion to the outside, and the width of the convex portion is set to from 0.6 to 33 mm, absolutely no faults occurred in the leak test in addition to the short-circuit test.

<Sample 4-1>

The thickness of the respective positive electrode lead and negative electrode lead is 70 μm, the thickness Tc1 of the resin layer after the heat-sealing in both end portions of the positive electrode lead is 60 μm, and the thickness Tc2 of the resin layer after the heat-sealing on the center line of the positive electrode lead is 30 μm (Ta1/Ta2=2), and other than this, the non-aqueous electrolyte battery was prepared in the same manner as in Embodiment 1-1.

<Sample 4-2>

The thickness of the respective positive electrode lead and the negative electrode lead is 100 μm, other than this, the non-aqueous electrolyte battery was prepared in the same manner as in Embodiment 4-1.

Sample <4-3>

The thickness of the respective positive electrode lead and the negative electrode lead is 250 μm, other than this, the non-aqueous electrolyte battery was prepared in the same manner as in Embodiment 4-1.

<Sample 4-4>

The thickness of the respective positive electrode lead and the negative electrode lead is 400 μm, other than this, the non-aqueous electrolyte battery was prepared in the same manner as in Embodiment 4-1.

<Sample 4-5>

The thickness of the respective positive electrode lead and the negative electrode lead is 450 μm, other than this, the non-aqueous electrolyte battery was prepared in the same manner as in Embodiment 4-1.

Battery Evaluation (a) Short Circuit Test (b) Leak Test

The short circuit tests and the leak tests were performed on the non-aqueous electrolyte batteries of each of the embodiments and each of the comparative examples which were produced, in the same manner as in Embodiment 1-1.

(d) High Current Discharge Test

In regard to the non-aqueous electrolyte batteries of each of the embodiments and each of the comparative examples which were produced, after performing charging at a constant current and constant voltage up to 3.6V, a large current discharge was performed for 6 minutes at 10 C (100 A), confirmation of abnormalities due to heat generation of the positive electrode lead and the negative electrode lead was performed. The tests described above were performed respectively for 5 non-aqueous electrolyte batteries in each of the embodiments and the Comparative Examples, and the number of non-aqueous electrolyte batteries where fracturing of the positive electrode lead or the negative electrode lead has occurred was confirmed.

Table 4 below shows the results of the evaluation.

TABLE 4

| | Positive electrode lead width [μm] | Positive electrode lead side uneven shape | | | | Negative electrode lead width [μm] | Negative electrode lead side uneven shape | | | | Short circuit test | Leak test | Cleavage pressure test | Large current discharge test |
|---|---|---|---|---|---|---|---|---|---|---|---|---|---|---|
| | | Tc1 [μm] | Tc2 [μm] | Tc1/Tc2 | Convex portion width [mm] | | Ta1 [μm] | Ta2 [μm] | Ta1/Ta2 | Convex portion width [mm] | | | | |
| Sample 4-1 | 70 | 60 | 30 | 2 | 4 | 70 | 60 | 30 | 2 | 4 | 0/100 | 0/100 | 0/100 | 5/5 |
| Sample 4-2 | 100 | 60 | 30 | 2 | 4 | 100 | 60 | 30 | 2 | 4 | 0/100 | 0/100 | 0/100 | 0/5 |
| Sample 4-3 | 250 | 60 | 30 | 2 | 4 | 250 | 60 | 30 | 2 | 4 | 0/100 | 0/100 | 0/100 | 0/5 |
| Sample 4-4 | 400 | 60 | 30 | 2 | 4 | 400 | 60 | 30 | 2 | 4 | 0/100 | 0/100 | 0/100 | 0/5 |
| Sample 4-5 | 450 | 60 | 30 | 2 | 4 | 450 | 60 | 30 | 2 | 4 | 45/100 | 12/100 | 5/100 | 0/5 |

(c) Cleavage Pressure Test

Air was inserted into the inside and the pressure limit (cleavage pressure) when cleaving the laminate film was measured in relation to the non-aqueous electrolyte batteries of each of the embodiments and each of the comparative examples which were produced. When the sealability between the laminate films, the laminate film and the positive electrode lead or the negative electrode lead is low, since the pressure limit becomes low, the batteries where the pressure limit is 0.6 MPa or lower are faulty.

Figure 15:
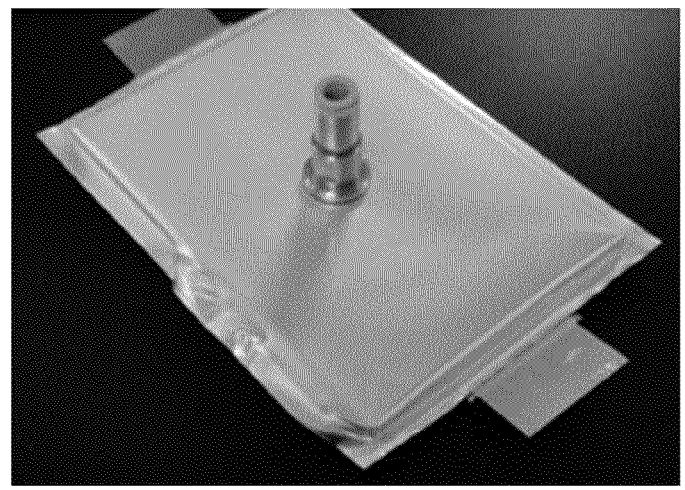
FIG. 15 is a photograph showing the method of cleavage pressure test in the example.
Figure 16:
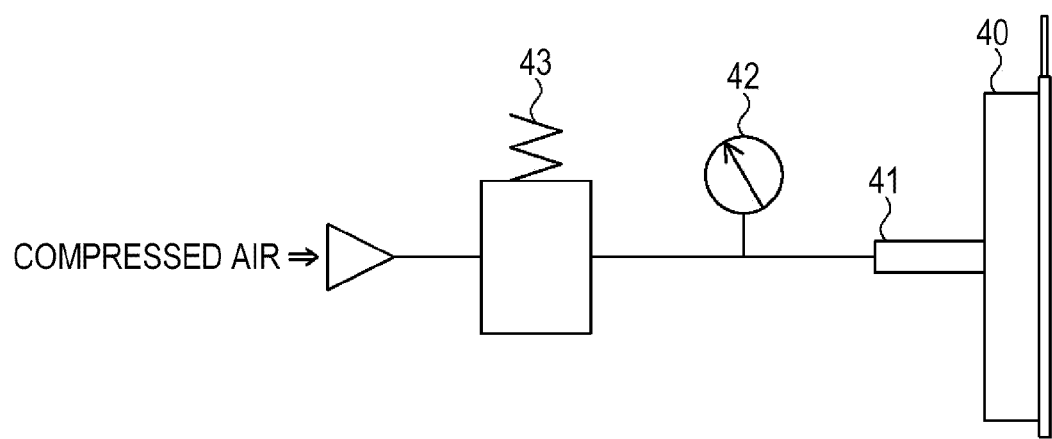
FIG. 16 is a diagram showing the configuration of the cleavage pressure test equipment in the example.

The cleavage pressure is measured using the following method. When forming the non-aqueous electrolyte battery of each embodiment and each comparative example, the laminated film is sealed, the jig block is inserted into the laminate film of a non-aqueous electrolyte battery, and the jig block protrudes to the outside of the non-aqueous electrolyte battery. FIG. 15 is a photograph showing a non-aqueous electrolyte battery with a jig block inserted therein. Subsequently, a pressure gauge to measure the cleavage pressure, and a manual regulator are connected to the jig block inserted into the non-aqueous electrolyte battery. FIG. 16 shows a configuration example of the connection state of the non-aqueous electrolyte battery 40, the jig block 41, the pressure gauge 42 and the manual regulator 43. FIG. 16 is a diagram showing the connection state as seen from the side direction of the non-aqueous electrolyte battery 40. Then, the compressed air is manually applied (0.5 Mpa/min application rate), air flows into the inside of the non-aqueous electrolyte battery from the jig block, and by reading the numerical value of the pressure gauge when the sealing portion of the laminate film was cleaved, the cleavage pressure was measured. The tests described above were performed respectively for 100 non-aqueous electrolyte batteries in each of the embodiments and the Comparative Examples, the number of non-aqueous electrolyte batteries where the pressure limit was 0.6 MPa or less was confirmed.

As can be seen from Table 4, when the thickness Tc1 of the resin layer after the heat-sealing of both end portions of the positive electrode lead is 60 μm and the thickness Tc2 of the resin layer after the heat-sealing on the center line of the positive electrode lead is 30 μm (Ta1/Ta2=2), in each sample where the thickness of the positive electrode lead and the negative electrode lead is from 100 μm to 400 μm, faults did not occur in any of the short circuit test, the leak test, the cleavage pressure test, and the high current discharge test.

In the sample 4-1 where the thickness of the positive electrode lead and the negative electrode lead is 70 μm, lead fracture occurred when there is a large current discharge. In addition, in the sample 4-2 where the thickness of the positive electrode lead and the negative electrode lead is 450 μm, faults occurred in the short-circuit test, the leak test and the cleavage test. In particular, in the short-circuit test, the number of short circuits which occurred was remarkably large.

From the above results, the thickness of the positive electrode lead and the negative electrode lead is preferably from 100 μm to 400 μm.

Furthermore, the thickness of the positive electrode lead and the negative electrode lead described above is a suitable lead thickness for a large current discharge (10 C discharge), and in a non-aqueous electrolyte battery used in electronic equipment where the current discharge is smaller, the thickness of the positive electrode lead and the negative electrode lead can be thinner.

In addition, the thickness of the positive electrode lead and the negative electrode lead as described above is a preferable range when the thickness Tc1 of the resin layer after the heat-sealing in both end portions of the positive electrode lead is 60 μm, and the thickness Tc2 of the resin layer after the heat-sealing on the center line of the positive electrode lead is 30 μm (Tc1/Tc2=2). By increasing Ta1/Ta2, it is possible to prevent a short circuit of the positive electrode lead and the negative electrode lead which are thicker.

Although the embodiments of the present disclosure have been described in detail above, the present disclosure is not limited to the embodiments described above, and various modifications based on the technical ideas of the embodiments of the present disclosure are possible.

For example, the lamination configuration of the laminated film, the configuration of the electrode body, and the like are not limited to the embodiments but may also be of different configurations and materials.

Furthermore, the present disclosure can also be configured as follows.

[1] A non-aqueous electrolyte battery including cladding members in which a metal layer, an external resin layer formed on an outer surface of the metal layer, an inner resin layer formed on an inner surface of the metal layer are laminated; an electrode body which is formed by a positive electrode and a negative electrode opposed via a separator; non-aqueous electrolyte; a positive electrode lead which is electrically connected to the positive electrode and is derived from the heat sealed joint of the cladding member to outside; and a negative electrode lead which is electrically connected to the negative electrode, and is derived from the heat sealed joint of the cladding member to outside, where, in a heat sealed portion where the positive electrode lead and the negative electrode lead are derived to outside and the cladding members are heat-sealed to each other, the thickness of the heat sealed portions of both end portions of the positive electrode lead is formed larger than the thickness of the heat sealed portion on a center line in a width direction of the positive electrode lead, and the thickness of the heat sealed portions of both end portions of the negative electrode lead is formed larger than the thickness of the heat sealed portion on a center line in a width direction of the negative electrode lead.

[2] The non-aqueous electrolyte battery described in [1], where a thickness of the resin layer between the metal layer and the positive electrode lead in both end portions of the positive electrode lead, by being formed larger than the thickness of the resin layer between the metal layer and the positive electrode lead on a center line of the positive electrode lead, a convex portion of the heat-sealing unit is formed to include an end portion of the positive electrode lead which is convex in a direction of the cladding resin layer by providing the heat-sealed portion and a step on the center line of the positive electrode lead, and a thickness of the resin layer between the metal layer and the negative electrode lead in both end portions of the negative electrode lead, by being formed larger than the thickness of the resin layer between the metal layer and the negative electrode lead on a center line of the negative electrode lead, a convex portion of the heat-sealing unit is formed to include an end portion of the negative electrode lead which is convex in a direction of the cladding resin layer by providing the heat-sealed portion and a step on a center line of the negative electrode lead.

[3] The non-aqueous electrolyte battery described in [1] or [2], where the convex portion of the heat-sealed portion including the end portion of the positive electrode lead and the convex portion of the heat-sealed portion including the end portion of the negative electrode lead are respectively provided on a surface side of at least one of the positive electrode lead and the negative electrode lead.

[4] The non-aqueous electrolyte battery described in any one of [1] to [3] where when a burr is formed at the end portion of at least one of the positive electrode lead and the negative electrode lead, the convex portion is formed in at least a formation direction of the burr.

[5] The non-aqueous electrolyte battery described in any one of [1] to [4], where when the thickness of the resin layer between the metal layer and the positive electrode lead in the end portion of the positive electrode lead is Tc1, and the thickness of the resin layer between the metal layer and the positive electrode lead on the center line of the width direction of the positive electrode lead is Tc2, $1.2 \leq Tc1/Tc2 \leq 10$, and when a thickness of the resin layer between the metal layer and the positive electrode lead in an end portion of the negative electrode lead is Ta1, and a thickness of the resin layer between the metal layer and the positive electrode lead on a center line of a width direction of the negative electrode lead is Ta2, $1.2 \leq Ta1/Ta2 \leq 10$.

[6] The non-aqueous electrolyte battery described in [5], where the thickness Tc2 of the resin layer on the center line of the width direction of the positive electrode lead and the thickness Ta2 of the resin layer on the center line of the width direction of the negative electrode lead are respectively from 5 μm to 50 μm.

[7] The non-aqueous electrolyte battery described in any one of [2] to [4], where the convex portion of the heat-sealed portion including the end portion of the positive electrode lead has a width of 0.6 mm or more and overlaps with the positive electrode lead in a range of ⅓ or less of the width of the positive electrode lead, and the convex portion of the heat-sealed portion including the end portion of the negative electrode lead has a width of 0.6 mm or more and overlaps with the negative electrode lead in a range of ⅓ or less of the width of the negative electrode lead.

[8] The non-aqueous electrolyte battery described in [7], where among convex portions of the heat-sealed portion including the end portion of the positive electrode lead, a width of a region which does not overlap the positive electrode lead is from 0.5 mm to 3.0 mm in an outside direction of the positive electrode lead from an edge portion of the positive electrode lead, a width of a region which overlaps the positive electrode lead is from 0.1 mm to ⅓ of a width of the positive electrode lead in an inside direction of the positive electrode lead from an edge portion of the positive electrode lead, and among convex portions of the heat-sealed portion including an end portion of the negative electrode lead, a width of a region which does not overlap the negative electrode lead is from 0.5 mm to 3.0 mm in an outside direction of the negative electrode lead from an edge portion of the negative electrode lead, a width of a region which overlaps the negative electrode lead is from 0.1 mm to ⅓ of a width of the negative electrode lead in an inside direction of the negative electrode lead from an edge portion of the negative electrode lead.

[9] The non-aqueous electrolyte battery described in any one of [1] to [6], where adherence members are provided respectively between the cladding member and the positive electrode lead and the negative electrode lead, and the resin layer in a vicinity of the positive electrode lead and the resin layer in a vicinity of the negative electrode lead, the inner resin layer of the cladding member and the adherence member melt integrally together to form a molten resin layer.

[10] The non-aqueous electrolyte battery described in any one of [1] to [9], where a thickness of the positive electrode lead and a thickness of the negative electrode lead are respectively from 100 μm to 400 μm.

[11] A manufacturing method of a non-aqueous electrolyte battery including cladding an electrode body and electrolyte including a positive electrode and a negative electrode using a cladding member which is formed by laminating a metal layer, an external resin layer formed on an outer surface of the metal layer, and an internal resin layer formed on an inner surface of the metal layer, and accommodates the electrode body and the electrolyte in an inner portion using heat-sealing; deriving a positive electrode lead which is electrically connected to the positive electrode and a negative electrode lead that is electrically connected to the negative electrode from a joint of the cladding member to outside; heat-sealing the cladding member of, among an outer periphery portion of the electrode body, a derivation side which derives the positive electrode lead or the negative electrode lead using a heater block which is provided with a positive electrode side cutout portion which is formed from a pair of first cutout portions which are respectively provided in a portion opposite the positive electrode and a portion opposite a region which straddles end portions of the positive electrode, and a second cutout portion including a center line of the positive electrode lead between the pair of first cutout portions and formed shallower than the first cutout portions, and is provided with a negative electrode side cutout portion which is formed from a pair of third cutout portions which are respectively provided in a portion opposite the negative electrode lead and a portion opposite a region which straddles end portions of the negative electrode lead, and a fourth cutout portion including a center line of the negative electrode lead between the pair of third cutout portions and formed shallower than the third cutout portions; and heat-sealing a joint of, among an outer periphery portion of the electrode body, the cladding member of a side which does not derive the positive electrode lead and the negative electrode lead.

[12] The manufacturing method a non-aqueous electrolyte battery described in [11], where the joint of the cladding member of the derivation side where the positive electrode lead and the negative electrode lead are derived is interposed by a pair of heater blocks and heat-sealed, and the positive electrode side cutout portion or the negative electrode side cutout portion is formed on at least one of the heater blocks.

[13] The manufacturing method of a non-aqueous electrolyte battery described in [12], where in the positive electrode side cutout portion, when a depth of a first cutout portion is set to Dc1, and a depth of the second cutout portion is set to Dc2, $1.010 \leq Dc1/Dc2 \leq 1.550$, and in the negative electrode side cutout portion, when a depth of a third cutout portion is set to Da1, and a depth of the fourth cutout portion is set to Da2, $1.010 \leq Da1/Da2 \leq 1.550$.

[14] The manufacturing method of a non-aqueous electrolyte battery described in any one of [11] to [14], where a width of the second cutout portion of the positive electrode side cutout portion and a width of the fourth cutout portion of the negative electrode side cutout portion are respectively from 0.6 mm to 33 mm

[15] A battery pack including the non-aqueous electrolyte battery described in [1], a control unit which controls the non-aqueous electrolyte battery, and cladding which encapsulates the non-aqueous electrolyte battery.

[16] An electronic device including the non-aqueous electrolyte battery described in [1], where the electronic device receives a supply of electrical power from the non-aqueous electrolyte battery.

[17] An electric vehicle including the non-aqueous electrolyte battery described in [1], a conversion device to convert a drive power of a vehicle that receives a supply of electrical power from the non-aqueous electrolyte battery, and a control device to perform information processing related to vehicle control based on information related to the non-aqueous electrolyte battery.

[18] A capacitive storage device including the non-aqueous electrolyte battery described in [1], where the capacitive storage device supplies electrical power to an electronic device connected to the non-aqueous electrolyte battery.

[19] The capacitive storage device described in [18] further including an electrical power information control device which sends and receives signals with other devices via a network, where the capacitive storage device performs charging and discharging control of the non-aqueous electrolyte battery based on information received by the electrical power information control device.

[20] A power system where a supply of power is received from the non-aqueous electrolyte battery described in [1], or the non-aqueous electrolyte battery is supplied power from a power generation apparatus or from the power grid.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery comprising:
a cladding member in which a metal layer, an external resin layer formed on an outer surface of the metal layer, an inner resin layer formed on an inner surface of the metal layer are laminated;
an electrode body which includes a positive electrode and a negative electrode which are accommodated in the cladding member;
electrolyte which is accommodated in the cladding member;
a positive electrode lead which is electrically connected to the positive electrode and is derived from a heat sealed joint of the cladding member to outside the battery; and
a negative electrode lead which is electrically connected to the negative electrode, and is derived from the heat sealed joint of the cladding member to outside the battery,
wherein a first heat-sealed portion where the positive electrode lead is derived to outside the battery and a second heat-sealed portion where the negative electrode lead is derived to outside the battery are heat-sealed to the cladding member, a thickness of both end portions of the first heat-sealed portion in a width direction of the positive electrode lead is formed larger than a thickness of the first heat-sealed portion on a center line of the first heat-sealed portion in the width direction of the positive electrode lead, and a thickness of both end portions of the second heat-sealed portion in a width direction of the negative electrode lead is formed larger than a thickness of the second heat-sealed portion on a center line of the second heat-sealed portion in the width direction of the negative electrode lead.

2. The battery according to claim 1, wherein
a thickness of a resin layer between the metal layer and the positive electrode lead at both the end portions of the first heat-sealed portion is formed larger than the thickness of the resin layer between the metal layer and the positive electrode lead on the center line of the first heat-sealed portion, wherein
an end portion of the first heat-sealed portion forms a first convex portion to include an end portion of the positive electrode lead, wherein the first convex portion is convex in a direction of the external resin layer, and
a first step is provided on the center line of the first heat-sealed portion, and
a thickness of the resin layer between the metal layer and the negative electrode lead at both the end portions of the second heat-sealed portion is formed larger than the thickness of the resin layer between the metal layer and the negative electrode lead on the center line of the second heat-sealed portion, wherein
an end portion of the second heat-sealed portion forms a second convex portion to include an end portion of the negative electrode lead, wherein the second convex portion is convex in a direction of the external resin layer, and
a second step is provided on the center line of the second heat-sealed portion.

3. The battery according to claim 2, wherein the first convex portion is provided on a surface side of the positive electrode lead and the second convex portion is provided on a surface side of the negative electrode lead.

4. The battery according to claim 3, wherein when a first burr is formed at the end portion of the positive electrode lead, the first convex portion is formed in a formation direction of the first burr, and
when a second burr is formed at the end portion of the negative electrode lead, the second convex portion is formed in a formation direction of the second burr.

5. The battery according to claim 2, wherein when the thickness of the resin layer between the metal layer and the positive electrode lead at the end portion of the first heat-sealed portion is Tc1, and the thickness of the resin layer between the metal layer and the positive electrode lead on the center line of the first heat-sealed portion is Tc2, 1.2≤Tc1/Tc2≤10, and
when the thickness of the resin layer between the metal layer and the negative electrode lead at the end portion of the second heat-sealed portion is Ta1, and the thickness of the resin layer between the metal layer and the negative electrode lead on the center line of the second heat-sealed portion is Ta2, 1.2≤Ta1/Ta2≤10.

6. The battery according to claim 5, wherein the thickness Tc2 of the resin layer on the center line of the first heat-sealed portion and the thickness Ta2 of the resin layer on the center line of the second heat-sealed portion are respectively from 5 μm to 50 μm.

7. The battery according to claim 2, wherein the first convex portion of the first heat-sealed portion including the end portion of the positive electrode lead has a width of 0.6 mm or more and overlaps with the positive electrode lead in a range of ⅓ or less of a width of the positive electrode lead, and
the second convex portion of the second heat-sealed portion including the end portion of the negative electrode lead has a width of 0.6 mm or more and overlaps with the negative electrode lead in a range of ⅓ or less of a width of the negative electrode lead.

8. The battery according to claim 7, wherein
for the first convex portion of the first heat-sealed portion including the end portion of the positive electrode lead,
a width of a region which does not overlap the positive electrode lead is from 0.5 mm to 3.0 mm in an outside direction of the positive electrode lead from an edge portion of the positive electrode lead,
a width of a region which overlaps the positive electrode lead is from 0.1 mm to ⅓ of the width of the positive electrode lead in an inside direction of the positive electrode lead from the edge portion of the positive electrode lead, and
for the second convex portion of the second heat-sealed portion including the end portion of the negative electrode lead,
a width of a region which does not overlap the negative electrode lead is from 0.5 mm to 3.0 mm in an outside direction of the negative electrode lead from an edge portion of the negative electrode lead,
a width of a region which overlaps the negative electrode lead is from 0.1 mm to ⅓ of the width of the negative electrode lead in an inside direction of the negative electrode lead from the edge portion of the negative electrode lead.

9. The battery according to claim 1,
wherein adherence members are provided respectively between the cladding member, and the positive electrode lead and the negative electrode lead, and
a resin layer in a vicinity of the positive electrode lead and the resin layer in a vicinity of the negative electrode lead, the inner resin layer of the cladding member and the adherence members melt integrally together to form a molten resin layer.

10. The battery according to claim 1, wherein a thickness of the positive electrode lead and a thickness of the negative electrode lead are respectively from 100 μm to 400 μm.

11. A battery pack comprising:
the battery according to claim 1,
a control unit which controls the battery, and
a cladding which encapsulates the battery.

12. An electronic device comprising:
the battery according to claim 1,
wherein the electronic device receives a supply of electrical power from the battery.

13. An electric vehicle comprising:
the battery according to claim 1,
a conversion device to convert a drive power of a vehicle that receives a supply of electrical power from the battery, and
a control device to perform information processing related to vehicle control based on information related to the battery.

14. A capacitive storage device comprising:
the battery according to claim 1,
wherein, the capacitive storage device supplies electrical power to an electronic device connected to the battery.

15. The capacitive storage device according to claim 14 further comprising:
an electrical power information control device which sends and receives signals with other devices via a network,
wherein, the capacitive storage device performs charging and discharging control of the battery based on information received by the electrical power information control device.

16. A power system, wherein, a supply of power is received from the battery according to claim 1, or the battery according to claim 1 is supplied power from a power generation apparatus or from a power grid.

17. A manufacturing method of a battery comprising:
cladding an electrode body and electrolyte including a positive electrode and a negative electrode using a cladding member which is formed by laminating a metal layer, an external resin layer formed on an outer surface of the metal layer, and an internal resin layer formed on an inner surface of the metal layer, and accommodates the electrode body and the electrolyte in an inner portion using heat-sealing;
deriving a positive electrode lead which is electrically connected to the positive electrode and a negative electrode lead that is electrically connected to the negative electrode from a joint of the cladding member to outside the battery; and
heat-sealing the cladding member of, among an outer periphery portion of the electrode body, a derivation side which derives the positive electrode lead or the negative electrode lead outside the battery using a heater block which is provided with a positive electrode side cutout portion opposite to the positive electrode and a negative electrode side cutout portion opposite to the negative electrode, wherein the positive electrode side cutout portion is formed from a pair of first cutout portions and a second cutout portion, wherein the pair of first cutout portions are respectively provided in a portion opposite to the positive electrode and a portion opposite to a region which straddles end portions of the positive electrode, wherein the second cutout portion is formed between the pair of first cutout portions and is formed shallower than the first cutout portions, wherein the negative electrode side cutout portion is formed from a pair of third cutout portions and a fourth cutout portion, wherein the pair of third cutout portions are respectively provided in a portion opposite to the negative electrode lead and a portion opposite to a region which straddles end portions of the negative electrode lead, wherein the fourth cutout portion is formed between the pair of third cutout portions and is formed shallower than the third cutout portions.

18. The manufacturing method of the battery according to claim 17,
    wherein the joint of the cladding member of the derivation side where the positive electrode lead and the negative electrode lead are derived is interposed by a pair of heater blocks and heat-sealed, and
    the positive electrode side cutout portion or the negative electrode side cutout portion is formed on at least one of the pair of heater blocks.

19. The manufacturing method of the battery according to claim 18, wherein
    in the positive electrode side cutout portion, when a depth of a first cutout portion is set to $Dc1$, and a depth of the second cutout portion is set to $Dc2$, $1.010 \leq Dc1/Dc2 \leq 1.550$, and
    in the negative electrode side cutout portion, when a depth of a third cutout portion is set to $Da1$, and a depth of the fourth cutout portion is set to $Da2$, $1.010 \leq Da1/Da2 \leq 1.550$.

20. The manufacturing method of the battery according to claim 17, wherein
    a first cutout portion of the positive electrode side cutout portion has a width of 0.6 mm or more and overlaps with the positive electrode lead in a range of ⅓ or less of a width of the positive electrode lead, and
    a third cutout portion of the negative electrode side cutout portion has a width of 0.6 mm or more and overlaps with the negative electrode lead in a range of ⅓ or less of a width of the negative electrode lead.

* * * * *